United States Patent [19]

Koyanagi et al.

[11] Patent Number: 4,757,124
[45] Date of Patent: Jul. 12, 1988

[54] PROCESS FOR PRODUCTION OF VINYL CHLORIDE POLYMER

[75] Inventors: Shunichi Koyanagi, Yokohama; Hajime Kitamura, Ichihara; Toshihide Shimizu; Ichiro Kaneko, both of Ibaraki, all of Japan

[73] Assignee: Shin-Etsu Chemical Co., Ltd., Tokyo, Japan

[21] Appl. No.: 76,996

[22] Filed: Jul. 21, 1987

Related U.S. Application Data

[63] Continuation of Ser. No. 756,313, Jul. 18, 1985, abandoned.

[30] Foreign Application Priority Data

Jul. 23, 1984 [JP] Japan ................... 59-152522
Jul. 26, 1984 [JP] Japan ................... 59-155967

[51] Int. Cl.$^4$ ................... C08F 2/18; C08F 2/22; C08F 2/44
[52] U.S. Cl. ................... 526/62; 526/74; 526/191; 526/201; 526/204; 526/218.1; 526/344.2
[58] Field of Search ................... 526/62, 74, 191, 201, 526/204, 218.1, 344.2

[56] References Cited

U.S. PATENT DOCUMENTS

| | | | |
|---|---|---|---|
| 3,661,867 | 5/1972 | Koyanagi et al. | 526/344.2 X |
| 3,669,946 | 6/1972 | Koyanagi et al. | 526/62 |
| 3,923,765 | 12/1975 | Goetze et al. | 526/62 |
| 4,049,895 | 9/1977 | McOnie et al. | 526/62 |
| 4,068,059 | 1/1978 | Witenhafer | 526/62 |
| 4,173,696 | 11/1979 | Koyanagi et al. | 526/62 |
| 4,539,230 | 9/1985 | Shimizu et al. | 526/62 X |

FOREIGN PATENT DOCUMENTS

| | | | |
|---|---|---|---|
| 0008799 | 3/1980 | European Pat. Off. | 526/62 |
| 121263 | 10/1984 | European Pat. Off. | 526/62 |
| 126991 | 12/1984 | European Pat. Off. | 526/62 |
| 1291145 | 9/1972 | United Kingdom | 526/62 |
| 1365590 | 9/1974 | United Kingdom | 526/62 |

OTHER PUBLICATIONS

Preparation and Properties of Polyvinyl Chloride, Zilberman et al., Chimija, 1968, pp. 24–29—WPS-1 USSR.

*Primary Examiner*—Joseph L. Schofer
*Assistant Examiner*—F. M. Teskin
*Attorney, Agent, or Firm*—Oblon, Fisher, Spivak, McClelland & Maier

[57] ABSTRACT

This process is a process for production of a vinyl chloride polymer by suspension polymerization or emulsion polymerization of vinyl chloride monomer or a mixture of vinyl chloride monomer with a vinyl monomer copolymerizable with said vinyl chloride monomer in an aqueous medium, characterized in that the polymerization is carried out in a polymerizer, the inner wall surface and portions of the auxiliary equipment thereof which may come into contact with the monomer during polymerization being previously coated with a scaling preventive comprising at least one selected from dyes, pigments and aromatic or heterocyclic compounds having at least 5 conjugated $\pi$ bonds, while controlling the chloride ion concentration in the reaction mixture to not higher than 100 ppm. According to said process, scaling onto the inner wall surface of a polymerizer, etc. during polymerization can be prevented effectively and surely.

12 Claims, No Drawings

PROCESS FOR PRODUCTION OF VINYL CHLORIDE POLYMER

This is a continuation of application Ser. No. 756,313, filed July 18, 1985 and now abandoned.

This invention relates to a process for producing a vinyl chloride polymer, particularly to improvement of scaling prevention on the inner wall surface of a polymerizer and so on in the course of polymerization of vinyl chloride, etc.

In processes for suspension polymerization or emulsion polymerization of vinyl chloride monomer or a mixture of vinyl chloride monomer and other vinyl monomers in the presence of a polymerization catalyst, there is involved the problem that polymer scales stick to the inner wall surface of the polymerizer or the portions of the auxiliary equipment of the polymerizer which may come into contact with the monomer, such as stirrer, during polymerization. Scales sticking to the inner wall of the polymerizer, etc. will result in a lower polymer yield and cooling capacity of the polymerizer, and may also cause so called fish eyes formed by the adhering scales peeling off the inner wall of the polymerizer and mixing in with the product, thereby lowering the quality of the product. Further, the removal of the adhering scales requires enormous amount of labor and time; in addition, unreacted monomers (vinyl chloride, etc.) are absorbed into the scales which may involve disadvantageously the danger of bringing about hazards to the human body.

As the method for preventing scaling of polymer, it is known in the art to apply a coating of a chemical reagent (hereinafter referred to as "scaling preventive") on the inner wall surface of the polymerizer; various such scale preventives have been proposed. Among the various known methods, there is known a particularly good method in which a dye and/or a pigment is used as the scaling preventive (Japanese Patent Publication No. 30835/1970). However, this method is not always effective and sure in preventing scaling, and thus is not always satisfactory.

Accordingly, an object of the present invention is to provide a process for production of a vinyl chloride polymer which can surely prevent scaling in the course of polymerization of vinyl chloride monomer or a mixture of vinyl chloride monomer with other vinyl monomers.

The present inventors in attempting to improve on the method disclosed in Japanese Patent Publication No. 30835/1970 have consequently found that scaling can be prevented effectively and surely by use of a dye, a pigment or a specific compound having at least 5 conjugated $\pi$ bonds, and also by controlling the chloride ions (Cl$^-$) in the reaction mixture during polymerization.

According to the present invention, there is provided a process for production of a vinyl chloride polymer by suspension polymerization or emulsion polymerization of vinyl chloride monomer or a mixture of vinyl chloride monomer with a vinyl monomer copolymerizable with said vinyl chloride monomer in an aqueous medium, characterized in that the polymerization is carried out in a polymerizer, the inner wall surface and portions of the auxiliary equipment thereof which may come into contact with the monomer during polymerization being previously coated with a scaling preventive comprising at least one selected from dyes, pigments and aromatic or heterocyclic compounds having at least 5 conjugated $\pi$ bonds, while controlling the chloride ion concentration in the reaction mixture to not higher than 100 ppm.

According to the process of the present invention, the scaling preventing action possessed by the above scaling preventive can be induced surely and potently, whereby scaling can effectively be prevented. Accordingly, no labor or time is required for scale removal, enabling continuous use of the polymerizer and improved running efficiency. Also, the cooling capacity of the polymerizer can be maintained constantly, without any fear of entrainment of the scales into the product, whereby the quality of the product polymer can be improved.

Generally, the chloride ion concentration in the reaction mixture during polymerization of vinyl chloride monomer or a vinyl monomer mixture containing vinyl chloride monomer will increase abruptly at the initial stage of polymerization, thereafter tending to be increased slightly or remain at the same level until completion of polymerization. The concentration of the chloride ions may be considered to be influenced by various factors such as the contents of methyl chloride and hydrochloric acid contained in the vinyl monomer used as the starting material, the temperature of the water used in charging, the degree of vacuum after charging, etc. The present inventors have found that the scaling preventing action possessed by dyes, pigments and said compounds having at least 5 conjugated $\pi$ bonds can be surely induced by controlling said chloride ion concentration in the reaction mixture throughout the polymerization procedure to 100 ppm or less, and preferably to 50 ppm or less, to accomplish the present invention as mentioned above. If the chloride ion concentration in the reaction mixture during polymerization exceeds 100 ppm, even if the aforesaid scaling preventive may be applied on the inner wall surface of the polymerizer, etc., its effect as the scale preventive cannot fully be exhibited, whereby scaling cannot effectively be prevented.

According to the present invention, one or more compounds selected from dyes, pigments and aromatic or heterocyclic compounds having at least 5 conjugated $\pi$ bonds (hereinafter referred to simply as "conjugated $\pi$ bond compounds") may be used singly or in combination. However, it is preferable to use a dye or pigment, and more preferably an azine dye.

The dyes and pigments which can be used as the scaling preventive in the process of the present invention may be exemplified by:

azo dyes such as monoazo and polyazo dyes and pigments, metal complex azo dyes and pigments, stilbene azo pigments, thiazole azo dyes and the like;

anthraquinone dyes and pigments such as anthraquinone derivatives, anthrone derivatives and the like;

indigoid dyes and pigments such as indigo derivatives, thioindigo derivatives and the like;

phthalocyanine dyes and pigments;

carbonium dyes and pigments such as diphenylmethane dyes, triphenylmethane dyes and pigments, xanthene dyes, acridine dyes and the like;

quinoneimine dyes such as azine dyes, oxazine dyes, thiazine dyes and the like;

methine dyes such as polymethine or cyanine dyes and the like;

quinoline dyes;

nitro dyes;

benzoquinone and naphthoquinone dyes;

naphthalimide dyes and pigments;
perinone dyes;
sulfide dyes;
fluorescent dyes;
azoic dyes; and
reactive dyes.

These can be used either singly or in any desired combination of two or more compounds. Of these dyes and pigments as exemplified above, particularly preferred are azine dyes, as mentioned above. More specifically, typical examples of these dyes and pigments are enumerated below.

Azo dyes and pigments include the following compounds.

Exemplary monoazo and polyazo dyes are Basic Yellow 32, 34 and 36; Basic Orange 2, 32, 33 and 34; Basic Red 17, 18, 22, 23, 24, 32, 34, 38, 39 and 40; Basic Violet 26 and 28; Basic Blue 58, 59, 64, 65, 66, 67 and 68; Basic Brown 1, 4, 11 and 12; Basic Black 8; Azoic Diazo Component 4, 21, 27 and 38; Disperse Yellow 3, 4, 5, 7, 8, 23, 50, 60, 64, 66, 71, 72, 76, 78 and 79; Disperse Orange 1, 3, 5, 13, 20, 21, 30, 32, 41, 43, 45, 46, 49, 50 and 51; Disperse Red 1, 5, 7, 12, 13, 17, 43, 52, 54, 56, 58, 60, 72, 73, 74, 75, 76, 80, 82, 84, 88, 90, 97, 99, 101, 103, 113, 117, 122, 125, 126, 128 and 129; Disperse Violet 10, 24, 33, 38, 41, 43 and 96; Disperse Blue 85, 92, 94 and 106; Disperse Brown 3 and 5; Disperse Black 1, 2, 10, 26, 27, 28, 29, 30 and 31; Solvent Yellow 2, 6, 14, 15, 16, 19, 21 and 56; Solvent Orange 1, 2, 5, 6, 14 and 45; Solvent Red 1, 3, 23, 24, 25, 27 and 30; Solvent Brown 3, 5 and 20; Solvent Black 3; Pigment Yellow 1, 2, 3, 4, 5, 6, 7, 10, 11, 12, 13, 14, 15, 16, 17, 23, 65, 73 and 83; Pigment Orange 1, 2, 5, 13, 14, 15, 16, 17, 24 and 31; Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 112, 114 and 163; Pigment Blue 25; Pigment Green 10; Pigment Brown 1 and 2; Pigment Black 1; Direct Yellow 1, 8, 11, 12, 24, 26, 27, 28, 33, 44, 50, 58, 85, 86, 87, 88, 89, 98, 100 and 110; Direct Orange 1, 6, 8, 10, 26, 29, 39, 41, 49, 51, 57, 102 and 107; Direct Red 1, 2, 4, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; Direct Violet 1, 7, 9, 12, 22, 35, 51, 63, 90, 94 and 98; Direct Blue 1, 2, 6, 8, 15, 22, 25, 71, 76, 77, 78, 80, 120, 123, 158, 160, 163, 165, 168, 192, 193, 194, 195, 196, 203, 207, 225, 236, 237, 246, 248 and 249; Direct Green 1, 6, 8, 28, 30, 31, 33, 37, 59, 63, 64 and 74; Direct Brown 1A, 2, 6, 25, 27, 44, 58, 59, 101, 106, 173, 194, 195, 209, 210 and 211; Direct Black 17, 19, 22, 32, 38, 51, 56, 71, 74, 75, 77, 94, 105, 106, 107, 108, 112, 113, 117, 118, 132, 133 and 146; Acid Yellow 11, 17, 19, 23, 25, 29, 36, 38, 40, 42, 44, 49, 61, 70, 72, 75, 76, 78, 79, 110, 127, 131, 135, 141, 142, 164 and 165; Acid Orange 1, 7, 8, 10, 19, 20, 24, 28, 33, 41, 43, 45, 51, 56, 63, 64, 65, 67 and 95; Acid Red 1, 6, 8, 9, 13, 14, 18, 26, 27, 32, 35, 37, 42, 57, 75, 77, 85, 88, 89, 97, 106, 111, 114, 115, 117, 118, 119, 129, 130, 131, 133, 134, 138, 143, 145, 154, 155, 158, 168, 249, 252, 254, 257, 262, 265, 266, 274, 276, 282, 283 and 303; Acid Violet 7, 11, 97 and 106; Acid Blue 29, 60, 92, 113, 117 and 120; Acid Green 19, 20 and 48; Acid Brown 2, 4, 13, 14, 20, 53, 92, 100, 101, 236, 247, 266, 268, 276, 277, 282, 289, 301 and 302; Acid Black 1, 7, 24, 26, 29, 31, 44, 76, 77, 94, 109 and 110; Mordant Yellow 1, 3, 5, 23, 26, 30, 38 and 59; Mordant Orange 1, 4, 5, 6, 8, 29 and 37; Mordant Red 7, 9, 17, 19, 21, 26, 30, 63 and 89; Mordant Violet 5 and 44; Mordant Blue 7, 13, 44, 75 and 76; Mordant Green 11, 15, 17 and 47; Mordant Brown 1, 14, 15, 19, 21, 33, 38, 40, 52 and 87; Mordant Black 1, 3, 7, 9, 11, 17, 26, 32, 38, 43, 44, 51, 54, 65, 75, 77, 84, 85, 86 and 87; Food Yellow 3 and 4; Food Red 7 and 9;

exemplary metal complex azo dyes are Solvent Yellow 61 and 80; Solvent Orange 37, 40 and 44; Solvent Red 8, 21, 83, 84, 100, 109 and 121; Solvent Brown 37; Solvent Black 23; Acid Black 51, 52, 58, 60, 62, 63, 64, 67, 72, 107, 108, 112, 115, 118, 119, 121, 122, 123, 131, 132, 139, 140, 155, 156, 157, 158, 159 and 191; Acid Yellow 59, 98, 99, 111, 112, 114, 116, 118, 119, 128, 161, 162 and 163; Acid Orange 74, 80, 82, 85, 86, 87, 88, 122, 123 and 124; Acid Red 180, 183, 184, 186, 194, 198, 199, 209, 211, 215, 216, 217, 219, 256, 317, 318, 320, 321 and 322; Acid Violet 75 and 78; Acid Blue 151, 154, 158, 161, 166, 167, 168, 170, 171, 175, 184, 187, 192, 199, 229, 234 and 236; Acid Green 7, 12, 35, 43, 56, 57, 60, 61, 65, 73, 75, 76, 78 and 79; Acid Brown 19, 28, 30, 31, 39, 44, 45, 46, 48, 224, 225, 226, 231, 256, 257, 294, 295, 296, 297, 299 and 300; Direct Yellow 39; Direct Violet 47 and 48; Direct Blue 90, 98, 200, 201, 202 and 226; Direct Brown 95, 100, 112 and 170;

an exemplary stilbene azo dye is Direct Black 62 and exemplary thiazole azo dyes are Direct Red 9 and 11.

Anthraquinone dyes and pigments include the following compounds.

Exemplary anthraquinone derivatives are Basic Violet 25; Basic Blue 21, 22, 44, 45, 47, 54 and 60; Azoic Diazo Component 36; Vat Yellow 2, 3, 10, 20, 22 and 33; Vat Orange 13 and 15; Vat Red 10, 13, 16, 31, 35 and 52; Vat Violet 13 and 21; Vat Blue 4, 6, 8, 12, 14, 64, 66, 67 and 72; Vat Green 8, 13, 43, 44 and 45; Vat Brown 1, 3, 22, 25, 39, 41, 44, 46, 57, 68, 72 and 73; Vat Black 8, 14, 20, 25, 27, 36, 56, 59 and 60; Disperse Orange 11; Disperse Red, 4, 9, 11, 15, 53, 55, 65, 91, 92, 100, 104, 116 and 127; Disperse Violet 1, 4, 8, 23, 26, 28, 30 and 37; Disperse Blue 1, 3, 5, 6, 7, 20, 26, 27, 54, 55, 56, 60, 61, 62, 64, 72, 73, 75, 79, 81, 87, 90, 91, 97, 98, 99, 103, 104 and 105; Disperse Yellow 51; Solvent Violet 13 and 14; Solvent Blue 11, 12, 35 and 36; Solvent Green 3; Pigment Red 83 and 89; Pigment Blue 22; Acid Violet 31, 34, 35, 41, 43, 47, 48, 51, 54, 66 and 68; Acid Blue 23, 25, 27, 40, 41, 43, 45, 54, 62, 72, 78, 80, 82, 112, 126, 127, 129, 130, 131, 138, 140, 142, 143, 182, 183, 203, 204 and 205; Acid Green 25, 27, 28, 36, 40, 41 and 44; Acid Brown 27; Acid Black 48 and 50; Mordant Red 3 and 11; Mordant Blue 8 and 48; Mordant Black 13; Pigment Violet 5;

exemplary anthrone derivatives are Vat Yellow 1 and 4; Vat Orange 1, 2, 3, 4 and 9; Vat Violet 1, 9 and 10; Vat Blue 18, 19 and 20; Vat Green 1, 2, 3 and 9; Vat Black 9, 13, 29 and 57; Vat Red 13; Acid Red 80, 82 and 83.

Indigoid dyes and pigments include the following compounds.

Exemplary indigo derivatives are Vat Blue 1, 3, 5, 35 and 41; Reduced Vat Blue 1; Pigment Violet 19 and 122; Acid Blue 74 and 102; Solubilized Vat Blue 5 and 41; Solubilized Vat Black 1; Food Blue 1;

exemplary thioindigo derivatives are Vat Orange 5; Vat Red 1, 2 and 61; Vat Violet 2 and 3; Pigment Red 87 and 88; Vat Brown 3.

Phthalocyanine dyes and pigments may include, for example, Solvent Blue 55; Pigment Blue 15, 16 and 17; Pigment Green 36, 37 and 38; Direct Blue 86 and 199; Mordant Blue 58.

Carbonium dyes and pigments include the following compounds.

An exemplary diphenylmethane dye is Basic Yellow 2;

exemplary triphenylmethane dyes are Basic Red 9; Basic Violet 1, 3 and 14; Basic Blue 1, 5, 7, 19, 26, 28, 29, 40 and 41; Basic Green 1 and 4; Solvent Violet 8; Solvent Blue 2 and 73; Pigment Violet 3; Pigment Blue 1, 2 and 3; Pigment Green 1, 2 and 7; Direct Blue 41; Acid Violet 15 and 49; Acid Blue 1, 7, 9, 15, 22, 83, 90, 93, 100, 103 and 104; Acid Green 3, 9 and 16; Mordant Violet 1; Mordant Blue 1, 29 and 47; Food Violet 2; Food Blue 2; Food Green 2;

exemplary xanthene dyes are Basic Red 1; Solvent Red 49; Pigment Red 81 and 90; Pigment Violet 1, 2 and 23; Acid Red 51, 52, 87, 92 and 94; Mordant Red 15 and 27; Food Red 14;

exemplary acridine dyes are Basic Orange 14 and 15.

Quinoimine dyes include the following compounds.

Exemplary azine dyes are Basic Red 2; Basic Black 2; Solvent Black 5 and 7; Acid Blue 59; Acid Black 2;

exemplary oxiazine dyes are Basic Blue 3; Direct Blue 106 and 108;

exemplary thiazine dyes are Basic Yellow 1; Basic Blue 9, 24 and 25.

Methine dyes include the following compounds.

Exemplary polymethine (or cyanine) dyes are Basic Yellow 11, 13, 14, 19, 21, 25, 28, 33 and 35; Basic Orange 21 and 22; Basic Red 12, 13, 14, 15, 27, 29, 35, 36 and 37; Basic Violet 7, 15, 21 and 27.

Quinoline dyes may be exemplified by Basic Green 6; Disperse Yellow 54 and 56; Solvent Yellow 33; Acid Yellow 3.

Nitro dyes may be exemplified by Disperse Yellow 1, 33, 39, 42, 49 and 54; Acid Yellow 1.

Benzoquinone and naphthoquinone dyes may be exemplified by Disperse Blue 58 and 108; Acid Brown 103, 104, 106, 160, 161, 165 and 188.

Naphthalimide dyes and pigments may be exemplified by Pigment Red 123; Vat Violet 23 and 39; Acid Yellow 7.

Perinone dyes may be exemplified by Vat Orange 7 and 15.

Sulfide dyes may include, for example, Solubilized Sulfur Yellow 2; Sulfur Yellow 4; Sulfur Orange 3, Sulfur Red 2, 3, 5 and 7; Solubilized Sulfur Blue 15; Sulfur Blue 2, 3, 4, 6, 7, 9 and 13; Sulfur Green 2, 3, 6, 14 and 27; Solubilized Sulfur Brown 1 and 51; Sulfur Brown 7, 12, 15 and 31; Sulfur Black 1, 2, 5, 6, 10, 11 and 15; Vat Yellow 35, 42 and 43; Vat Blue 43 and 56.

Fluorescent dyes may include, for example, fluorescent brightening agents 14, 22, 24, 30, 32, 37, 45, 52, 54, 55, 56, 84, 85, 86, 87, 90, 91, 104, 112, 121, 134, 135, 153, 162, 163, 164, 166, 167, 168, 169, 170, 171, 172, 173, 174, 175, 176 and 177.

Azoic dyes may include, for example, Azoic Diazo Component 17, 20, 22, 24, 26, 31, 35, 41, 47, 48, 109 and 121; Azoic Coupling Component 2, 3, 4, 5, 7, 8, 10, 11, 12, 14, 15, 16, 17, 18, 19, 20, 23, 26, 28, 29, 35, 36, 37, 41 and 108; Azoic Brown 2, 7, 11 and 15; Azoic Black 1 and 5; Azoic Yellow 1 and 2; Azoic Orange 2, 3 and 7; Azoic Red 1, 2, 6, 9, 16 and 24; Azoic Violet 1, 2, 6, 7, 9 and 10; Azoic Green 1.

Reactive dyes may include, for example, Reactive Yellow 1, 2, 3, 4, 6, 7, 11, 12, 13, 14, 15, 16, 17, 18, 22, 23, 24, 25, 26, 27, 37 and 42; Reactive Orange 1, 2, 4, 5, 7, 13, 14, 15, 16, 18, 20, 23 and 24; Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64; Reactive Violet 1, 2, 4, 5, 8, 9 and 10; Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46; Reactive Green 5, 6, 7 and 8; Reactive Brown 1, 2, 5, 7, 8, 9, 10, 11, 14 and 16; Reactive Black 1, 3, 4, 5, 6, 8, 9, 10, 12, 13, 14 and 18.

Further, pigments may be exemplified by inorganic pigments such as Chrome Yellow, Zinc Yellow, ZTO type zinc chromate, red lead, iron oxide powder, zinc white, aluminum powder and zinc powder.

The "conjugated $\pi$ bond" possessed by the conjugated $\pi$ bond compound which may be used as the scaling preventive in the process of the present invention herein means two or more double bonds and/or triple bonds in conjugated relationship. And, the aromatic compounds having at least 5 conjugated $\pi$ bonds which may be used in the present invention may include benzene derivatives, naphthalene derivatives, polynuclear aromatic compounds, quinones, non-benzene type aromatic compounds, etc., having at least five conjugated $\pi$ bonds. On the other hand, the heterocyclic compounds having at least $5\pi$ bonds may include, for example, oxygen-containing heterocyclic compounds, nitrogen-containing heterocyclic compounds, sulfur-containing heterocyclic compounds, bicyclic compounds having a nitrogen atom in common, alkaroids, etc., having at least 5 conjugated $\pi$ bonds. Specific examples of these compounds are enumerated below.

The aromatic compounds having at least 5 bonds include the following compounds.

First, as benzene derivatives, there may be included:

phenols and derivatives thereof, such as 2,6-ditert-butylphenylphenol, catecholphthalein, 2,2-diphenylolpropane, 3,7-dioxy-10-methylxanthene, phenolphthalein, 7-oxy-2,4-dimethylbenzopyrooxonium chloride, oxyanthraquinone, purpurogallin, Gallein, diphenylether, α-methoxyphenazine, chloroglucide, 2,3-dioxyanthraquinone, 5,7-dioxy-4-methylcoumarine, dioxyacridone, salicylic acid, α-hydrindone, β-phenylbutyrophenyl, N-2,4-dinitrophenyl-N-phenylhydroxylamine, 1-(4-nitrophenyl)-3,5-dimethylpyrazole, 9,10-diphenylphenanthrene, acetophenone;

aromatic amines and derivatives thereof, such as N-phenyl-p-benzoquinonediamine, quinoline, Safranine B, Rosaniline, Indiurine Spirit Soluble, Aniline Black, Para-Rosaniline, Methyl Violet, Methyl Orange, Methyl Red, Indigo, carbazole, Methylene Blue, o-phenanthroline, p-phenanthroline, 3,6-diaminoacridine, Indanthrene Scarlet 2G, 4-aminodiphenylamine, Acridine Yellow, 3-aminophenothiazine, N'-diphenyl-p-phenylenediamine, Rhodamine, 7-amino-4-methylcoumarine, 2-aminophenazine, phenothiazine, diphenylamine, N-methylphenylamine, N-phenyltolylamine, ditolylamine, 2-oxy-4-methylquinoline, Hansa Yellow G, N,N'-diphenylformamidine, phenanthrophenazine, Bismarck Brown G, 2,3-diaminophenazine, 2-aminodiphenylamine, Chrysodine R, 2,3,7,8-tetraaminophenazine, aminophenoxazone, oxyphenoxazone, Triphenylenedioxazine, 2,4-dinitrophenoxazine, 2',4'-dinitro-4-oxy-3-aminophenylamine;

nitro and nitroso derivatives, such as p-nitrosodiphenylhydroxylamine, phenazine, phenazine oxide, 1-phenylazo-2-naphthol, 4-nitroxanthone, 4'-nitroso-2-nitrodiphenylamine;

phenylhydroxylamine derivatives, such as 4,4'-dinitrodiphenylamine, oxalic acid bis(β-phenylhydrazine), malonic acid bis(β-phenylhydrazine), succinic acid bis(β-phenylhydrazine), phthalic acid bis(β-phenylhydrazine);

aromatic halides, such as biphenyl chloride;

aromatic aldehydes, such as 2-phenyl-1-benzyl-benzimidazole, Leucomalachite Green, Malachite Green, tetrachlorohydroquinone monobenzoate, benzoflavin, 2-phenylbenzthiazole, 4-benzhydrylbenzaldehyde, bisphenylhydrazone, bis(4-nitrophenylhydrazone);

aromatic ketones such as triphenylisooxazole, benzophenone potassium, 4-methylbenzophenone, p-toluyl acid anilide, benzoic acid toluidide, duryl phenyl ketone, 2,4,2',4'-tetramethylbenzophenone, calchonphenylhydrazone, 1,3,5-triphenylpyrazoline, dinitrobenzyl;

benzoic acids, phthalic acids and derivatives thereof, such as quinizaline, nitrodiphenylether;

benzene derivatives having further one substituent other than aldehyde group, such as disalicylaldehyde, coumarine, 2-benzoylcoumarone, 1-oxy-2,4-dimethylfluorone, 3-phenylcoumarone, ethyl coumarine-3-carboxylate, 3-acetylcoumarine, hydrovaniloin, 4-oxy-3-methoxy-ω-nitrostyrene, α-(nitrophenyl)-β-benzoylethyleneoxide, dinitrophenylindazole, 5-chloro-3-(4-oxyphenyl)anthramil, 3-nitroacridone, 6-nitro-3-phenylanthramil, 2,8-dimethyl-1,9-anthrazoline, carboxtyrin, 1,3-dioxyacridine, oxyquinacdine, Phlorchinyl, 2-methylquinazoline, 3-acetyl-2-methylquinoline, 2-oxy-3-phenylquinoline, 3-nitroquinoline, quinoline-2,3-dicarboxylic acid ester;

benzene derivatives having further one substituent other than acyl group, such as 7-oxyflavanone, 7-oxyflavone, 7,8-dioxyflavone, 7-acetoxy-4-methyl-3-phenylcoumarine, 7,8-diacetoxy-4-methyl-3-phenylcoumarine, o-oxybenzophenone, xanthone, 2-phenylbenzooxazole, m-oxybenzophenone, p-oxybenzophenone, 2-benzoylxanthone, 2,4-dioxybenzophenone, 2,5-dioxybenzophenone, 2,2'-dioxybenzophenone, xanthene, aurin, trioxybenzophenone, 6,7-dimethoxy-3-phenylcoumarone, 0-nitrobenzophenone, m-nitrobenzophenone, 4,4'-dibenzoylazoxybenzene, 2-(2-aminophenyl)-4-methylquinone, 2-oxy-4-methylquinone, acridone, 2,4-dimethylquinazoline, 3-cyan-2-oxy-4-methylquinoline, fluorene, anhydro(2-aminobenzophenone) dimer, 2-oxy-3-phenylindazole, 3-phenylindazole, 2-phenylbenzimidazole, 2-methyl-8-benzoylquinoline, 2-methyl-4-phenylquinoline, 4-phenyl-2-quinazolone, aminobenzophenone, chlorobenzophenone, 4-phenylbenzo-1,2,3-triazine-3-oxide, diaminobenzophenone, 7-methyl-3-phenyl-4,5-benzo-1,2,6-oxydiazine, 4,4'-bisdimethylaminobenzophenone, 4,4'-bisdimethylaminobenzophenonemide, 2,4-dinitro-9-phenylacridine, 4,4'-dibenzoyldiphenyl;

benzene, toluene derivatives having three or more different substituents, such as tetramethoxyindigo, 5,6,5',6'-bismethylenedioxyindigo, 7-acetoxy-8-methoxy-3-(2-nitrophenyl)carbostyryl, 2,2'-dinitrodiphenyldisulfide-4,4'-dialdehyde, 6-chloro-3-benzoylflavone, 1,3,8-trinitrophenoxazine;

aralkyl compounds, such as 9-benzylacridine;

diazo compounds and azo compounds, such as azobenzene, azotoluene, 2,2-dimethoxyazobenzene, 4,4'-dichloroazobenzene, 1,1'-azonaphthalene, 2,2'-dioxyazobenzene, 2,2'-dioxy-5,5'-dimethylazobenzene, p-bromoazobenzene, p-nitroazobenzene, phenoazoxide;

aromatic unsaturated compounds, such as 2,3,4,5-tetraphenylcyclopentane-2-ene-1-one, 1,2,3-triphenyleneazulene, 2,2'-dimethyldiphenylacetylene, 4,4'-diethyldiphenylacetylene, 3,4,3',4'-tetramethyldiphenylacetylene, 2,2'-dichlorodiphenylacetylene, 2,2'-dibromodiphenylacetylene, 2-nitrodiphenylacetylene, 2,2'-dinitrodiphenylacetylene, 2,2'-diaminodiphenylacetylene, 2,2'-dimethoxy-diphenylacetylene, stilbene, α-methylstilbene, α-ethylstilbene, α,β-dimethylstilbene, α,β-diethylstilbene, α,β-dichlorostilbene, α,β-dibromostilbene, 2-chlorostilbene, 4,4'-diiodostilbene, α-nitrostilbene, α,β-dinitrostilbene, 2,4,6-trinitrostilbene, 2-aminostilbene, 2,2'-diaminostilbene, 4,4'-di(dimethylamino)stilbene, 2,2'-dicyanstilbene, 2-oxystilbene, 2-methoxystilbene, 2,2'-dioxystilbene, 2,2'-dimethoxystilbene, 4,4'-dialkoxystilbene, 3,5,2',4'-tetraoxystilbene; and polyphenyls and derivatives thereof, such as biphenyl, terphenyl, quaterphenyl, quinophenyl, sexiphenyl, septiphenyl, octiphenyl, noviphenyl, deciphenyl, etc.

Next, as naphthalene derivatives, there may be included:

alkyl, alkenyl and phenylnaphthalenes, such as 1-methylnaphthalene, 2-methylnaphthalene, 1-ethylnaphthalene, 2-ethylnaphthalene, 1,2-dimethylnaphthalene, 1,4-dimethylnaphthalene, 1,5-dimethylnaphthalene, 1,6-dimethylnaphthalene, 1,7-dimethylnaphthalene, 2,3-dimethylnaphthalene, 2,6-dimethylnaphthalene, 2,7-dimethylnaphthalene, 1-propylnaphthalene, 1-isopropylnaphthalene, 2-isopropylnaphthalene, trimethylnaphthalene, diisopropylnaphthalene, 1-vinylnaphthalene, 2-vinylnaphthalene, 1-propenylnaphthalene, 1-allylnaphthalene, 1-isopropenylnaphthalene, 2-isopropenylnaphthalene, 1-phenylnaphthalene, 2-phenylnaphthalene, 1,4-diphenylnaphthalene, 1,2,4-triphenylnaphthalene;

dinaphthyls, such as 1,1'-dinaphthyl, 1,2'-dinaphthyl, 2,2'-dinaphthyl;

naphthylarylmethanes, such as 1-benzylnaphthalene, 2-benzylnaphthalene, 1-(α-chlorobenzyl)naphthalene, 1-(α,α-dichlorobenzyl)naphthalene, diphenyl-α-naphthylmethane, diphenyl-β-naphthylmethane, 1,8-dibenzylnaphthalene, di-α-naphthylmethane, α-naphthyl-β-naphthylmethane, di-β-naphthylmethane;

naphthylarylethanes, such as 1-phenethylnaphthalene, 1,2-di-α-naphthylethane, 1,2-di-β-naphthylethane, 1,1-α-dinaphthylethane;

hydronaphthalenes such as 1,2-dihydronaphthalenes, 1,4-dihydronaphthalene, 1,2,3,4-tetrahydronaphthalene;

nitronaphthalenes and derivatives thereof, such as dinaphthylpyridazine, 7,8-benzoquinone, 5,6-benzoquinone, naphthazarine, diperimidine, nitromethylnaphthalene, nitromethylnaphthalene, nitrophenylnaphthalene, halo-nitronaphthalene, halo-dinitronaphthalene, nitrosonaphthalene, dinitrotetraline, dibenzophenazine, methylbenzoindole, 9-chloro-1-azaanthracene, quinolinoquinoline, 1,2,3-triazaphenarene, perimidone, perimidine, dibenzoacridine, benzophenazine-12-oxide, diaminonaphthalene, triaminonaphthalene, tetraaminonaphthalene, N-ethyl-α-naphthylamine, N-methylnaphthylamine, N,N-dimethylnaphthylamine, N-methyl-N-ethylnaphthylamine, N-methyl-N-ethylnaphthylamine, trimethylnaphthyl ammonium salt, N-phenylnaphthylamine, N-benzylnaphthylamine, N-naphthylethylenediamine, N-naphthylglycine, N-β-cyanomethylnaphthylamine, N-acetylnaphthylamine, N-formylnaphthylamine, N-benzoylnaphthylamine, N-phthaloylnaphthylamine, aminomethylnaphthalene, nitronaphthylamine, dinitronaphthylamine, halo-nitronaphthylamine, aminotetraline, diaminotetraline;

halogenated naphthalenes, such as 1-fluoronaphthalene, 1-chloronaphthalene, 1-chloro-3,4-dihydronaphthalene, 1-iodonaphthalene, 1-bromonaphthalene, 1-chloro-4-chloromethylnaphthalene, 1-bromo-2-

(bromomethyl)naphthalene, 1,4-difluoronaphthalene, 1,2-dichloronaphthalene, 1,6-dichloronaphthalene, 1,7-dichloronaphthalene, 1,5-dichloronaphthalene, 1,8-dichloronaphthalene, 2,3-dichloronaphthalene, 1,4-dibromonaphthalene, 1,4-diiodonaphthalene, perylene, 1,2,3-trichloronaphthalene, 1,2,4-tribromonaphthalene, 1,2,3,4-tetrachloronaphthalene, 1,4,5-tribromo-3,8-dimethylnaphthalene, 1,3,6,7-tetrachloronaphthalene, 1,3,5,8-tetrabromonaphthalene, 1,2,3,4,5-pentachloronaphthalene;

naphthylhydroxylamines, naphthylpyrazines and naphthylureas, such as α-naphthylhydroxylamine, N'-phenyl-N-α-naphthyl-N-oxyurea, β-naphthylthiohydroxylamine, N-nitroso-α-naphthylhydroxylamine, Neocupferron, 2-oxy-1,1'-azonaphthalene, α-naphthylhydrazine, 1,2-dibenzocarbazole, 4,4-diamino-1,1'-binaphthyl, 3,4-benzocarbazole, 2,2'-diamino-1,1'-binaphthyl, N'-acetyl-N-β-naphthylhydrazine, N'-lauroyl-N-β-naphthylhydrazine, N'-phenyl-N-α-naphthylhydrazine, N'-(2,4-dinitrophenyl)-N-α-naphthylhydrazine, 2-α-naphthyl-5-nitrobenztriazole, N,N'-di-α-naphthyldrazine, 1,1'-diamino-2,2'-binaphthyl, N,N'-di-5-tetralylhydrazine, N'-(2,4-dinitrophenyl)-N-β-naphthylhydrazine, 2-β-naphthyl-5-nitrobenztriazole, N'-triphenylmethyl-N-β-naphthylhydrazine, N,N'-di-β-naphthylhydrazine, N-methyl-N-(2,4-dinitro-1-naphthyl)hydrazine, 2-amino(naphtho-1',2'-:4,5-thiazole), 1,2:5,6-dibenzophenazine, 2-amino-(naphtho-2',1':4,5-thiazole), 2,3-dihydrazinonaphthalene, 2-phenyl-1,3-bisbenzylideneamino(naphtho-2',3':4,5-imidazoline), N-acetyl-α-naphthylnitrosoamine, N-ethyl-α-naphtylnitrosoamine, N-phenyl-α-naphthylnitrosoamine, α,α'-dinaphthylnitrosoamine, succinic acid bis(β-naphthylnitrosoamide), N-ethyl-β-naphthylnitrosoamine, N-phenyl-β-naphthylnitrosoamine, N-acetyl-2-methyl-1-naphthylnitrosoamine, 4,5-benzindazole, naphthylnitrosoamine, 1-nitro-2-naphthylamine, α-naphthylurea, N,N'-di-α-naphthylurea, 4-chloro-1-naphthylcarbamoylchloride, 2,4'-dichloro[naphtho-1',2':4,5-thiazole], 2-mercapto[naphtho-1',2'-:4,5-thiazole], 2-chloro[naphtho-1',2':4,5-thiazole], 2-mercapto[naphtho-2',1':4,5-thiazole], 2-chloro[naphtho-2',1':4,5-thiazole];

naphthalene type aralkyl compounds, such as dibenzoanthracene, acenaphthene, α-chloroethylnaphthalene, phenylnaphthylchloromethane, diphenylnaphthylchloromethane, nitromethylnaphthalene, aminomethylnaphthalene, (naphthylemethyl)amine, α-phenyl(-naphthylmethyl)amine, N-benzyl(naphthylmethyl)amine, trimethyl(naphthylmethyl)ammonium salt, tri(-naphthylmethyl)amine, di(naphthylmethyl)amine, (β-naphthylethyl)alcohol, dimethylnaphthylcarbinol, phenylnaphthylcarbinol, diphenylnaphthylcarbinol, 9-phenylbenzofluorene, naphthylpropyleneoxide, ethyl(-naphthylmethyl)ether, phenyl(naphthylmethyl)ether, naphthylacetaldehyde, naphthylacetone, ω-naphthylacetophenone, acenaphthenone, dihydrophenarone, phenarone, benzoindanone, naphthylacetonitrile, 9,9'-dichlorodibenzofluorene, α-nitro-β-naphthylethylene, γ-naphthylallyl alcohol, β-naphthylacrolein, methyl(β-naphthylvinyl)ketone, naphthylphenanthrene dicarboxylic acid anhydride;

naphthol, naphthalenesulfonic acids, such as 9-oxynaphtacenequinone, 2'-naphthalene-2-indoleindigo, 1-methoxynaphthalene, 1-ethoxynaphthalene, 1-phenoxynaphthalene, α-naphtholsalicylic acid ester, β-naphthol, α-naphthol, α-naphtholbenzoic acid ester, α-naphtholacetic acid ester, phenyl-β-oxynaphthylbenzaliminomethane, β-naphtholphenylmethylamine, methylene-di-β-naphthol, dinaphthopyrane, 1'-naphthol-2-indoleindigo, 2-methoxynaphthalene, 2-ethoxynaphthalene, N-p-oxyphenyl-2-naphthylamine base, β-naphtholsalicylic acid ester, 2-methyl-1-naphthol, 1,2-naphthamethylenequinone, 1,2-dioxynaphthalene, naphthaleneindoleindigo, α,β-naphthophenoxazine, β,γ-naphthophenoxazine, 4-oxy-10-methyl-1',2'-benzocarbazole, dioxynaphthfluorane, dinaphthoquinone, 2,6-naphthoquinone, oxybenzoacridine, 9-oxy-3-dimethylaminonaphthophenoxazine, 1,2,4-trioxynaphthalene, 1,4,5,6-tetraoxynaphthalene, thio-α-naphthol, 4-mercapto-1-naphthol, 1,5-naphthalenedithiol, methyl-α-naphthyl sulfide, 1,1'-naphthyl sulfide, 1,1'-thiodi-2-naphthol, 1,1'-naphthyl disulfide 1,1'-thiodi-1-naphthol, thio-β-naphthol, naphthothioindigo, 1-amino-2-naphthalenethiol, naphthothianthrene, 2-mercapto-1,2-naphthothiazole;

naphthoaldehydes and derivatives thereof, such as α-naphthoaldehyde, 2-(2,4-dinitrophenyl)-1-(α-naphthyl)ethylene, 2-methyl-1-naphthoaldehyde, 2,3-dimethyl-1-naphthoaldehyde, 4-bromo-1-naphthoaldehyde, 4-nitro-1-naphthoaldehydes, 2,4-dinitro-1-naphthoaldehyde, 4-amino-1-naphthoaldehyde, 2-oxy-1-naphthoaldehyde, 1-naphthalene-2'-indoleindigo, 1,2-bis(2-oxy-1-naphthyl)ethylene, 1,2:7,8-dibenzoxanthilium chloride, 2-oxy-1-naphthylethenyl pyrylium salt, 5,6-benzocoumarin, bis(2-methyl-3-indolyl)(2-oxy-1-naphthyl)methane, 4,5-benzindoxazene, 2-acetoxy-1-naphthonitrile, 4-methoxy-1-naphthoaldehyde, 1,4-bis(4-methoxy-1-naphthyl)-1,3-butadiene, 2-naphthalene-2'-indoleindigo, 3-acetyl-6,7-benzocoumarin, 4-chloro-1-oxy-2-naphthoaldehyde, naphthalenedialdehyde, 5-oxy-2-naphthaleneindoleindigo, 5,6,7,8-tetrahydro-2-naphthoaldehyde, imide chloride, naphthoamide, naphthoanilide, naphthonitrile, ethyl β-naphthoimidate, β-naphthamidine, α-naphthoamidoxime, α-naphthohydrazide, naphthostyryl, oxynaphthonitrile, 1,2:7,8-dibenzoxanthone, 1,2-benzoxanthone, 1,1'-binaphthylene-2,8';8,2'-dioxide, 2,3;6,7-dibenzoxanthone, 3-oxy-2-naphthoanilide, 1,3-bis(3-oxy-2-naphthoyloxy)benzene, 2,4-dioxyphenyl-3-oxy-2-naphthyl ketone, 4-arylazo-3-oxy-2-naphthoanilide, 3,4-dihydronaphthalene-1,2-dicarboxylic acid anhydride, 2-aminonaphthalimide, naphthalohydrazide, α-pyridonaphthalone, N-methylnaphthalimide; and acetonaphthenes, benzoylnaphthenes, such as 1,2:5,6-dibenzanthracene, 2'-methyl-2,1'-dinaphthyl ketone, 2-methyl-1,1'-dinaphthyl ketone, styryl-2-naphthyl ketone, β-naphthoyl acetone, β-naphthoylacetophenone, 1-(β-naphthyl)-1-chloroethylene, 2-[tris(β-cyanoethyl)acetyl]naphthalene, 1,3,5-tris(β-naphthyl)benzene, dimethyl-2-naphthylcarbinol, 4,5:4',5'-dibenzothioindigo, styryl-1-naphthyl ketone, β-acetonaphthone, 1-propionylnaphthalene, 1-butylnaphthalene, 1-isobutylnaphthalene, 1-stearoylnaphthalene, 1-benzoylnaphthalene, 1-o-toluylnaphthalene, p-biphenyl-1-naphthyl ketone, 1,2,5,6-dibenzanthracene, 1-acetyl-3,4-dihydronaphthalene, 1-acetyl-7-bromonaphthalene, 1-aminoacetylnaphthalene, 2-aminobenzoylnaphthalene, 1-acetyl-2-oxynaphthalene, 1-acetyl-2-methoxynaphthalene, 1-acetyl-4-ethoxynaphthalene, 2-cinnamoyl-1-naphthol, 7,8-benzochromone, 3-acetyl-2-methyl-7,8-benzochromone, 3,4-dimethyl-7,8-benzocoumarin, 4-methyl-3-phenyl-7,8-benzocoumarin, 1-benzoyl-2-oxynaphthalene, 4-oxybenzanthrone, 4-benzoyl-1-naphthol, 3-oxy-1,2-benzofluorenone, 2-acetyl-4-chloro-1-oxynaphthalene, α-naphthylglyoxal, β-naphthylglyoxal, 1,4-dibenzoylnaphthalene, phenyl-4-methyl-1-naphthyldiketone, and the like.

Also, as the polynuclear aromatic compounds, there may be included:

anthracenes and derivatives thereof, such as anthracene, 1,2-dihydoanthracene, 1-chloroanthracene, 1,4-dichloroanthracene, 1,2,7-trichloranthracene, 1,2,3,4-tetrachloroanthracene, 1-nitroanthracene, 9,10-dinitroanthracene, 1-aminoanthracene, 2-dimethylaminoanthracene, 2-anilinoanthracene, 9-methylaminoanthracene, 1,4-diaminoanthracene, 1-oxyanthracene, 9,10-dihydroanthrol, 10-methylanthranol, 10-phenylanthranol, 10-nitroanthranol, 2-amino-1-anthranol, 1,2-dioxyanthracene, 9,10-dioxyanthracene diacetate, 1-methylanthracene, 4-chloro-1-methylanthracene, 1,5-dichloro-2-methylanthracene, 9-ethylanthracene, 9-vinylanthracene, 9-propylanthracene, 9-isopropylanthracene, 9-butylanthracene, 9-isobutylanthracene, 9-isoamylanthracene, 1,3-dimethylanthracene, 9,10-diethylanthracene, 1-phenylanthracene, 9-phenylanthracene, 1,5-dichloro-9-phenylanthracene, 10-nitro-9-phenylanthracene, 9-benzylanthracene, 1-benzhydrylanthracene, 9,10-diphenylanthracene, 9,10-dibenzylanthracene, 9,10-diphenyl-9,10-dihydroanthracene, 1-($\beta$-naphthyl)anthracene, 9-($\alpha$-naphthyl)-10-phenylanthracene, 9,10-di($\alpha$-naphthyl)anthracene, 1,1'-bianthryl, 2,2'-bianthryl, 9,9'-bianthryl, anthracene-9-aldehyde, 1-acetylanthracene, 9-benzoylanthracene, 10-nitroanthraphenone, 9,10-dibenzoylanthracene, anthrone, 9-mercaptoanthracene, 9,10-disodium-9,10-dihydroanthracene, 10-bromo-9-anthrylmagnesium bromide, Anthryl-mercury chloride;

phenanthrenes and derivatives thereof, such as phenanthrene, 9,10-dihydrophenanthrene, 1,2,3,4-tetrahydrophenanthrene, 1-chlorophenanthrene, phenanthrene-9,10-dichloride, 1-bromophenanthrene, 1-iodophenanthrene, 9-(chloromethyl)phenanthrene, 1-(bromomethyl)phenanthrene, 4,5-bis(bromomethyl)phenanthrene, 1-nitrophenanthrene, 10-bromo-9-nitrophenanthrene, 1-aminophenanthrene, 9,10-diaminophenanthrene, 9,9'-azoxyphenanthrene, 9,9'-azophenanthrene, 1-oxyphenanthrene, cholesterol, estrone, androsterone, 10-bromo-9-phenanthrol, 9-nitro-3-phenanthrol, 4-amino-1-phenanthrol, 10-benzoazo-9-phenanthrol, 1,2-dioxyphenanthrene, retene-3,8-diol, 2,3,5,6-tetraoxyphenanthrene, 1-methylphenanthrene, 1-ethylphenanthrene, 1-vinylphenanthrene, 1,2-dimethylphenanthrene, 9,10-diethylphenanthrene, 9,10-dipropylphenanthrene, 2-ethyl-1-methylphenanthrene, 7-isopropyl-1-methylphenanthrene, 9,10-dihydroretene, aminoretene, 3-acetoaminoretene, 6-acylaminoretene, 9-phenylphenanthrene, 9-benzylphenanthrene, 1-($\alpha$-naphthyl)phenanthrene, 1,1'-biphenanthryl, 9,9'-biphenanthryl, 1-phenanthraldehyde, 2-phenanthraldehyde, 9-phenanthraldehyde, 1-acetylphenanthrene, 2-propionylphenanthrene, 3-acetylretene, 1-benzoylphenanthrene;

phenanthrenequinones, such as phenanthrene-1,2-quinone, phenanthrene-1,4-quinone, phenanthrene-3,4-quinone, phenanthrene-9,10-quinone, 2-phenyl-3-acetoxy-4,5-biphenylfuran, 7-isopropyl-1-methylphenanthrenequinone, 1-chlorophenanthrenequinone, 2-bromophenanthrenequinone, 2-iodophenanthrenequinone, 2,7-dibromophenanthrenequinone, 2-nitrophenanthrenequinone, 2,5-dinitrophenanthrenequinone, 2-aminophenanthrenequinone, 2,7-diaminophenanthrenequinone, 3,6-diaminophenanthrenequinone, 2,5-diaminophenanthrenequinone, 2-oxyphenanthrene-1,4-quinone, 3-oxyphenanthrenequinone, 2-oxyretenequinone, 3-oxyretenequinone, 6-oxyretenequinone, 2-oxy-3,4-dinitrophenanthrenequinone, 2-amino-3-oxyphenanthrenequinone; and polynuclear aromatic compounds and derivatives thereof, such as pentacene, hexacene, benzophenanthrene, benzo[a]anthracene, naphtho[2,1,a]pyrene, dibenzo[a,j]anthracene, pyrene, coronene, 1,12-benzopyrene, ovalene, dibenzoanthracene, naphthacene, Terramycin, Aureomycin, rubrene, o-toluoyl-1-naphthalene, benzoanthraquinone, 5,6-dioxy-5,6-dihydrobenzoanthracene, chrysene, triphenylene, dibenzonaphthacene, hexahydropyrene, perylene, 3,9-dichlorperylene, tetrachloroperylene, 3,9-dibromoperylene, 3,10-dinitroperylene, 4,6-dibenzoyl-1,3-dimethylbenzene, 6,13-dihydropentacene, naphtho[2,3a]anthracene, dispirane, dibenzo[a,h]anthracene, picene, picyleneketone, picene-5,6-quinone, dibenzo[c,g]phenanthrene, benzo[a]pyrene, benzo[a]pyrene-1,6-quinone, mesobenzoanthrone pericarboxylic acid anhydride, anthraceno[2,1-a]anthracene, dibenzo[a,l]naphthacene, phenanthrene[2,3-a]anthracene, naphtho[2,3-a]pyrene, dibenzo[a,h]pyrene, dibenzo[a,l]pyrene, zethrene, anthanthrene, benzo[1,12]perylene, heptacene, tetrabenzo[a,c,h,j]anthracene, tribenzo[a,i,l]pyrene, tetrahydrodimethyldinaphthyl, mesonaphthodianthrene, mesoanthrodianthrene, 2,3:8,9-dibenzocoronene, pyranthrene, and the like.

As quinones and derivatives thereof, there may be included:

benzoquinones and derivatives thereof, such as dibenzoquinoyl disulfide, 2,5-bis(phenylthio)-p-benzoquinone, bibenzoquinone, bitoluquinone, phoenicin, Oosporein, indophenol, indoaniline, Hydron Blue, indamine, Meldola's Blue, Wurster's Blue, Wurster's Red, 4,4'-diphenoquinone, 4,4'-stilbenequinone, 3,5,3',5'-tetramethyl-4,4'-diphenoquinone, 3,5,3',5'-tetra-tert-butyl-4,4'-diphenoquinone, 3,5,3',5'-tetramethyl-4,4'-stilbenequinone, 3,5,3',5'-tetra-tert-butyl-4,4'-stilbenequinone;

naphthoquinones and derivatives thereof, such as 1,2-naphthoquinone, 3-oxy-2,2'-binaphthyl-1,4;3',4'-diquinone, 5,6-benzoquinoxaline, 1,2-benzophenazine, 2-benzoazo-1-naphthol, 4-(2,4-dioxyphenyl)-1,2-dioxynaphthalene, 4-(3,4,5-trioxyphenyl)-1,2-dioxynaphthalene, 1,2-naphthoquinone-1-phenylimide, 1,2-benzophenoxazine, 1,2-naphthoquinone-2-chloroimide, 1,2-naphthoquinone-bis-chloroimide, 2-anilino-1,4-naphthoquinone-4-anil, 2-oxy-1,4-naphthoquinone-4-anil, 1,2-naphthoquinone-1-oxime benzoate, 1,2-naphthoquinone-1-oxime methyl ether, 1-nitroso-2-naphthol, 2-nitroso-1-naphthol, naphtho[1',2':3,4]furazane, 1,2-naphthoquinone-2-oxime benzoate, 1,2-naphthoquinone-2-oxime methyl ether, 3-anilino-1,2;8,9-dibenzophenazine, Naphthyl Blue, Naphthyl Violet, 1,2;5,6-dibenzophenazine, naphtho[1',2':3,4]furazane-2-oxide, triphthaloylbenzene, hexaoxynaphthalene anhydride, 2,2'-binaphthyl-1,4;1',4'-diquinone, 1',4'-dioxynaphtho(2',3':3,4)pyrazole, 4,7-dioxy-3,3-diphenyl-5,6-benzindiazene, 2-diphenylmethyl-1,4-naphthoquinone, methylnaphtho[2',3':4,5]triazole-1',4'-quinone, 1,2,4-triacetoxynaphthalene, 1,4-naphthoquinonephenylimide, 1,4-naphthoquinone-mono(p-dimethylaminoanil), 1,4-naphthoquinonealkylimide, 4-nitroso-1-naphthol, phenylcarbamate, 4-nitroso-1-naphthylamine, 4-benzhydryl-1,2-naphthoquinone, 2-benzhydryl-1,4-naphthoquinone, 3-benzhydryl-2-methyl-1,4-naphthoquinone, 3-geranyl-2-methyl-1,4-naphthoquinone, 3-farnesyl-2-methyl-1,4-naphthoquinone, 2-methyl-3-phytyl- 1,4-naphthoquinone, Vitamin K1, Vitamin K2, 3-allyl-2,6-dimethyl-1,4-naphthoquinone, 2,6-dimethyl-3-phytyl-1,4-naphthoquinone, 2,3-diallyl-6,7-dimethyl-1,4-naphthoquinone, 2-phenyl-1,4-naphthoquinone, 2-methyl-1,4-naphthoquinone, 2,6-dimethyl-3-phenyl-1,4-naphthoquinone, 3-benzyl-2-methyl-1,4-naphthoquinone, 2-methyl-3-($\beta$-phenylethyl)-1,4-naphthoquinone, 3-cinnamyl-2-methyl-1,4-naphthoquinone, 2-benzhydryl-1,4-naphthoquinone, 4,7-diketo-8-diphenylmethyl-4,7,8,9-tetrahydro-5,6-benzindiazene, 2-methyl-3-diphenylmethyl-1,4-naphthoquinone, 2,3-diphenyl-1-naphthol, naphtho[2',3':3,4]-pyrazole-1',4'-quinone, 3,4-dichloro-1,2-benzophenazine, 2-iodo-1,4-naphthoquinone, 1,4,5,8-tetraoxy-2,3;6,7-dibenzothianthrene, 5,8-dioxy-2,3;6,7-dibenzothianthrene-1,4-quinone, 2,3-dinaphenoxy-1,4-naphthoquinone, dinaphtho[2',3':2,3][1'',2'':5,4]furan-1',4'-quinone, 2,3,5,8-tetrachloro-1,4-naphthoquinone, N,N'-bis-(1,4-naphthoquinone-2-yl)-benzidine, 2-anilino-1,4-naphthoquinone-4-anil, 4-anilino-1,2-naphthoquinone-2-anil, phenylrosindarine, 2-anilino-1,4-naphthoquinone-4-(p-dimethylaminoanil), 2-anilino-1,4-naphthoquinonedianil, 2-anilino-3-phenyl-1,4-naphthoquinone, 2-anilino-3-bromo-1,4-naphthoquinone, 2-anilino-4-chloro-1,4-naphthoquinone, 2,3-dianilino-1,4-naphthoquinone, 2,3-dianilino-1,4-naphthoquinonedianil, nitrosoaminonaphthoquinone, 3-chloro-2-phenylnitrosoamino-1,4-naphthoquinone, phenyl-bis-(3-anilino-1,4-naphthoquinone-2-yl)amine, 3-chloro-2-(p-tolylnitrosoamino)-1,4-naphthoquinone, 2,7-dioxy-1-nitrosonaphthalene, 4-benzeneazo-1,3-dioxynaphthalene, di-(3-oxy-1,4-naphthoquinonyl-2-)-methane, anhydroalkannin, diquinoxalino[2',3':1,2:2'',3'':3,4]-naphthalene, 3,4-phthaloylfurazane; and anthraquinones and derivatives thereof, such as 1,2-anthraquinone, 2,3-anthraquinone, 1,4-anthraquinone, 9,10-anthraquinone, 1,5-anthraquinone, 2,6-anthraquinone, 1,10-anthraquinone, 9,9-bis(p-oxyphenyl)anthrone, anthraquinone bisdiphenylmethide, bisphenylhydrazone, benzanthrone, anthrahydroquinone, $\beta$-ethylanthraquinone, 1,3,5,7-tetramethylanthraquinone, 2,2'-dianthraquinonylethane, 2,2'-dianthraquinonylethylene, 1,2,3-trioxyanthraquinone, anthrachrysone, erythrooxyanthraquinone, alizarin, quinizarin, anthrarufin, chrysazin, hystazarin, anthraflavin, isoanthraflavin, anthragallol, purprin, oxyanthrarufin, anthrapurpin, oxychrysazin, oxyflavopurpurin, Rufiopin, quinazarin, alizarinpentacyanine, rufigallol, Anthracene Blue WR, alizarinhexacyanine, 2-chloroquiniazrin, 1-nitroanthraquinone, 2,4,6,8-tetrabromoanthrachrysone, 3-aminoanthrapurpurin, 1,8-dinitroanthraquinone, $\alpha$-aminoanthraquinone, 1,1'-dianthraquinonyl, dianthraquinoneimide, 1,4-dimethylaminoanthraquinone, 5-amino-1-nitro-6,8-dibromoanthraquinone, 1,5-tetramethyldiamino-4,8-dinitroanthraquinone, anthraquinoneacridone, bis-N-(2-oxyanthraquinolyl)-p-phenylenediamine, leucoquinazarin, Quinazarin Green, 1-amino-2,4-dibromoanthraquinone, 1,4-diacylaminoanthraquinone, anthraquinone-$\beta$-aldehyde, o-diazine, 6,7-phthaloyl-1,9-benzanthrone, oxynitrosoanthraquinone, 1,1'-dianthraquinolyl, azoxyanthraquinone, 8-chloropyrazoleanthrone, 2,6-dihydrazinoanthraquinone, anthraquinone diazonium salt, $\beta$-anthraquinonehydrazine, azoxyanthraquinone, pyrazoleanthrone, 1-(anthraquin-2-yl)-3-methylpyrazolone, 1-hydroxylaminoanthraquinone, 1,5-dihydroxylaminoanthraquinone, 1-nitrosoanthraquinone, 1-hydrazinoanthraquinone, 1,5-dihydrazinoanthraquinone, 1-azidoanthraquinone, 2-azidoanthraquinone, anthraquinonemethylsulfoxide, 1,4-dirhodaneanthraquinone, $\beta,\beta'$-dianthraquinolyl sulfide, anthraquinonesulphenyl chloride, 2,2'-dianthraquinonyl, 1,1'-dianthraquinonyl, helianthrone, mesobenzodianthrone, 2,2'-diamino-1,1'-dianthraquinolyl, flavanthrone, 2,2'-dianthryl, mesonaphthodianthrone, 1,1'-dianthraquinolylamine, quinizarinquinone, hystazarinquinone, alizarinquinone, 6-oxyquinizarinquinone, and the like.

Further, as the non-benzene type aromatic compounds, there may be included, for example, azulene, cyclodecapentane, cyclotetradecaheptane, cyclooctadecanonaene, cyclotetracosadodecaene, heptalene, fulvalene, sesqui-fluvalene, heptafluvalene, perinapthene, indeno[2,1-a]perinaphthene, debenzo[bf]oxepine, dibenzo[bf]thiepine, indolizine, cyclo[3,2,2]azine, 4,5-benzotropolone, 3,4-benzotropolone, 5H-benzocycloheptene, 7H-benzocycloheptene, colchicine, colchiceine, colchinol methyl ether, ditropyl ether, ditropyl sulfide, cyclopentadienyltropylidene, benzoazulene, carbinol, 4,5-benzotropolone, 2-phenyltropone, naphthocycloheptadienone, naphtotropone, tribenzotropone, 1-amino-1,3-dicyanoazulene, benzoylhydrazone, 3-phenyl-1-oxaazuranone-2,2-benzyltropone, 3-methyl-2-phenyltropone, 2,7-diphenyltropone, 2-($\alpha$-naphthyl)tropone, 2,7-tetramethylene-4,5benzotropone, 2,7-diphenyl-4,5-benzotropone, naphtho[2',3'-4,5]tropone, naphtho[2',1'-2,3]tropone, dibenzosuberane, naphtho[1',2'-2,3]tropone, dibenzosuberol, 4-oxy-2phenyltropone, 4,5,7-tribomo-2-phenyltropone, 3,5'-ditropolone, 3-(p-methoxyphenyl)tropolone, 4-oxy-2-phenyltropone, 3-($\alpha$-naphthyl)tropolone, 3,4-diphenyltropolone, 3,7-dibenzyltropolone, 4-($\gamma$-phenylpropyl)tropolone, 3,5'-bitropolonyl, 4-(p-nitrostyryl)tropolone methyl ether, 2-amino-1,3-dicyanoazurene, benzo[b]tropothiazine, 5-bromo-2-phenyltropone, 4-bromo-2,7-diphenyltropone, diphenylbiphenylcarbinol, thiazinotropone, and the like.

Next, typical examples of the heterocyclic compounds having 5 or more conjugated $\pi$ bonds include the following compounds.

First, as the oxygen-containing heterocyclic compounds, there may be included:

furan and derivatives threreof, such as 2,5-diphenylfuran, 2-phenylfuran, 3-methyl-diphenylfuran, lepidene, pyridoxine, 2,4-diphenylfuran;

benzofuran, isobenzofuran, dibenzofuran and derivatives thereof, such as dibenzofuran, furano[2',3'-7,8]flavone, egonol, Euparin, 1,3-diphenylisobenzofuran, tetraphenyl glycol, tetraphenylphthalan, 9-phenylanthracene, o-oxymethyltriphenylcarbinol, 3,3'-diphenylphthalide, 1-phenylphthalan, 1,1-phenylphthalan, 3,3-diphenylphthalide, rubrene, $\alpha$-sorinine, dibenzofuran, 2,2'-dioxybiphenyl, 2,2'-diaminobiphenyl, phenazone, dibenzoquinone, 2-hydroxybenzofuran, 2-methylbenzofuran, benzo[a]benzofuran, benzo[b]benzofuran, dibenzo[a,f]dibenzofuran, dibenzo[c,d]dibenzofuran, dibenzo[c,e]dibenzofuran, bis(2-dibenzofuryl), bis(3-dibenzofuryl);

pyran and pyrone derivatives, such as 2-p-oxyphenyl-4,6-diphenylpyrylium ferrichloride, anhydrobase, benzopyran, 4-p-oxyphenyl-2,6-diphenylpyrylium ferrichloride, 6-phenylcoumarin;

chromenol and chromene derivatives, such as 6-methyl-2,3-diphenylchromone, 6-methyl-2,3-diphenyl-4-(p-tolyl)-1,4-benzopyran-4-ol, chromanol, $\gamma$-chromene, oxychmarone, chromene, cyanizine chloride, fisetin, 6-oxy-3-methoxy-5,7-dimethylflavirium chloride, 4,4'-diflavilene-3,3'-oxide, chrysinidine, apigenidin, rotoflavinidine, lutosonidine, galanginidine, fisenidine, molinidine, flavoneimine, peralgonidin, cyanidin, delphinidin, petunidin, syringidin, hirsutidin, apigeninidin, carajurin, dracorhodin, dracorubin;

flavone, flavonol and isoflavon derivatives, such as flavonol, flavone, fukugetin;

coumarin and isocoumarin derivatives, such as 7-oxy-3,4-benzocoumarin, dicoumarol, angelicin, psoralen, bergapten, bergaptol, xanthotoxin, xanthotoxal, isopimpinellin, pimpinellin, oroselol, oroselone, peucedanin, oxypeucedanin, ostruthol, medakenine, nodakenetin, seselin, xanthyletin, xanthoxyletin; and xanthone and related compounds; such as dixanthylene, 9-phenylxanthene, isoxanthone, 1,2,7,8-dibenzoxanthene, 3,9-diphenylxanthene, 9,9-diphenylxanthene, and the like.

Next, the nitrogen-containing heterocyclic compounds may include:

pyrroles, such as 1-phenylpyrrole, 5-phenylpyrrole-2-aldehyde, phenyl-2-pyrrylketoneoxime, 2-phenylpyrrole, 2-methyl-1-phenylpyrrole, 2-methyl-4-phenylpyrrole, 2-methyl-5-phenylpyrrole, 3-methyl-5-phenylpyrrole, 2,4-diphenylpyrrole, 2,5-diphenylpyrrole, 2,3-diphenylpyrrole, 2,3,5-triphenylpyrrole, 1,2,3,5-tetraphenylpyrrole, 2,3,4,5-tetraphenylpyrrole, diphenyl-2-pyrrolylcarbinol, pyrrolecyclotrimethyne dye, pyrrolepolymethylene dye, biliverdin, bilirubin, prodigiosin, stercobilin;

indoles, such as 5,7-dichloro-2-phenylindole, 7-chloro-2-phenylindole, 5,7-dibromo-2-phenylindole, 7-bromo-5-chloro-2-phenylindole, 2-(3'-indolyl)-3-isonitroindolenine, Roseindole, Triptophan Blue, Indolo[3,2-c]quinoline, indolo[1,2-c]quinazoline, 2-phenylindole, 3-nitro-2-phenylindole, 3-phenylindole, N-methyl-3-phenylindole, 3-(o-nitrophenyl)indole, 2,3-diphenylindole, 3-triphenylmethylindole, 2-methyl-3-triphenylmethylindole, 2-phenyl-3-triphenylmethylindole, 2-(1-naphthyl)-3-triphenylmethylindole, 2-(2-naphthyl)-3-triphenylmethylindole, 3,3'-diindolyl, 3,2'-diindolyl, 3,3'-dehydrodiindole, Roseindole, 3-nitroso-2-phenylindole, 3-nitro-2-phenylindole, 2-methyl-3-phenylazoindole, 2-phenyl-3-phenylazoindole, 6-oxy-3-phenylindole, triptophan, 4,5-benzotriptophan, 6,7-benzotriptophan, violasein;

oxoderivatives of indole, such as 3-(4-ethoxy-1-naphthyl)oxyindole, indophenine, indigoazine, indigoyellow 3G;

isoindoles, such as 1-chloro-4-methylphthalazine, 1-benzilidenephthalimidine, 2-methyl-3-phenylphthalimidine, 2-methyl-1,3-diphenylisoindole, 2,5-diphenylisoindole, β-isoindigo, dimethylimino-β-isoindigo;

carbazoles, such as 1-phenyl-1,2,3-benzotriazole, 2,2'-diaminodiphenyl, 1,1'-dicarbazole;

porphyrins, such as porphyrazine, magnesium octamethyltetraazaporphyrin, azadipyromethine, phthalocyanine, diazacoproporphyrin, porphine, mesotetraphenylporphyrin, chlorophyll-b, chlorophyll-a;

oxazoles, such as 2-phenyloxazole, 4-phenyloxazole, 5-phenyloxazole, 2-methyl-4-phenyloxazole, 2-methyl-5-phenyloxazole, 4-methyl-2-phenyloxazole, 5-methyl-2-phenyloxazole, 4,5-dimethyl-2-phenyloxazole, 2,4-diphenyloxazole, 2,5-diphenyloxazole, 4,5-diphenyloxazole, 2-methyl-4,5-diphenyloxazole, 2,4,5-triphenyloxazole, 2-(o-nitrophenyl)oxazole, 2-(p-nitrophenyl)oxazole, 2-amino-5-phenyloxazole, 2-(p-aminophenyl)oxazole, 2-(o-aminophenyl)oxazole, 4,5-dimethyl-2-phenyloxidooxazole, 4-methyl-2,5-diphenyloxidooxazole, 2,4,5-triphenyloxidooxazole, 4-(o-methoxycarbonylbenzal)-2-phenyl-5-oxazolone, oxacarbocyanine dye, phenanthrooxazole;

isooxazoles, such as 4-nitro-3-phenylisooxazole, 5-amino-3-methyl-4-phenylisooxazole, 5-benzoyl-3,4-diphenylisooxazole;

thiazoles, such as 4-phenylthiazole, 5-phenylthiazole, 5-(p-fluorophenyl)thiazole, 2-methyl-4-phenylthiazole, 4-methyl-5-phenylthiazole, 5-methyl-4-phenylthiazole, 4,5-diphenylthiazole, 2-methyl-4,5-diphenylthiazole, 1,4-bis(4-methyl-2-thiazolyl)benzene, p,p'-bis(4-methyl-2-thiazolyl)biphenyl, 2-amino-4-phenylthiazole, 2-amino-5-phenylthiazole, 2-amino-4,5-diphenylthiazole, 2-phenylazothiazole, 2-amino-4-methyl-5-phenylazothiazole, 4-methyl-2-phenylazothiazole, α-naphthothiazole, β-naphthothiazole, naphtho[2,3]thiazole, naphtho[1,2]thiazole, 2-methyl[1,2]thiazole, 2-phenylnaphtho[1,2]thiazole, 2-methylnaphtho[2,1]thiazole, 4-bromo-2-phenylnaphtho[2,3]thiazole, 2-oxynaphtho[2,1]thiazole, 2-aminonaphtho[1,2]thiazole, 2-aminonaphtho[2,1]thiazole, 2-mercaptonaphtho[1,2]thiazole, 2-mercaptonaphtho[2,1]thiazole;

imidazoles, such as 2-phenylimidazole, 4-phenylimidazole, 4-methyl-2-phenylimidazole, 2,4-diphenylimidazole, 4,5-diphenylimidazole, 2,4,5-triphenylimidazole, 2-bromo-4-phenylimidazole, 5-chloro-1-ethyl-2-phenylimidazole, 5-chloro-1,2-diphenylimidazole, 2-phenylazoimidazole, 2-methyl-4-phenylazoimidazole, 2-(o-aminophenyl)benzoimidazole;

pyrazoles, such as 3-phenylpyrazole, 5-phenylpyrazole, 4-phenylpyrazole, 1-methyl-3-phenylpyrazole, 1-methyl-5-phenylpyrazole, 3-methyl-5-phenylpyrazole, 1,3-dephenylpyrazole, 1,5-diphenylpyrazole, 1,3,4-triphenylpyrazole, 1,3,5-triphenylpyrazole, 1,4,5-triphenylpyrazole, 5-amino-3-phenylpyrazole, 3-amino-5-phenylpyrazole, 5-methyl-1,3-diphenylpyrazole-4-aldehyde, 3,5-diacetyl-4-phenylpyrazole, 4-benzoyl-1,5-diphenylpyrazole;

oxadiazoles, such as 3-phenylfurazane, 3,4-diphenylfurazane, naphtho[1,2]furazane, phenylfuroxane, 3-methyl-5-phenyl-1,2,4-oxadiazole, 2,5'-diphenyl-1,3,4-oxadiazole;

thiadiazoles, such as 5-phenyl-1,2,3-thiadiazole, 2-phenyl-1,3,4-thiadiazole, 5,5'-diphenyl-2,2'-bis(1,3,4-thiadiazole), 2-oxy-5-phenyl-1,3,4-thiadiazole, 2-methylsulfonyl-5-phenyl-1,3,4-thiadiazole;

triazoles, such as 2-phenyl-1,2,3-triazole, 5-(p-aminophenyl)-3-mercapto-1,2,4-triazole;

tetrazoles, such as 5-phenyltetrazole, 1,5-diphenyltetrazole, 1-oxy-5-phenyltetrazole, 1-amino-5-phenyltetrazole;

pyridine related compounds, such as 2-phenylpyridine, 2,2'-dipyridyl, 2-chloro-6-phenylpyridine, 2,6-dichloro-3-phenylpyridine, 2,2'-azopyridine, 3,3'-azopyridine, benzene-4-azopyridine, 5-chloro-2,2'-azopyridine, 5,5'-dichloro-2,2'-azopyridine, 4-pyridylazoresorcin, 4-pyridyl-m-phenylenediamine, 3-pyridyl-m-phenylenediamine;

quinoline and related compounds, such as quinoline, quinaldine, quinaldine-N-oxide, ethylquinoline, 2-phenylquinoline, 3-methylquinoline, 3-phenylquinoline, 4-methylquinoline, 4-phenylquinoline, 6-methylquinoline, 6-ethylquinoline, 6-phenylquinoline, 2,4-dimethylquinoline, 2,4-diphenylquinoline, quinoline-4-methanol, quinoline[6,5-f]quinoline, quinophthalone, flavaaniline, Quinoline Blue, Ethyl Red, pinacyanol, naphthocyanol, cryptocyanine, xenocyanine, azacyanine, 6,6'-octahydroquinone, Besthorn's red, 2,3'-biquinoline, 2,5'-biquinoline, 2,6'-biquinoline, 2,7'-biquinoline, 3,3'-biquinoline, 4,5'-biquinoline, 4,6'-biquinoline, 5,5'-biquinoline, 6,6'-biquinoline, 6,7'-biquinoline, 6,8'-biquinoline, 7,7'-biquinoline, 8,8'-biquinoline, 2-fluoroquinoline, 3-fluoroquinoline, 4-fluoroquinoline, 5-fluoroquinoline, 6-fluoroquinoline, 7-fluoroquinoline, 8-fluoroquinoline, 3-bromoquinoline, 4-chloroquinoline, 2,4-dichlorquinoline, 3-nitroquinoline, 4-nitroquinoline, 2,3-quinolinediol, quinoline-2-thiol, 2-oxyquinoline-3-thiol, 2-aminoquinoline, 8-aminoquinoline, 2-hydraziquinoline, pyroloquinoline, thiazoloquinoline, pyrimido[4,5-b]quinoline, benzo[f]quinoline;

isoquinoline and related compounds, such as 1-methylisoquinoline, 3-bromomethylisoquinoline, 1-phenylisoquinoline, 4-phenylisoquinoline, 1,1'-biisoquinoline, 5,5'-biisoquinoline, 1-chloroisoquinoline, 5-iodoisoquinoline, 5-bromoisoquinoline, 5-nitroisoquinoline, isoquinoline-1,3-diol, 6,7-methylenedioxyisoquinoline, 1-aminoisoquinoline, 1-cyanoisoquinoline, 1-phenylbenzo[g]3,4-dihydroisoquinoline, 3-(p-aminophenyl)-5,6-dihydro-8,9-dimethoxyimidazo[5,1-a]isoquinoline;

acridine and related compounds, such as acridine, 1-methylacridine, 9-phenylacridine, 9-(3-pyridinyl)acridine, 2-chloroacridine, 2-bromoacridine, 2-cridinol, acridine-3,6-diol, 4-methoxyacridine, 9-phenoxyacridine, 1-nitroacridine, 4-aminoacridine, 1-aminoacridine, 9-phenylaminoacridine, 9-oxyacridine, chrysaniline, acriflavine, 3,6-diamino-4,5-dimethylacridine, acrynol;

phenanthridines, such as 3,4-benzoquinoline, 6-methylphenanthridine, 6-aminomethylphenanthridine, 6-phenylphenanthridine, 6-chlorophenanthridine, 6-bromophenanthridine, 6-nitrophenanthridine, 1-aminophenanthridine, 3-oxyphenanthridinone;

anthrazolines, such as pyrido[2,3-g]quinoline, 2,7-diphenyl[2,3-g]quinoline, 2,8-diphenylpyrido[3,2-g]quinoline;

phenanthroline and related compounds, such as 1,7-phenanthroline, 1,10-phenanthroline, 4,7-phenanthroline, 8-methyl-1,7-phenanthroline, 4,10-dioxy-1,7-phenanthroline, 3,5-dichloro-1,10-phenanthroline, 2-amino-1,10-phenanthroline, 5-oxy-4,7-phenanthroline, 5-amino-4,7-phenanthroline;

pyridoindoles, such as 1,9-pyridoindole, 2,9-pyridoindole, 4,9-pyridoindole;

naphthyridine and related compounds, such as 1,5-naphthyridine, 1,7-naphthyridine, 1,8-naphthyridine, 1,6-naphthyridine, 2,6-naphthyridine, 2,7-naphthyridine, 1,5-naphthyridine-4-ol, 3-amino-1,5-naphthyridine, 2-amino-1,5-naphthyridine, 2-oxy-1,7-naphthyridine;

oxazine and related compounds such as phenoxyazinone, resazurin, carocyanin, Nile Blue A, Meldora's Blue, Brilliant Cresyl Blue;

thiazine and related compounds, such as o-benzaminophenyl-β-phenoxycarbonylethyl sulfide, phenothiazine, nitrophenothiazine, 3-chloro-10-ethylphenothiazine, 4-amino-4'-anilinodiphenyl disulfide, 2-chloro-10-(3-dimethylaminopropyl)phenothiazine, chloropromazine, 10-(2-dimethylamino-1-propyl)phenothiazine hydrochloride, 10-[2-(1-pyrrolidyl)ethyl]phenothiazine hydrochloride, 10-[1-methyl-3-piperidylmethyl]phenothiazine, 2-acetyl-10-(3-dimethylaminopropyl)phenothiazine, Methylene Blue;

pyridazine and related compounds, such as cinnoline, 3-methylcinnoline, 4-chlorocinnoline, 3-bromocinnoline, 4-cinnolinol, 4-aminocinnoline, phthalazine, 4-ethyl-2-phenylphthalazinone, phthalazine thiol, 1(2H)phthalazinone, 3-phenylpseudophthalazine, 4-methyl-3-phenylpseudophthalazine, 2,3-dihydro-1,4-phthalazinedione;

pyrimidine and related compounds, such as 2-cinnamethylpyrimidine, 4,6-dimethyl-2-phenylpyrimidine, 2,4,6-triphenylpyrimidine, alloxantin, 2,6-dioxy-4-phenylpyrimidine, 4,6-dioxy-2-phenylpyrimidine, 5-chloro-4,6-dioxy-2-phenylpyrimidine, sulfadiazine, sulfisomidine, thonzylamine hydrochloride, Vitamin B1, thiochrome, co-carboxylase, allomycin, 6-(2-furfuryl)aminopurine, pteridine, 2,4-pterine diol, 2-amino-6-methyl-4-pteridinol, xanthopterine, leucopterine, isoxanthopterine, quinazoline, 4-chloroquinazoline, 2,4-dichloroquinazoline, 4-quinazoline, 2,3-diphenyl-4-quinazoline;

pyrazine related compounds, such as 3,6-diphenylpyrazinol, quinoxaline, 2-methylquinoxaline, 2,3-dimethylquinoxaline, 2-chloroquinoxaline, 2,3-dichloroquinoxaline, 2-(o-aminoaniline)quinoxaline, N,N'-diphenyl-2,3-piperazione, 2-quinoxalinol, 2,3-quinoxaline diol, 2-aminoquinoxaline, 2,3-diaminoquinoxaline, methylquinoxaline-2-carboxylic acid ester, 2-(d-arabotetraoxybutyl)quinoxaline, flavazole, glucazidone, phenazine, phenazine-5-oxide, phenazine-5,10-dioxide, 5-methylphenazinium-methylsulfate, 10-methyl-5,10-dihydro-2-phenazinecarbonitrile, 2-phenazinecarbonitrile, 1-phenazinol, 1-methoxyphenazine, 2-phenazinol, 1,6-dioxyphenazine-5,10-dioxide, 1-aminophenazine, 2-aminophenazine, 2,3-diaminophenazine, Neutral Red, 5,10-dihydrophenazine, 5-methyl-5,10-dihydrophenazine, 1,2,3,4-tetrahydrophenazine;

tri- and tetra-hetero six-membered cyclic compounds, such as 2,4,6-triphenyl-s-triazine, 2,4-dichloro-6-o-chloroaniline-s-triazine, 5,6-diphenyl-as-triazine, 2,6-diphenyl-2,3,4,5-tetrahydro-as-triazine, 5,6-diphenyl-as-triazine-3-ol, 1,2,4-benzotriazine, 1,2,4-benzotriazine-3-ol, 3-phenyl-1,2,3-benzotriazine-4-(3H)-one, 1,2,3-benzotriazine-4-ol, 1,2,3-benzotriazine-4-thiol, 3-amino-1,2,3-benzotriazine, 2,3-diphenylosotetrazine, 5,6-dimethyl-2,3-diphenylosotetrazine, 5-cyano-2,3-diphenylosotetrazine, 5,6-dibenzoyl-2,3-diphenylosotetrazine, 2,3-dibenzoyl-5-methylosotetrazine, 2,3-dibenzoyl-5,6-dimethylosotetrazine, 2,3-dibenzoyl-5,6-diphenylosotetrazine, 2,3-bis(2,4-dichlorophenyl)-5,6-diphenyl-1,2,3,4-tetrahydro-v-tetrazine, 1,2,3,4-tetraethoxycarbonyl-5,5-diphenyl-1,2,3,4,5,6-hexahydro-v-tetrazine, 7-methyl-2-(4-methylphenyl)-1,2-dihydrobenzotetrazine, 3,6-diphenyl-1,2-dihydro-s-tetrazine, 1,3-diphenyl-1,4,5,6-tetrahydro-s-tetrazine, 3,3,6,6-tetraphenyl-1,2,3,6-tetrahydro-s-tetrazine, and the like.

Further, the sulfur-containing heterocyclic compounds may include:

sulfur-containing heterocyclic compounds, such as 2-phenylthiophene, 2,4-diphenylthiophene, 2,3,4,5-tetraphenylthiophene, metaphenylene hydrochloride, metapyrylene hydrochloride, chlorothene citrate, thenyldiamine hydrochloride, α-quinquithienyl, α-sexyithienyl;

fused thiophene type compounds, such as 3,3'-diiminothioindigo, indigoron, dihydronaphtho[2,1-b]thianaphthene, 1,3-diphenylisothianaphthene, dibenzothiophene, 2-nitrodibenzothiophene, aminodibenzothiophene, 2,8-diaminodibenzothiophene, dibenzothiophene-5-dioxide, 4-oxydibenzothiophene, 2,8-dioxydibenzothiophene, 2-chlorodibenzothiophene, 1-bromodibenzothiophene, 2,8-dibromodibenzothiophene, 2-iodo-dibenzothiophene, 2-acetyldibenzothiophene, 2,8-diacetyldibenzothiophene, naphthothiophene, 3-oxythiophanthrene, 2,3-thiophanthrene, naphtho[2,3-c]thiophene, naphtho[1,2-b]thiophene, naphtho[2,1-b]thiophene, naphtho[1,2-c]thiophene, 1,2-naphtho[2,1-b]thiophenequinone, 1-oxy-2-naphtho[2,1-b]thiophenealdehyde, naphtho[1,2-c]thiophene, 2H-naphtho[1,8]thiophene, benzo[b]thiophanthrene, 6,11-benzo[b]thiophanthraquinone, benzo[g]thiophanthrene, 4,5-benzothiophanthrene, 8,9-benzothiophanthrene;

five-membered monocyclic compounds containing 2 hetero atoms, such as 5-phenyl-1,2-dithiol-3-thione, 3,4-dihydronaphtho-2,1-trithione, thiaflavone, thiacoumarin, thiaxanthene, thiaxanthohydrol, thiaxanthone, Milacil D, bisthiaxanthylene;

six-membered cyclic compound having two or more hetero atoms, such as 2,5-diphenyl-1,4-dithiadiene, thiophenealdehyde, thianthrene, 2,7-dimethylthianthrene, 1-thianthrenyl lithium, 1-chlorothianthrene, phenoxthine, 2-vinylphenoxthine, 2-aminophenoxthine, 2-nitrophenoxthine, 3,7-dinitrophenoxthine, 10,10-diphenylphenoxthine, 2,5-diphenylthiophene, and the like.

Further, other useful compounds may include:

dicyclic compounds having commonly a nitrogen atom, such as cinchonine, 2-phenylpyrrocoline, 3-ethyl-2-phenylpyrrocoline, 3-benzyl-2-phenylpyrrocoline, 3-nitroso-2-phenylpyrrocoline, 2:3-benzopyrrocoline, 1,5,8-trimethyl-2:3-benzopyrrocoline, 1-ethyl-5,8-dimethyl-2:3-benzopyrrocoline, 1,8-dimethyl-2:3-benzopyrrocoline, 3-phenyl-7:8-benzopyrrocoline, cyclo[3.3.3]azine, cyclo[3.2.2]azine, 2-phenylcyclo[3.2.2]azine, 2,3-diphenylcyclo[3.2.2]azine, tricycladine, 7-methylbenzo[a]quinolinium bromide, 7-phenylbenzo[a]quinolidinium bromide, benzo[b]quinolidinium salt, tetrahydro-Ψ-berberine, tetrahydroberberine, laudanosoline, tetrahydro-2,3,9,10-tetraoxy-7-methyldibenzopyrrocolium chloride, homolaudanosoline, octadehydromatrine, canadinemethoiodide, tetrahydropalmatinemethoiodide;

alkaloids, such as nicotyrine, 3',2-dipyridyl, cusparine, galipoline, 1-methyl-2-quinolone, casimiroin, 2-pentylquinoline, 4-oxy-2-pentylquinoline, 4-methoxy-2-pentylquinoline, 1-methyl-2-pentyl-4-quinoline, 4-methoxy-2-phenylquinoline, 7-methoxy-1-methyl-2-phenyl-4-quinoline, cuspareine, dictamnine, skimmianine, evolitrine, maclurin, kokusagine, kokusaginine, maculosidine, flindersiamine, evoxoidine, evoxine, evolatine, acronycidine, medicosmine, acronidine, γ-fagarine, cinchonin, quininone, quinotoxin, N-bromoquinotoxin, dihydrocinchonicine, heteroquinine, evoxantidine, xanthoquinoline, 1,3-dimethoxy-10-methylacridone, evoxanthine, xanthevodine, melicopine, melicopidine, melicopicine, acronycine, flindersine, papaverin, papaveraldine, laudanosine, laudanine, codamine, protopapaverine, almepavine, 4,4',5-trimethoxy-2-vinylstilbene, coclaurine, d-isococlaurine, neprotin, corpaverine, phellodendrine, magnocurarine, coclanoline, narcotin, narcotoline, aponarceine, cinchonin, cinchotoxine, dihydrohydrastine, bicuculline, adlumidine, corlumidine, cordrastine, magnolamine, berbamine, o-methylberbamine, etc.

Among the conjugated π bond compounds described above, preferred are the ones having at least one amino group. Particularly preferred such compounds include, for example, aminonaphthalenes such as diaminonaphthalenes, triaminonaphthalenes and tetraaminonaphthalenes, 1,4-diaminoanthracens, 9,10-diaminophenanthrene, 2,2'-diaminodiphenyl, 1,1'-diamino-2,2'-dinaphthyl, 2-amino-5-phenyl oxazole, 1-aminophenanthridine, 2-amino-4-phenylthiazole, 2-amino-5-phenylthiazole, 3-amino-1,5-naphtyridine, 1-aminophenanthridine, aminoacridines such as 4-aminoacridine, 2-aminoacridine, 1-aminoacridine and 3,6-diaminoacridine, and aminophenazines such as 1-aminophenazine, 2-aminophenazine and 2,3-diaminophenazine.

In a preferred embodiment of the present invention, the scaling preventive to be used in the present invention further contains, in addition to at least one of dyes, pigments and conjugated π bond compounds, at least one inorganic compounds. Although an inorganic compound alone has no scaling preventive action, the scaling preventive action possessed by dyes, pigments or conjugated π bond compounds has unexpectedly been found to be further enhanced when combined with the inorganic compound. It has also been found that this effect can further be exhibited, if the chloride ion concentration in the reaction mixture is controlled to 100 ppm or less. At a level of the chloride ion concentration in excess of 100 ppm, the scaling preventive effect is not enough to prevent effectively scaling.

When a mixture of a dye, a pigment or a conjugated π bond compound with an inorganic compound is to be applied by coating on the inner wall surface of a polymerizer, etc., the proportion of the both components may preferably be 0.1 to 2000 parts by weight of the inorganic compound, more preferably 1 to 1000 parts by weight, per 100 parts by weight of the dye, pigment or conjugated π bond compound.

Such inorganic compounds may include silicic acids or silicates, such as orthosilicic acid, metasilicic acid, mesodisilicic acid, mesotrisilicic acid, mesotetrasilicic acid, sodium metasilicate, sodium orthosilicate, sodium disilicate, sodium tetrasilicate, potassium metasilicate, potassium hydrogen disilicate, lithium orthosilicate, hexalithium orthodisilicate, water glass, 12-silicotungstic acid, iso-12-silicotungstic acid, 10-silicotungstic acid, potassium 12-silicotungstate, potassium iso-12-silicotungstate, potassium 10-silicotungstate, sodium 12-silicotungstate, sodium iso-12-silicotungstate, silicomolybdic acid, potassium silicomolybdate, sodium silicomolybdate, and the like;

metal salts such as oxyacid salts, acetates, nitrates, hydroxides or halides of metals selected from alkaline earth metals such as magnesium, calcium, barium, etc., aluminum family metals such as aluminum, etc., tin family metals such as titanium, tin, etc., iron family metals such as iron, nickel, etc., chromium family metals such as chromium, molybdenum, etc., manganese family metals such as manganese, etc., copper family metals such as copper, silver, etc., platinum family metals such as platinum; etc.;

inorganic colloids prepared by mechanical crushing, irradiation of ultrasonic wave, electrical dispersion or chemical methods, such as gold colloid, silver colloid, sulfur colloid, colloid of ferric hydroxide, colloid of stannic acid, colloid of silicic acid, colloid of manganese dioxide, colloid of molybdenum oxide, colloid of barium sulfate, colloid of vanadium pentoxide, colloid of aluminum hydroxide, colloid of lithium silicate and so on.

Among the above inorganic compounds, silicates, silicic acid colloid and ferric hydroxide colloid are particularly preferred.

For coating of the scaling preventive on the inner wall of a polymerizer, etc., it can be applied as such or as a coating solution prepared by dissolving or dispersing in an appropriate solvent. The concentration of the scaling preventive in the coating solution is generally preferred to be 0.01% by weight or higher.

The solvent which may be used in preparation of the coating solution may be water or various organic solvents, including, for example:

aliphatic hydrocarbons such as gasoline, petroleum, benzine, mineral spirit, petroleum naphtha, V.M.&P. naphtha, decalin, tetralin, p-cymene, and the like;

aromatic hydrocarbons such as benzene, toluene, xylene, and the like;

halogenated hydrocarbons such as trichloroethylene, perchloroethylene, chloroform, carbon tetrachloride, ethylene trichloride, benzene monobromide, benzene monochloride, benzene dichloride and the like;

alcohols such as amyl alcohol, ethyl alcohol, isopropyl alcohol, 2-ethylbutyl alcohol, 2-ethylhexyl alcohol, cyclohexanol, methyl alcohol, methylamyl alcohol, benzyl alcohol, butyl alcohol and the like;

ketones such as acetone, acetonylacetone, diisobutyl ketone, diethyl ketone, dipropyl ketone, methyl amyl ketone, methyl butyl ketone, methylcyclohexanone, methyldipropyl ketone, methyl ethyl ketone, methyl n-hexyl ketone, methyl isobutyl ketone, methyl propyl ketone, mesityl oxide, and the like;

esters such as acetates, butyrates, propionates, formates and the like;

alcohol esters such as butyl lactate, isopropyl lactate, ethyl lactate, ethyl oxypropionate, diethyl maleate and the like;

ketone esters such as ethyl acetoacetate, ethyl pyruvate and the like;

ethers such as isopropyl ether, ethyl ether, diethyl carbitol, diethyl cellosolve, butyl ether, and the like;

ketone alcohols such as acetonylmethanol, diacetone alcohol, dihydroxyl acetone, pyruvyl alcohol and the like;

ether alcohols such as isopropyl cellosolve, carbitol, glycidol, cellosolve, glycol ether, benzyl cellosolve, butyl carbitol, butyl cellosolve, methyl carbitol, methyl cellosolve, triethyleneglycol monoethyl ether and the like;

ketone ethers such as acetal ethyl ether, acetonylmethanol ethyl ether, methyl ethoxyethyl ether, and the like;

ester ethers such as butylcarbitol acetate, butyl cellosolve acetate, carbitol acetate, cellosolve acetate, 3-methoxybutyl acetate, methylcarbitol acetate, methyl cellosolve acetate, and the like.

When organic solvents highly compatible with water are employed, water may be added to the coating solution in an amount within the range which does not impair solubility or dispersibility of the scaling preventive, whereby the coating solution can be improved in economy and safety during transportation and storage. Such solvents includes:

alcohols such as methyl alcohol, ethyl alcohol, allyl alcohol, n-propyl alcohol, isopropyl alcohol, and the like;

ketones such as acetone, acetonylacetone, diacetone alcohol and the like;

esters such as ethyleneglycol monomethyl ether acetate, diethyleneglycol methyl ether acetate, monoethyl ether acetate and the like;

ethers such as dioxane, ethyleneglycol monomethyl ether, ethyleneglycol monoethyl ether and the like;

furans such as tetrahydrofuran, furfuryl alcohol and the like;

aprotic solvents such as acetonitrile, N,N-dimethylformamide, N,N-dimethylacetamide and the like.

When the scaling preventive to be used is a water-soluble sulfonic acid type or carboxylic acid type dye having sulfonic acid groups or carboxylic acid groups in the form of an alkali metal salt or ammonium salt, water can be used as the solvent in which the preventive is to be dissolved, as disclosed in Japanese Patent Publication No. 5442/1981, whereby there is the advantage in safety and hygiene that the solvent is non-toxic and harmless. If water is used as the solvent as described above, wettability of the coating solution for the inner wall of a polymerizer, etc. can be enhanced by addition of alcohols, preferably $C_3$–$C_6$ monohydric alcohols, such as n-propyl alcohol, n-butyl alcohol, iso-butyl alcohol, sec-butyl alcohol, t-butyl alcohol, n-amyl alcohol, t-amyl alcohol, iso-amyl alcohol, sec-amyl alcohol, sec-hexyl alcohol, etc., as disclosed in Japanese Patent Publication No. 5444/1981. Also, as disclosed in Japanese Patent Publication No. 5442/1981, for the purpose of making drying of the coating solution after coating easier, an organic solvent compatible with water such as alcoholic solvents, ester solvents, ketone solvents, may be added to the coating solution.

In carrying out coating of the coating solution containing the scaling preventive on the inner wall of a polymerizer, etc. according to the process of the present invention, various fixing agents can be used for enhancement of the fixing characteristic, if desired. The fixing agent may be used according to various methods, for example, the method in which it is incorporated in the coating solution containing the scaling preventive, the method in which the fixing agent or a solution thereof is previously applied on the wall surface prior to coating of the scaling preventive, followed by overlaying of the scaling preventive thereon, and the suitable method may be selected depending on the kind of the scaling preventive and the kind of the fixing agent.

Such fixing agents may include the polymeric compounds as shown below:

olefin polymers, such as polyethylene, polyethylene sulfonic acid, polypropylene, poly(1-butene), polyisobutene, polycyclopentene, polycyclopentylethylene, polycyclohexylethylene, poly(3-cyclohexyl-1-propene), poly(4-cyclohexyl-1-butene), poly(5-cyclohexyl-1-pentene), poly(cyclotrifluoroethylene), poly(tetrafluoroethylene);

diene polymers, such as polyallene, polybutadiene, polyisoprene, polychloroprene, poly(1-methoxybutadiene), poly(2-tert-butyl-1,3-butadiene), poly(cyclopentadiene), poly(1,3-cyclohexadiene), poly(dimethylfulvene), poly(4-vinyl-1-cyclohexane), poly(1,5-hexadiene), poly(1,5-cyclooctadiene), poly(bicyclo-[2,2,1]-hepta-2,5-diene), poly(5,7-dimethyl-1,6-octadiene), poly(diallylphthalate), poly(diallylmethylsilane), poly(diallylphenylphosphineoxide);

acetylene polymers, such as polyacetylene, poly(cyanoacetylene), poly(hydroxymethyl)acetylene), poly(butoxyacetylene), poly(phenylacetylene), poly(diphenyldiacetylene), poly(pyridylacetylene);

aliphatic vinyl polymers and vinylidene polymers, such as polyvinyl alcohol, polyallyl alcohol, poly(vinylformal), poly(vinylacetal), poly(vinylbutyral), poly(vinylisobutyral), poly(vinylcyclohexanoneketal), poly(vinyl acetate), poly(vinylchloroacetate), poly(vinyl isobutyrate), poly(vinyl pivalate), poly(vinyl n-caproate), poly(vinyl caprylate), poly(vinyl laurate), poly(vinyl palmitate), poly(vinyl benzoate), poly(vinyl sulfate), poly(vinyl chloride), poly(vinylidene chloride), poly(vinyl bromide), poly(vinyl methyl ether), poly(vinyl ethyl ether), poly(vinyl n-propyl ether), poly(vinyl isopropyl ether), poly(vinyl n-butyl ether), poly(vinyl isobutyl ether), poly(vinyl tert-butyl ether), poly(vinyl neopentyl ether), poly(vinyl carbomethoxymethyl ether), poly(vinyl-2-methoxyethyl ether), poly(vinyl-2-chloroethyl ether), poly(vinyl 2,2,2-trifluoroethyl ether), poly(vinyl benzyl ether), poly(vinyl methyl ketone), poly(methyl isopropenyl ketone), poly(1-nitropropylene), poly(vinylsulfofluoride), poly(vinylsulfonic acid), poly(vinyl diphenylphosphineoxide), poly(vinyl diphenylphosphinesulfide), poly(dimethyl-2-cyano-2-propene-1-phosphonate), poly(diethyl-2-cyano-2-propene-1-phosphonate), poly(maleic anhydride);

aromatic vinyl polymers, such as polystyrene, poly(α-methylstyrene), poly(4-chlorostyrene), poly(4-bromostyrene), poly(dichlorostyrene), poly(4-methoxystyrene), poly(2,5-dimethoxystyrene), poly(vinyl-bis(1-ethoxyethyl)hydroquinone), poly(4-vinyl-phthalic acid), poly(4-vinylphenylboric acid), poly(diphenyl-4-styrylphosphine oxide), poly(diphenyl-4-styrylphosphine sulfide), poly(9-vinylanthracene), poly(4-vinylbiphenyl), poly(acenaphthylene), polyindene;

heterocyclic vinyl polymers, such as poly(N-vinylcarbazole), poly(9-$\Delta^5$-pentenylcarbazole), poly(9-$\Delta^5$-hexenylcarbazole), poly(N-vinylpyrrolidone), poly(2-vinylpyridine), poly(4-vinylpyridine), poly(2-methyl-2-vinylpyridine), poly(2,4-dimethyl-6-vinyl-S-triazine), poly(N-vinyl-1,2,4-triazine), poly(N-vinylbenztriazole), poly(N-morpholinone-(3)), polycoumarone;

acrylic and methacrylic polymers, such as polyacrylic acid, polymethacrylic acid, poly(methyl acrylate), poly(ethyl acrylate), poly(butyl acrylate), poly(5-cyano-3-thia-phenylacrylate), poly(methyl methacrylate), poly(ethyl methacrylate), poly(n-propyl methacrylate), poly(n-butyl methacrylate), poly(isobutylmethacrylate), poly(n-hexyl methacrylate), poly(2-ethylbutyl methacrylate), poly(n-octyl methacrylate), poly(n-lauryl methacrylate), poly(4-(tert-butyl)phenyl methacrylate), poly(bornyl methacrylate), poly(β-(N-carbazyl)ethyl methacrylate), poly(tert-butyl crotonate), polyacrylonitrile, polymethacrylonitrile, polyacrylamide, poly(N,N-dimethylacrylamide), poly(N-(1,1-dimethyl-3-oxobutyl)acrylamide, poly(acrylopiperidine), poly(acrylomorpholide), poly(9-acryloylcarbazole), polymethacrylamide, polyacrolein, poly(α-methylacrolein), poly(diacryloylmethane), poly(acrylic anhydride), poly(methacrylic anhydride);

polyethers, such as polyformaldehyde, polyacetaldehyde, poly(mono-chloroacetaldehyde), polychloral, polypropionaldehyde, polyacrolein, poly(2-formyl-$\Delta^5$-dihydropyrane), poly(trans-1,2-cyclohexanedicarboxyaldehyde), poly(glutardialdehyde), poly(β-methylglutardialdehyde), poly(β-phenylglutardialdehyde), poly(dimethylketene), polyacetone, poly(monobromoacetone), poly(7-oxa-bicyclo[2,2,1]heptane), poly(3-phenoxylene), poly(2,6-xylenol), poly(ethylene oxide), poly(propylene oxide), poly(cyclopentene oxide), poly(cyclohexene oxide), poly(phenylglycidyl ether), poly(1,2-di(epoxyethyl)benzene), poly(3,3-bis(chloromethyl)oxetane), poly(tetrahydrofuran);

polysulfides, polysulfones, such as poly(thiocarboxylfluoride), poly(ethylenedichloride-sodium tetrasulfide), poly(dichlorodiethyl ether-sodium disulfide), poly(dichlorodiethyl ether-sodium tetrasulfide), poly(phenylenesulfide), poly(ethylenesulfone), poly(propylenesulfone), poly(1-butenesulfone), poly(5-norbornenesulfone), poly(styrenesulfone), poly(1-pentylsulfone), poly(1-hexylsulfone), poly(1-heptylsulfone), poly(butadienesulfone), poly(isoprenesulfone), poly(dimethylbutadienesulfone), poly(1,5-hexadienesulfone), poly(cis,cis-cyclooctadienesulfone), poly(norbornadienesulfone);

various addition polymers, such as poly(methylene diisocyanate), poly(ethylene diisocyanate), poly(trimethylene diisocyanate), poly(tetramethylene diisocyanate), poly(5-iminohydantoin), poly(perfluoroglutarodinitrile), poly(1-(perfluorobutyryl)aziridine);

formaldehyde resins, such as phenol-formaldehyde resin, melamine-formaldehyde resin, urea-formaldehyde resin, aniline-formaldehyde resin, p-toluenesulfonamide-formaldehyde resin;

polyesters, such as poly(11-oxyundecanoate), poly(hexamethylene succinate), poly(hexamethylene sebacate), poly(hexadecamethylene sebacate), poly(hexamethylene-60, α'-dibutylsebacate), poly(octamethylene cis-hexahydroterephthalate), poly(octamethylene transhexahydroterephthalate), poly(hexamethylene maleate), poly(hexamethylene fumarate), poly(hexamethylene acetylenedicarboxylate), poly(ethylene terephthalate), poly(p-phenylene isophthalate), poly(4,4'-biphenylene isophthalate), poly(hexamethylene carbonate), poly(p-phenylene carbonate), poly(m-phenylene carbonate), poly(4-4'-isopropylidenediphenylene carbonate), poly(4,4'-(2-pentylene)diphenylene carbonate), poly(1,2-bis(hydroxymethyl)carborane-adipic acid), poly(allylsulfonate), poly(hydroquinone-aryloxyphosphoryl dichloride), poly(hydroquinone-(chloromethyl)-phosphoryl dichloride), poly(hydroquinone-(N-dimethyl)phosphoramidic acid)dichloride;

polyamides, such as poly(isocyanate), poly(vinylisocyanate), poly(butylisocyanate), poly(3-aminopropionic acid), poly(6-aminopropionic acid), poly(11-aminoundecanoic acid), poly(hexamethylene adipamide), poly(decamethylene adipamide), poly(3,3'-(methylimino)bistrimethylene adipamide), poly(benzidine-isophthalic acid), poly(pyrromelliticdianhydride-aromatic diamine), poly(1,6-hexamethylene-bis(carboxyethyl)sulfide), poly(1,6-hexamethylenediamine-benzene-1,3-bis-sulfonic acid chloride), poly(trans-2,5-dimethyl-piperazine-4,4'-sulfonyl-dibenzoyl chloride), poly(bis(3-aminopropyl)phenylphosphine-adipic acid), poly(bis(3-aminopropyl)phenylphosphine-terephthalic acid), poly(bis(3-aminopropyl)methylphosphine oxide-adipic acid), poly(bis(3-aminopropyl)n-octylphosphine-adipic acid), poly(bis(3-aminopropyl)phenylphospine oxide-adipic acid), poly(hexamethylenediamine-bis(2-carboxyethylene)phenylphosphine oxide), poly(hexamethylenediamine-bis(p-carboxyphenyl)phenylphosphine oxide), poly(piperazine-bis(2-carboxyethyl)-phenylphosphine oxide);

polyureas, polyurethanes, such as polyureas, poly(1,10-decamethylenediamine-1,6-hexamethylene-bis-ethylurethane), poly(diphenylmethane-4,4'-diisocyanate-4,4'-diphenylmethane), poly(toluene-2,4-diisocyanate-N,N'-bis(trimethylsilyl-p,p'-diaminodiphenyl ether, polyurethane, polyurethane poly(propyleneoxide) basis;

various linear condensed polymers, such as poly(diethylcarbodiimide), poly(diallylcarbodiimide), poly(di-n-butylcarbodiimide), poly(methylisopropylcarbodiimide), poly(di-n-hexylcarbodiimide), poly(diphenylcarbodiimide), poly(4,4'-diphenylenemethanecarbodiimide), poly(hexamethylenecarbodiimide), poly(1,3-xylylenecarbodiimide), poly(3-methyl-1,4-phenylenecarbodiimide), poly(2,2'-dimethylbiphenylenecarbodiimide), poly(2,2'-dimethoxybiphenylenecarbodiimide), poly(1,5-naphthylenecarbodiimide), poly(adipyldihydrazide-succinoyl chloride), poly(adipyldihydrazide-isophthaloyl chloride), poly(isophthalicdihydrazide-terephthaloyl chloride), poly(2,5-dimethylbenzylene), poly(p-xylylene), poly(2,5-dimethylxylylene), poly(2,5-dimethoxy-p-xylylene), poly(p-xylylidene), poly(α-cyano-m-xylylidine), poly(α-cyano-p-xylylidine), poly(nitrophenylene), poly(tetramethyl-p-phenylenedimethylene), poly(2,5-dihydroxy-p-phenylenedimethylene), poly(4,4'-oxydiphenylenedimethylene), poly(2,5-dimethoxy-p-phenylenedimethylene);

heterocyclic condensed polymers, such as poly(benzoimidazole), poly(alkylene-5,5'-dibenzoimidazole), poly(allylene-5,5'-dibenzoimidazole), poly(pyromellitimide), poly(benzooxazole), poly(oxadiazole), poly(oxadiazolidine), poly(dithiazole), poly(benzothiazole), poly(1,4-xylenyl)-2-methylpiperazine), poly(quinoxaline), poly(S-triazinyleneimide);

natural polymers, modified natural polymers, such as natural rubber, cyclized rubber, hydrochloric acid rubber, chlorinated rubber, guttapercha, cellulose, methyl cellulose, ethyl cellulose, propyl cellulose, butyl cellulose, allyl cellulose, benzyl cellulose, hydroxyethyl cellulose, carboxylmethyl cellulose, cyanoethyl cellulose, cellulose triformate, cellulose acetate, cellulose triacetate, cellulose tripropionate, cellulose tributyrate, cellulose tricaproate, cellulose tricarbanilate, cellulose nitrate, cellulose trinitrate, starch, amylose, amylose acetate, amylose carbanilate, amylopectin, alginic acid, chitin, glycogen, gum arabic, gum tragacanth, heparine, pectin, rosin, kopal, shellac, casein, collagen(calf-skin), collagen(ichthyocol), gelatin, peanut-protein, soybean-protein, nucleic protein (calf thymus), nucleic protein (sperm of sea urchin), poly(sarcosine), sericin, silk, wool, zein, polyadenylic acid, deoxyribonucleic acid, ribonucleic acid;

polysiloxanes, such as polysiloxane, polydimethylsiloxane;

organic metal polymers, such as poly(bis-(imidazolate)-metal(II), poly(aluminumtriisopropylateethylenediamine); and inorganic polymers such as polymetaphosphate, and In the process of the present invention, the above-mentioned scaling preventive is applied on the inner wall surface of a polymerizer and the portions of the auxiliary polymerizer equipment where scales may be sticked, namely the portions which monomers may come into contact with during polymerization (including portions which monomers can possible contact), for example, stirring blades, stirring shaft, condenser, header, baffles, search coil, bolts, nuts, etc. Preferably, the scaling preventive is further applied on the portions of recovery system of unreacted monomers where scales may be sticked, for example, the inner surfaces of monomer distillation columns, condensers, monomer storage tanks, valves, etc.

The materials of the above polymerizer and portions of the auxiliary polymerizer equipment are not particularly limited, but such a material as stainless steel or a material applied with glass lining may be available. These portions where coating is to be applied should preferably have a surface roughness (Rmax as defined by JIS B 0106) of 10 μm or less, more preferably 5 μm or less.

The method for applying the scaling preventive on the inner surface of a polymerizer, etc. as mentioned above is not particularly limited, and may be inclusive typically of the brush coating, spray coating, the method of filling the polymerizer with a coating solution followed by withdrawal thereof, and otherwise the automatic coating methods as disclosed in Japanese Laid-open Patent Publication (Kokai) Nos. 61001/1982, 36288/1980, Japanese Laid-open Patent Publication (Kohyo) Nos. 501116/1981, 501117/1981 and Japanese Laid-open Patent Publication (Kokai) No. 11303/1984.

The process of the present invention is applicable for homopolymerization of vinyl chloride monomer and copolymerization of vinyl chloride monomer with other vinyl monomers in an aqueous medium. The system of polymerization may be either suspension polymerization or emulsion polymerization. Vinyl monomers which can be provided for copolymerization may be exemplified by vinyl esters such as vinyl acetate, vinyl propionate, acrylic acid, methacrylic acid or their esters or salts, maleic acid or fumaric acid, and their esters of anhydrides, diene monomers such as butadiene, chloroprene or isoprene, further styrene, acrylonitrile, vinyldiene halide, vinyl ether, etc.

In the suspension and emulsion polymerizations, the polymerization catalysts generally employed are, for example, organic peroxides such as t-butylperoxyneodecanate, di-2-ethylhexylperoxydicarbonate, 3,5,5-trimethylhexanoylperoxide, α-cumylperoxyneodecanoate, cumene hydroperoxide, cyclohexanoneperoxide, t-butylperoxypivalate, di-2-ethoxyethylperoxydicarbonate, benzoyl peroxide, lauroyl peroxide, 2,4-dichlorobenzoyl peroxide, diisopropylperoxydicarbonate and acetylcyclohexylperoxide, etc., azo catalysts such as α,α'-azobisisobutyronitrile, α,α'-azobis-2,4-dimethylvaleronitrile, water soluble persulfates such as potassium persulfate, ammonium persulfate, etc. Also, as a dispersant, there may be employed, for example, suspending agents such as natural or synthetic polymeric compounds, e.g., partially saponified product of polyvinyl acetate, polyacrylic acid, copolymer of vinyl acetate and maleic anhydride, cellulose derivative such as hydroxypropylmethyl cellulose and gelatin; emulsifiers as exemplified by nonionic emulsifiers such as sorbitane monolaurate, sorbitane trioleate, anionic emulsifiers such as sodium laurylsulfonate, sodium alkylbenzenesulfonate. As other additives, fillers such as calcium carbonate, titanium oxide, etc., stabilizers such as tribasic lead sulfate, calcium stearate, dibutyltin laurate, dioctyltin mercaptide, etc., lubricants such as lice wax, stearic acid, cetyl alcohol, etc., plasticizers such as DOP, DBP, etc., chain transfer agents such as trichloroethylene, mercaptans, etc. and pH controllers may be added into the polymerization system. According to the process of the present invention, irrespectively of which catalysts, dispersants or additives may be employed, scaling can effectively be prevented in any polymerization system.

The present invention is described in more detail below by referring to the following Examples, by which the scope of the present invention is not limited.

(Note: In the following Examples, Experiment Nos. 218 to 300 are skipped.)

EXAMPLE 1

As shown in Table 1, for each experiment, a dye or a pigment was dissolved or dispersed in a solvent, optionally with the addition of an inorganic compound or a polymeric compound as shown in the same Table to prepare a coating solution. The formulation ratio of the inorganic compound or the polymeric compound and the concentration of the dye or pigment in the coating solution are also shown in Table 1. The coating solution was applied on the polished inner wall surface of a stainless steel polymerizer of an inner volume of 1000 liters and the portions which may contact with monomers such as stirrer, dried at 80° C. for 10 minutes and then thoroughly washed with water.

Next, the thus coated polymerizer was charged with 200 Kg of vinyl chloride monomer, 400 Kg of deionized water, 44 g of partially saponified Poval, 56 g of hydroxypropylmethyl cellulose and 60 g of t-butylperoxyneodecanate, and polymerization was carried out at 52° C. for 7 hours. After completion of polymerization, the polymer was taken out and the polymerizer was washed internally with water at a flow rate of 0.1 $m^3/m^2hr$ as shown in Table 1. The above operations from coating and charging to washing with water were conducted for each batch and this was repeated for a maximum of 200 batches.

The chloride ion concentration in the reaction mixture during polymerization in each experiment was controlled by changing the contents of the methyl chloride and hydrochloric acid components contained in the starting vinyl chloride monomer, the temperature of the charged deionized water (in the range of from 10° to 80° C.) and the degree of vacuum after charging of deionized water and the suspending agent ($-750$ to $-100$ mmHg). Various starting vinyl monomer materials with different contents of methyl chloride and hydrochloric acid were prepared by mixing two kinds of vinyl chloride monomers, namely (1) one containing 40 to 50 ppm of methyl chloride and 0 to 2 ppm of hydrochloric acid and (2) the other containing 1000 to 3000 ppm of methyl chloride and 1 to 10 ppm of hydrochloric acid at various weight ratios within the range of from 80:100 to 20:0.

After completion of polymerization of each batch, the chloride ion concentration in the slurry was measured according to the method defined by JIS K 0102 (1974). The average value and the maximum and minimum values of their measured values are shown for each experiment in Table 1.

Also, scaling after completion of each batch of the 10th, 30th, 50th, 100th, 150th and 200th batch was evaluated by visually according to the standards shown below, and the amount of scales adhering ($g/m^2$) was also measured after completion of the final batch. The results are also shown in Table 1.

A: no sticking of scale
B: several percent sticking of sandy scales
C: scales sticking thinly over part of the surface (about 10% sticking percentage)
D: scales sticking thickly over part of the surface (about 10% sticking percentage)
E: scales sticking thinly over part of the surface (about 50% sticking percentage)
F: scales sticking thickly over part of the surface (about 50% sticking percentage)
G: scales sticking thinly over the entire surface
H: scales sticking thickly over the entire surface In Table 1, the Experiment numbers marked with an asterisk (*) indicate Comparative examples. In particular, Experiment Nos. 1 and 2 are examples in which the inner wall surface of the polymerizer was subjected to no treatment with any compound. Also, the coating solution employed in Experiment Nos. 33 and 34 was prepared by dissolving one part of sodium sulfide in 100 parts of water and adding 0.5 part of a dye to the resultant solution, followed by heating at 80° C. for 30 minutes.

TABLE 1

| (1) Exp. No. | Coating Solution Dye or pigment(a) Kind | Mixing ratio | Inorganic compound (b) | (a)/(b) weight ratio | Polymeric compound (c) | (a)/(c) weight ratio | (2) conc. % | Solvent Kind | Mixing ratio | (3) Cl⁻ conc. upper: average lower: max.-min. ppm | (4) Time for washing with water after completion min. | Scaling Visual evaluation (Amount attached to g/m²) Batch No. 10 | 30 | 50 | 100 | 150 | 200 |
|---|---|---|---|---|---|---|---|---|---|---|---|---|---|---|---|---|---|
| 1* | — | | — | | — | | — | — | | 300 / 350–280 | 60 | H(1000) | | | | | |
| 2* | — | | — | | — | | — | — | | 15 / 17–12 | " | H(900) | | | | | |
| 3* | Solvent Black 5 | | — | | — | | 0.5 | Methanol | | 300 / 350–270 | " | B | F | H(800) | | | |
| 4* | " | | — | | — | | " | Methanol | | 200 / 250–180 | " | B | F | H(500) | | | |
| 5* | " | | — | | — | | " | Methanol | | 150 / 180–130 | " | B | C | F | H(300) | | |
| 6* | " | | Colloidal silica | 100/50 | — | | 0.9 | Methanol | | 250 / 280–200 | " | B | D | F | H(300) | | |
| 7* | " | | " | 100/150 | Shellac resin | 100/50 | 1.5 | Methanol | | 300 / 340–270 | " | B | C | F | H(200) | | |
| 8* | " | | CuCl₂ | 100/2 | — | | 0.5 | Methanol | | 280 / 310–250 | " | B | C | F | H(350) | | |
| 9* | — | | Colloidal silica | 0/100 | — | | 0.5 | Methanol | | 15 / 17–12 | " | H(900) | | | | | |
| 10* | Solvent Black 7 | | FeCl₂ | 100/5 | — | | 0.5 | Methanol | | 230 / 280–200 | " | B | C | F | H(250) | | |
| 11* | Acid Black 2 | | Colloidal silica | 100/200 | — | | 0.9 | Methanol | | 250 / 290–210 | " | B | C | F | H(220) | | |
| 12* | Basic Black 2 | | Water glass | 100/150 | — | | 1.0 | Water/Isobutyl alcohol | 90/10 | 230 / 280–200 | " | B | C | F | H(400) | | |
| 13* | Acid Blue 102/Basic Orange 14 | 70/30 | Orthosilicic acid | 100/200 | — | | 1.5 | Water | | 260 / 290–230 | 60 | B | C | F | H(350) | | |
| 14* | Basic Red 2 | | Fe(OH)₃ sol | 100/50 | — | | 1.0 | Methanol | | 270 / 320–250 | " | B | C | G | H(400) | | |
| 15* | Basic Black 2 | | FeCl₂ | 100/3 | — | | 0.5 | Methanol | | 230 / 290–210 | " | B | C | F | H(300) | | |
| 16* | Basic Orange 2 | | Colloidal silica | 100/100 | — | | 1.0 | Water | | 250 / 300–220 | " | B | C | F | H(450) | | |
| 17* | Basic Brown 1 | | Fe(OH)₃ sol | 100/10 | — | | 0.5 | Water | | 300 / 350–280 | " | B | F | H(400) | | | |
| 18* | Acid Black 2 | | — | | — | | 0.5 | Water | | 310 / 370–290 | " | B | F | H(600) | | | |
| 19* | Disperse Black 29 | | — | | — | | 0.7 | Acetone | | 265 / 315–245 | " | B | F | H(700) | | | |
| 20* | Mordant Black 9 | | — | | — | | 0.5 | Water | | 285 / 335–265 | " | B | F | H(500) | | | |
| 21 | Basic Black 8 | | — | | — | | 0.5 | Water | | 15 / 18–13 | 10 | A | A | A | B | C | D(15) |
| 22 | Basic Brown 1 | | — | | — | | 0.6 | Water/Isobutyl alcohol | 90/10 | 18 / 21–26 | " | A | A | A | B | C | D(16) |
| 23 | Basic Brown 1 | | Fe(OH)₃ sol | 100/10 | — | | 0.6 | Water/ | 90/10 | 16 | " | A | A | A | A | A | A(0.2) |

TABLE 1-continued

| (1) Exp. No. | Dye or pigment (a) Kind | Mixing ratio | Inorganic compound (b) | (a)/(b) weight ratio | Polymeric compound (c) | (a)/(c) weight ratio | (2) conc. % | Solvent Kind | Mixing ratio | (3) $Cl^-$ conc. upper: average lower: max.-min. ppm | (4) Time for washing with water after completion min. | Visual evaluation Batch No. 10 | 30 | 50 | 100 | 150 | Scaling (Amount attached to g/m$^2$) 200 |
|---|---|---|---|---|---|---|---|---|---|---|---|---|---|---|---|---|---|
| 24 | Basic Orange 2 | | Colloidal silica | 100/100 | — | | 0.8 | Isobutyl alcohol | | 18-15 | " | A | A | A | A | A | A(0.5) |
| 25 | Basic Red 32 | | — | | — | | 0.3 | Water | | 13 15-10 | " | A | A | A | B | C | D(18) |
| 26 | Disperse Orange 5 | | — | | — | | 0.5 | Acetone | | 14 16-13 | 10 | A | A | A | A | B | C(9.5) |
| 27 | Disperse Violet 10 | | — | | — | | 0.9 | Acetone | | 10 12-8 | " | A | A | A | B | C | D(20) |
| 28 | Disperse Black 29 | | — | | — | | 1.0 | Acetone | | 11 13-9 | " | A | A | A | A | B | C(7) |
| 29 | Pigment Brown 4 | | — | | Polycyclohexylethylene | 100/50 | 1.5 | Methanol | | 12 14-10 | " | A | A | A | A | B | C(8) |
| 30 | Solvent Yellow 61/ Basic Blue 44 | 50/50 | — | | — | | 0.8 | Water/Methanol | 70/30 | 18 20-16 | " | A | A | A | A | B | C(9) |
| 31 | Solvent Brown 37/ Vat Blue 6 | 40/60 | — | | — | | 0.6 | Water/Methanol | 50/50 | 16 18-14 | 15 | A | A | A | A | B | C(10) |
| 32 | Vat Orange 15 | | — | | — | | 0.7 | Xylene | | 20 22-18 | " | A | A | A | A | B | C(7.5) |
| 33 | Vat Green 44 | | — | | — | | 0.5 | Water | | 9 11-7 | " | A | A | A | A | B | C(6.4) |
| 34 | Vat Brown 22 | | — | | — | | 0.5 | Water | | 5 7-3 | " | A | A | A | B | C | D(18) |
| 35 | Vat Orange 1/ Vat Blue 19 | 30/70 | — | | — | | 1.0 | Xylene | | 15 17-13 | " | A | A | A | A | B | C(10) |
| 36 | Basic Blue 7 | | $NiCl_2$ | 100/20 | — | | 1.2 | Water/n-Amyl alcohol | 80/20 | 13 15-10 | " | A | A | A | A | A | A(0.7) |
| 37 | Basic Orange 14 | | Water glass | 100/150 | — | | 0.9 | Water | | 9 11-7 | 15 | A | A | A | A | A | A(0.6) |
| 38 | Pigment Blue 15 | | — | | Polycyclopentadiene | 100/100 | 0.8 | THF | | 10 12-8 | " | A | A | A | B | B | C(9) |
| 39 | Pigment Red 87 | | — | | Poly(1,3-cyclohexadiene) | 100/30 | 0.8 | Acetone | | 13 15-10 | " | A | A | A | B | C | D(17) |
| 40 | Solvent Blue 73 | | — | | — | | 0.4 | Methanol | | 8 10-5 | 10 | A | A | A | A | B | C(10) |
| 41 | Solvent Red 49 | | — | | — | | 0.7 | Methanol | | 10 12-8 | " | A | A | A | A | B | C(11) |
| 42 | Solvent Red 49 | | Colloid of sulfur | 100/5 | — | | 0.7 | Methanol | | 15 17-13 | " | A | A | A | A | A | A(0.8) |
| 43 | Basic Orange 15 | | — | | — | | 1.3 | Water | | 14 16-12 | " | A | A | A | B | B | C(8) |
| 44 | Solvent Black 5 | | $CuCl_2$ | 100/2 | — | | 0.7 | Water/Methanol | 30/70 | 13 15-11 | " | A | A | A | A | A | A(0.2) |
| 45 | Basic Black 2 | | $FeCl_2$ | 100/3 | — | | 0.8 | Water | | 15 | " | A | A | A | A | A | A(0.3) |

TABLE 1-continued

| (1) Exp. No. | Dye or pigment(a) Kind | Mixing ratio | Inorganic compound (b) | Coating Solution (a)/(b) weight ratio | Polymeric compound (c) | (a)/(c) weight ratio | (2) conc. % | Solvent Kind | Mixing ratio | (3) Cl⁻ conc. upper: average lower: max.-min. ppm | (4) Time for washing with water after completion min. | Visual evaluation 10 | 30 | 50 | Scaling (Amount attached to g/m²) Batch No. 100 | 150 | 200 |
|---|---|---|---|---|---|---|---|---|---|---|---|---|---|---|---|---|---|
| 46 | Basic Blue 3 | | Metasilicic acid | 100/100 | — | | 1.5 | Water | | 17-12 / 17 | " | A | A | A | A | A | A(0.5) |
| 47 | Basic Blue 9 | | — | | — | | 0.8 | Water | | 19-15 / 15 | " | A | A | A | A | B | C(6.4) |
| 48 | Basic Red 13 | | — | | — | | 0.4 | Water/n-Butyl alcohol | 50/50 | 17-12 / 16 | " | A | A | A | B | C | D(18) |
| 49 | Solvent Black 5 | | Colloidal silica | 100/50 | — | | 0.6 | Water/Methanol | 20/80 | 18-13 / 18 | 10 | A | A | A | A | A | A(0.6) |
| 50 | Direct Orange 57 | | — | | — | | 0.7 | Water | | 20-15 / 15 | " | A | A | A | B | C | D(19) |
| 51 | Direct Orange 57 | | Colloid of stannic acid | 100/10 | — | | 0.7 | Water | | 17-13 / 10 | " | A | A | A | A | A | A(0.9) |
| 52 | Direct Red 1/Direct Blue 158 | 50/50 | — | | — | | 0.4 | Water | | 13-8 / 5 | " | A | A | A | A | B | C(7) |
| 53 | Direct Green 8 | | — | | — | | 0.6 | Water | | 7-3 / 16 | " | A | A | A | A | B | C(9) |
| 54 | Direct Brown 25 | | — | | — | | 0.5 | Water | | 18-14 / 13 | " | A | A | A | B | C | D(15) |
| 55 | Direct Brown 25 | | ZnCl₂ | 100/20 | — | | 0.5 | Water | | 15-10 / 11 | " | A | A | A | A | A | A(0.9) |
| 56 | Acid Yellow 11 | | — | | — | | 0.8 | Water | | 13-9 / 14 | " | A | A | A | B | C | D(18) |
| 57 | Acid Red 37 | | — | | — | | 0.4 | Water/n-Butyl alcohol | 50/50 | 16-11 / 10 | 15 | A | A | A | B | C | D(18) |
| 58 | Acid Blue 60/Acid Black 7 | | Fe(OH)₃ sol | 100/20 | — | | 0.7 | Water | | 12-7 / 9 | " | A | A | A | A | A | A(0.2) |
| 59 | Mordant Red 9 | | — | | — | | 0.8 | Water | | 11-6 / 7 | " | A | A | A | A | B | C(9) |
| 60 | Mordant Green 15 | | — | | — | | 1.0 | Water | | 9-4 / 18 | " | A | A | A | B | C | D(19) |
| 61 | Solvent Black 30 | | — | | Poly-acrylamide | 100/60 | 1.6 | Water/Methanol | 70/30 | 20-15 / 17 | 15 | A | A | A | A | A | B(2.5) |
| 62 | Mordant Black 9 | | — | | — | | 0.6 | Water | | 19-14 / 9 | " | A | A | A | B | B | C(10) |
| 63 | Acid Green 12 | | — | | — | | 0.4 | Water | | 11-6 / 18 | 10 | A | A | A | A | C | D(18) |
| 64 | Acid Green 12 | | Co(CH₃—COO)₂ | 100/15 | — | | 0.4 | Water | | 20-15 / 15 | 15 | A | A | A | A | A | A(0.6) |
| 65 | Acid Violet 78 | | — | | — | | 0.8 | " | | 18-13 / 15 | 10 | A | A | A | B | C | D(15) |
| 66 | Acid Blue 151 | | — | | Polycyclo-pentylethyl | 100/20 | 0.6 | Water/Methanol | 30/70 | 17-12 / 13 | 10 | A | A | A | A | A | A(0.2) |
| 67 | Solvent Red 109 | | — | | — | | 0.3 | Methanol | | 15-10 / 11 / 13-7 | " | A | A | A | A | A | B(2.5) |

TABLE 1-continued

| (1) Exp. No. | Dye or pigment(a) Kind | Mixing ratio | Coating Solution Inorganic compound (b) | (a)/(b) weight ratio | Polymeric compound (c) | (a)/(c) weight ratio | (2) conc. % | Solvent Kind | Mixing ratio | (3) Cl⁻ conc. upper: average lower: max.-min. ppm | (4) Time for washing with water after completion min. | Visual evaluation 10 | 30 | 50 | Scaling (Amount attached to g/m²) Batch No. 100 | 150 | 200 |
|---|---|---|---|---|---|---|---|---|---|---|---|---|---|---|---|---|---|
| 68 | Acid Black 159 | | Metasilicic acid | 100/300 | — | | 1.6 | Water/Isobutyl alcohol | 90/10 | 14 / 16-11 | " | A | A | A | A | A | A(0.3) |
| 69 | Mordant Black 13 | | — | | — | | 0.8 | Water | | 12 / 14-9 | " | A | A | A | B | C | D(19) |
| 70 | Acid Red 80/Food Blue 1 | 40/60 | ZnCl₂ | 100/2 | — | | 0.5 | Water | | 18 / 20-15 | " | A | A | A | A | A | A(0.5) |
| 71 | Acid Blue 74 | | — | | — | | 0.6 | Water | | 19 / 21-16 | " | A | A | A | B | C | D(20) |
| 72 | Acid Blue 74 | | Colloid of molybdenum oxide | 100/20 | — | | 0.6 | " | | 14 / 17-12 | " | A | A | A | A | A | A(0.4) |
| 73 | Direct Blue 86 | | — | | — | | 0.8 | Water | | 17 / 19-14 | 10 | A | A | A | B | C | D(15) |
| 74 | Mordant Black 58 | | — | | — | | 1.0 | Water | | 20 / 22-18 | " | A | A | A | B | C | D(17) |
| 75 | Solvent Black 3 | | Colloidal silica | 100/50 | — | | 0.6 | Water/Methanol | 20/80 | 14 / 16-11 | " | A | A | A | A | A | A(0.4) |
| 76 | Acid Green 9 | | — | | — | | 0.5 | Water | | 15 / 17-12 | " | A | A | A | B | C | D(19) |
| 77 | Mordant Violet 15 | | — | | — | | 0.7 | Water | | 13 / 15-10 | " | A | A | A | A | B | C(10) |
| 78 | Mordant Violet 15 | | Al(OH)₃ sol | 100/2 | — | | 0.7 | Water | | 13 / 16-11 | " | A | A | A | A | A | A(0.5) |
| 79 | Pigment Green 2 | | — | | Polyallene | 100/100 | 2.0 | Water/Methanol | 50/50 | 14 / 16-11 | 15 | A | A | A | A | B | C(9) |
| 80 | Pigment Violet 1 | | — | | Cellulose acetate | 100/30 | 1.3 | Water/Methanol | 20/80 | 9 / 11-6 | " | A | A | A | A | B | C(10) |
| 81 | Food Red 14 | | — | | — | | 0.2 | Water | | 7 / 9-4 | " | A | A | A | B | C | D(20) |
| 82 | Acid Black 2 | | Colloidal silica | 100/200 | — | | 0.7 | Water/n-Amyl alcohol | 90/10 | 5 / 7-3 | 15 | A | A | A | A | A | A(0.7) |
| 83 | Acid Blue 59 | | — | | — | | 0.5 | Water | | 12 / 14-9 | " | A | A | A | A | A | B(1.5) |
| 84 | Direct Blue 106 | | — | | — | | 0.5 | Water | | 16 / 18-13 | " | A | A | A | B | C | D(19) |
| 85 | Direct Blue 108 | | — | | — | | 0.8 | Water | | 20 / 22-7 | " | A | A | A | B | C | D(20) |
| 86 | Acid Blue 102/Basic Orange 14 | 80/20 | Orthosilicic acid | 100/200 | — | | 0.5 | Water/Isobutyl alcohol | 95/5 | 15 / 17-12 | " | A | A | A | A | A | A(0.2) |
| 87 | Solvent Black 5 | | Colloidal silica | 100/150 | Shellac resin | 100/50 | 1.0 | Methanol | | 14 / 16-11 | " | A | A | A | A | A | A(0.3) |
| 88 | Solvent Black 5 | | — | | — | | 0.5 | Methanol | | 12 / 14-9 | " | A | A | A | A | A | A(0.5) |
| 89 | Basic Red 2 | | Fe(OH)₃ sol | 100/50 | — | | 0.8 | Methanol | | 15 | " | A | A | A | A | A | A(0.9) |

TABLE 1-continued

| (1) Exp. No. | Dye or pigment(a) Kind | Mixing ratio | Inorganic compound (b) | Coating Solution (a)/(b) weight ratio | Polymeric compound (c) | (a)/(c) weight ratio | (2) conc. % | Solvent Kind | Mixing ratio | (3) Cl⁻ conc. upper: average lower: max.-min. ppm | (4) Time for washing with water after completion min. | Scaling Visual evaluation Batch No. 10 30 50 100 150 | | | | | Amount attached to g/m² 200 |
|---|---|---|---|---|---|---|---|---|---|---|---|---|---|---|---|---|---|
| 90 | Solvent Black 7 | | FeCl₂ | 100/5 | — | | 0.5 | Methanol | | 17-13 14 16-10 | " | A | A | A | A | A | A(0.7) |

Notes:
(1) *comparative examples
(2) Dye or pigment concentration in coating solution.
(3) Chloride ion concentration in slurry after completion of polymerization
(4) Flow rate of water 0.1 m³/m²h

EXAMPLE 2

As shown in Table 2, for each experiment, a dye or a pigment was dissolved or dispersed in a solvent, optionally with the addition of an inorganic compound or a polymeric compound as shown in the same Table to prepare a coating solution. The formulation ratio of the inorganic compound and the polymeric compound and the concentration of dye or pigment in the coating solution are also shown in Table 2. The coating solution was applied on the polished inner wall surface of a stainless steel polymerizer of an inner volume of 1000 liters and the portions which may contact with monomers such as stirrer, dried at 70° C. for 20 minutes and then thoroughly washed with water.

Next, the thus coated polymerizer was charged with 200 Kg of vinyl chloride monomer, 400 Kg of deionized water, 2.2 Kg of sodium lauryl sulfate, 3.2 Kg of cetyl alcohol and 300 g of $\alpha,\alpha'$-azobis-2,4-dimethylvaleronitrile, and polymerization was carried out at 50° C. for 10 hours. After completion of polymerization, the polymer was taken out and the polymerizer was washed internally with water at a flow rate of 0.1 $m^3/m^2hr$, as shown in Table 2. The above operations from coating and charging to washing with water were conducted for each batch and this was repeated for a maximum of 200 batches.

The chloride ion concentration was controlled and the scaling was evaluated similarly as described in Example 1. The conditions and the results are shown in Table 2.

In Table 2, the Experiment numbers marked with an asterisk (*) indicate Comparative examples. In particular, Experiment Nos. 91 and 92 are examples in which the inner wall surface of the polymerizer was subjected to no treatment with any compound. Also, the coating solution employed in Experiment Nos. 104 and 149 was prepared by dissolving one part of sodium sulfide in 100 parts of water and adding 0.5 part of a dye to the resultant solution, followed by heating at 80° C. for 30 minutes.

TABLE 2

| (1) Exp. No. | Dye or pigment (a) Kind | Mixing ratio | Inorganic compound (b) | (a)/(b) weight ratio | Polymeric compound (c) | (a)/(c) weight ratio | (2) conc. % | Solvent Kind | Mixing ratio |
|---|---|---|---|---|---|---|---|---|---|
| 91* | — | | — | | — | | | — | |
| 92* | — | | — | | — | | | — | |
| 93* | Acid Green 16 | | — | | — | | 0.5 | Water/Isobutyl alcohol | 90/10 |
| 94* | " | | 12-Silicotungstic acid | 100/150 | — | | 0.5 | Water | |
| 95* | Acid Green 40 | | Colloidal silica | 100/100 | — | | 1.0 | Methanol | |
| 96* | " | | " | 0/100 | — | | 1.0 | Water | |
| 97* | Acid Black 2 | | Silicomolybdic acid | 100/100 | — | | 1.0 | " | |
| 98* | Solvent Black 5 | | — | | — | | 0.5 | Methanol | |
| 99* | " | | $CuCl_2$ | 100/10 | — | | 0.5 | " | |
| 100* | Basic 47 | | Water glass | 100/200 | — | | 0.8 | Water | |
| 101* | Pigment Blue 25/Solvent Black 3 | 50/50 | Colloidal silica | 100/400 | — | | 2.0 | Water/Methanol | 10/90 |
| 102* | Solvent Red 8 | | — | | — | | 0.5 | Methanol | |
| 103* | Pigment Red 81 | | — | | Polystyrene | 100/40 | 1.2 | Toluene | |
| 104* | Sulfur Brown 7 | | Colloidal silica | 100/60 | — | | 1.0 | Water | |
| 105 | Disperse Red 12 | | — | | — | | 0.5 | Acetone | |
| 106 | Acid Red 8 | | — | | — | | 0.8 | Water | |
| 107 | Basic Blue 64 | | — | | — | | 0.7 | " | |
| 108 | Pigment Blue 25/Solvent Black 3 | 50/50 | Colloidal silica | 100/400 | — | | 1.8 | Water/Methanol | 10/90 |
| 109 | Mordant Green 15 | | — | | — | | 0.4 | Water | |
| 110 | Solvent Red 8 | | — | | — | | 0.5 | Methanol | |
| 111 | Solvent Red 8 | | Colloid of vanadium pentoxide | 100/3 | — | | 0.5 | " | |
| 112 | Acid Yellow 99 | | — | | — | | 0.3 | Water | |
| 113 | Solvent Orange 40 | | — | | Poly(4-vinylpyridine) | 100/100 | 1.0 | Methanol | |
| 114 | Basic Blue 47 | | Water glass | 100/200 | — | | 0.8 | Water | |
| 115 | Vat Black 25/Disperse Violet 30 | 60/40 | — | | Poly(N—vinylcarbazole) | 100/70 | 0.7 | Methanol | |
| 116 | Solvent Blue 35 | | Mesosilicic acid | 100/20 | — | | 0.5 | " | |
| 117 | Direct Red 9 | | — | | — | | 0.8 | Water/n-Butyl alcohol | 80/20 |
| 118 | Acid Green 40 | | Colloidal silica | 100/100 | — | | 1.0 | Water/Methanol | 40/60 |
| 119 | Acid Red 82 | | — | | — | | 1.0 | Water/Methanol | 50/50 |
| 120 | Solvent Black 5 | | $CuCl_2$ | 100/10 | — | | 0.6 | Water/Methanol | 30/70 |
| 121 | Solvent Black 5 | | — | | — | | 0.4 | Methanol | |
| 122 | Vat Blue 41 | | — | | — | | 0.4 | Xylene | |
| 123 | Solubilized Vat Black 1 | | Mesodisilicic acid | 100/300 | — | | 0.7 | Water | |
| 124 | Vat Violet 3 | | — | | — | | 0.5 | Xylene | |
| 125 | Pigment Green 37 | | — | | Polyvinylmethylether | 100/40 | 1.0 | Methylene chloride | |
| 126 | Mordant Green 58 | | — | | — | | 1.2 | Water | |
| 127 | Solvent Black 7 | | Mesotetrasilicic acid | 100/100 | — | | 1.0 | Methylene chloride | |
| 128 | Basic Orange 2 | | Metasilicic acid | 100/40 | — | | 0.8 | Water | |

TABLE 2-continued

| | | | | | | | |
|---|---|---|---|---|---|---|---|
| 129 | Basic Yellow 2 | — | | — | | 0.4 | " |
| 130 | Basic Blue 40 | — | | — | | 0.6 | " |
| 131 | Acid Green 16 | 12-Silicotungstic acid | 100/150 | — | | 0.5 | " |
| 132 | Basic Orange 14 | — | | — | | 1.0 | Water/ Isobutyl alcohol |
| 133 | Basic Orange 14 | MgCl₂ | 100/10 | — | | 1.0 | Water/ Isobutyl alcohol 90/10 |
| 134 | Pigment Red 81 | — | | Polystyrene | 100/50 | 1.2 | Toluene |
| 135 | Acid Red 87 | — | | — | | 0.8 | Water |
| 136 | Acid Blue 59/ Solvent Blue 73 30/70 | — | | — | | 0.8 | Water/ Methanol 40/60 |
| 137 | Acid Black 2 | Silicomolybdic acid | 100/100 | — | | 1.0 | Water |
| 138 | Basic Blue 3 | — | | — | | 2.0 | " |
| 139 | Direct Blue 106 | — | | — | | 0.4 | Water |
| 140 | Acid Yellow 3 | Sodium orthosilicate | 100/20 | — | | 1.2 | " |
| 141 | Basic Blue 24 | — | | — | | 0.8 | " |
| 142 | Basic Red 27 | Water glass | 100/200 | — | | 0.3 | " |
| 143 | Disperse Yellow 54 | — | | Polystyrene | 100/30 | 0.6 | Toluene |
| 144 | Acid Yellow 1 | — | | — | | 0.8 | Water/ Isoamyl alcohol 70/30 |
| 145 | Acid Yellow 1 | Zn(CH₃—COO)₂ | 100/5 | — | | 0.8 | Water |
| 146 | Disperse Blue 58 | — | | — | | 0.5 | Acetone |
| 147 | Pigment Red 123 | — | | Poly(1-nitropropylene) | 100/50 | 1.0 | DMF |
| 148 | Vat Orange 15 | — | | — | | 0.8 | Xylene |
| 149 | Sulfur Red 3 | — | | — | | 1.0 | Water |
| 150 | Solubilized Sulfur Blue 15 | — | | — | | 0.7 | " |
| 151 | Sulfur Brown 7 | Colloidal silica | 100/60 | — | | 2.0 | Water |
| 152 | Fluorescent Brightening Agent 163 | — | | — | | 0.8 | " |
| 153 | Fluorescent Brightening Agent 90 | — | | — | | 0.8 | " |
| 154 | Azoic Black 1 | Metasilicic acid | 100/50 | — | | 1.0 | " |
| 155 | Reactive Blue 8 | — | | — | | 0.6 | " |
| 156 | Reactive Black 18 | — | | — | | 0.6 | Water/ Isobutyl alcohol 80/20 |
| 157 | Reactive Black 18 | Colloid of manganese dioxide | 100/2 | — | | 0.6 | Water |

| (1) Exp. No. | (3) Cl⁻ conc. upper: average lower: max.–min. ppm | (4) Time for washing with water after completion min. | Scaling Visual evaluation (Amount attached g/m²) Batch No. | | | | | |
|---|---|---|---|---|---|---|---|---|
| | | | 10 | 30 | 50 | 100 | 150 | 200 |
| 91* | 300 260–320 | 60 | H(1400) | | | | | |
| 92* | 13 8–17 | " | H(1200) | | | | | |
| 93* | 290 260–310 | " | G | H(1100) | | | | |
| 94* | 300 260–320 | " | B | C | F | H(900) | | |
| 95* | 350 310–390 | " | B | C | F | H(800) | | |
| 96* | 15 11–19 | " | H(1200) | | | | | |
| 97* | 280 260–290 | " | B | C | F | H(700) | | |
| 98* | 300 260–320 | " | B | F | H(1000) | | | |
| 99* | 300 260–320 | " | B | C | F | H(950) | | |
| 100* | 270 240–280 | " | B | C | F | H(750) | | |
| 101* | 320 270–350 | " | B | C | F | H(650) | | |
| 102* | 300 270–320 | " | B | F | H(1000) | | | |
| 103* | 250 220–280 | " | B | F | H(900) | | | |
| 104* | 300 270–320 | " | B | F | H(950) | | | |
| 105 | 13 9–18 | 10 | A | A | A | B | C | D(20) |
| 106 | 15 11–20 | " | A | A | A | B | C | D(19) |
| 107 | 14 | " | A | A | B | C | D | F(58) |

TABLE 2-continued

| | | | | | | | | |
|---|---|---|---|---|---|---|---|---|
| 108 | 9-18 17 | " | A | A | A | A | A | B(3) |
| 109 | 13-21 10 | " | A | A | A | B | C | D(18) |
| 110 | 6-14 15 | " | A | A | A | B | C | D(20) |
| 111 | 11-19 10 | " | A | A | A | A | A | B(3) |
| 112 | 8-13 5 | " | A | A | B | C | D | F(60) |
| 113 | 3-7 9 | " | A | A | A | A | B | C(10) |
| 114 | 5-13 16 | 15 | A | A | A | A | A | B(3) |
| 115 | 13-18 8 | " | A | A | A | B | C | D(20) |
| 116 | 6-11 15 | " | A | A | A | A | A | B(1.5) |
| 117 | 10-18 9 | " | A | A | A | B | C | D(20) |
| 118 | 5-12 16 | " | A | A | A | A | A | B(2.5) |
| 119 | 13-19 8 | " | A | A | B | C | D | F(59) |
| 120 | 5-10 7 | " | A | A | A | A | A | B(3) |
| 121 | 5-9 20 | " | A | A | A | A | B | C(5) |
| 122 | 15-23 11 | 10 | A | A | B | C | D | F(55) |
| 123 | 8-14 7 | " | A | A | A | A | A | B(1.5) |
| 124 | 6-8 15 | " | A | A | A | B | C | D(18) |
| 125 | 11-17 16 | " | A | A | A | B | C | D(19) |
| 126 | 11-18 10 | " | A | A | A | B | C | D(20) |
| 127 | 5-12 14 | " | A | A | A | A | A | B(3) |
| 128 | 10-18 18 | 15 | A | A | A | A | A | B(4) |
| 129 | 15-21 11 | " | A | A | A | B | C | D(18) |
| 130 | 9-14 17 | " | A | A | A | B | C | D(17) |
| 131 | 15-19 10 | " | A | A | A | A | A | B(3) |
| 132 | 8-13 14 | " | A | A | B | C | D | F(60) |
| 133 | 11-16 11 | – | A | A | A | A | A | B(2.5) |
| 134 | 9-13 12 | " | A | A | B | C | D | F(59) |
| 135 | 9-14 9 | " | A | A | B | C | D | F(57) |
| 136 | 7-11 12 | " | A | A | A | A | B | C(6) |
| 137 | 10-14 11 | " | A | A | A | A | A | B(3) |
| 138 | 9-14 19 | " | A | A | B | C | D | F(60) |
| 139 | 15-23 13 | " | A | A | B | C | D | F(60) |
| 140 | 10-15 10 | " | A | A | A | A | A | B(3) |
| 141 | 8-12 9 | " | A | A | B | C | D | F(56) |
| 142 | 6-11 14 | " | A | A | A | A | A | B(2.5) |
| 143 | 10-18 17 | " | A | A | A | B | C | D(20) |
| 144 | 15-19 12 | " | A | A | B | C | D | F(59) |
| 145 | 9-14 12 | 10 | A | A | A | A | A | B(2.0) |
| 146 | 9-14 10 | 15 | A | A | B | C | D | F(57) |
| 147 | 8-12 13 | " | A | A | A | B | C | D(19) |
| 148 | 10-15 9 | 10 | A | A | B | C | D | F(57) |

TABLE 2-continued

| | | | | | | | | |
|---|---|---|---|---|---|---|---|---|
| 149 | 20 / 5-11 / 15-23 | " | A | A | A | B | C | D(18) |
| 150 | 17 / 15-19 | " | A | A | B | C | D | F(53) |
| 151 | 16 / 14-19 | " | A | A | A | A | A | B(2.5) |
| 152 | 11 / 8-14 | " | A | A | A | B | C | D(15) |
| 153 | 6 / 3-8 | " | A | A | B | C | D | F(54) |
| 154 | 13 / 10-15 | " | A | A | A | A | A | B(3) |
| 155 | 10 / 9-11 | " | A | A | A | B | C | D(16) |
| 156 | 15 / 12-17 | " | A | A | A | B | C | D(20) |
| 157 | 14 / 11-17 | " | A | A | A | A | A | B(3) |

Notes:
(1) *comparative examples
(2) Dye or pigment concentration in coating solution.
(3) Chloride ion concentration in slurry after completion of polymerization
(4) Flow rate of water 0.1 m³/m²h

EXAMPLE 3

As shown in Table 3, for each experiment, a dye or a pigment was dissolved or dispersed in a solvent, optionally with the addition of an inorganic compound or a polymeric compound as shown in the same Table to prepare a coating solution. The formulation ratio of the inorganic compound and the polymeric compound and the concentration of the dye or pigment in the coating solution are also shown in Table 3. The coating solution was applied on the polished inner wall surface of a stainless steel polymerizer of an inner volume of 1000 liters and the portions which may contact with monomers such as stirrer, dried at 70° C. for 20 minutes and then thoroughly washed with water.

Next, the thus coated polymerizer was charged with 160 Kg of vinyl chloride monomer, 40 Kg of vinyl acetate monomer, 400 Kg of deionized water, 600 g of gelatin, 2Kg of Triclene and 350 g of lauroyl peroxide, and polymerization was carried out at 70° C. for 6 hours. After completion of polymerization, the polymer was taken out and the polymerizer was washed internally with water at a flow rate of 0.1 m³/m²hr, as shown in Table 3. The operations from coating and charging to washing with water were conducted for each batch and this was repeated for a maximum of 200 batches.

The chloride ion concentration was controlled and the scaling was evaluated similarly as described in Example 1. The conditions and the results are shown in Table 3.

In Table 3, the Experiment numbers marked with an asterisk (*) indicate Comparative examples. In particular, Experiment Nos. 158 and 159 are examples in which the inner wall surface of the polymerizer was subjected to no treatment with any compound. Also, the coating solution employed in Experiment No. 195 was prepared by dissolving one part of sodium sulfide in 100 parts of water and adding 0.5 part of a dye to the resultant solution, followed by heating at 80° C. for 30 minutes.

TABLE 3

| (1) Exp. No. | Dye or pigment (a) Kind | Mixing ratio | Inorganic compound (b) | (a)/(b) weight ratio | Polymeric compound (c) | (a)/(c) weight ratio | (2) conc. % | Solvent Kind | Mixing ratio | (3) Cl⁻ conc. upper: average lower: max.-min. ppm | (4) Time for washing with water after completion min. | Scaling Visual evaluation (Amount attached g/m²) Batch No. 10 | 30 | 50 | 100 | 150 | 200 |
|---|---|---|---|---|---|---|---|---|---|---|---|---|---|---|---|---|---|
| 158* | — | | — | | — | | | — | | 350 / 390-320 | 60 | H(1100) | | | | | |
| 159* | — | | — | | — | | | — | | 10 / 12-7 | " | H(1000) | | | | | |
| 160* | Solvent Black 7 | | — | | — | | 0.5 | Methanol | | 300 / 350-280 | " | B | F | H(500) | | | |
| 161* | " | | — | | Polytetra-hydrofuran | 100/30 | 0.6 | THF | | 280 / 330-260 | " | B | F | H(300) | | | |
| 162* | Basic Orange 2 | | Colloidal silica | 100/100 | — | | 1.0 | Water | | 290 / 350-270 | " | B | C | F | H | | |
| 163* | Solvent Black 5 | | — | | Shellac resin | 100/50 | 0.8 | Methanol | | 250 / 280-230 | " | B | F | H(400) | | | |
| 164* | " | | Fe(OH)₃ sol | 100/10 | — | | 1.0 | " | | 290 / 340-270 | " | B | C | F | H(300) | | |
| 165* | Acid Black 2 | | Water glass | 100/100 | — | | 1.5 | Water/Methanol | 50/50 | 260 / 300-240 | " | B | C | F | H(250) | | |
| 166* | Basic Orange 14 | | Metasilicic acid | | — | | 1.5 | Methanol | | 250 / 300-220 | " | B | C | F | H(280) | | |
| 167* | — | | Colloidal silica | 0/100 | — | | 1.0 | Water | | 280 / 340-260 | " | H(900) | | | | | |
| 168* | Solvent Blue 2 | | — | | — | | 0.5 | Methanol | | 270 / 320-250 | " | B | F | H(400) | | | |
| 169* | Vat Violet 2 | | — | | — | | 0.5 | Xylene | | 290 / 340-270 | " | B | F | H(500) | | | |
| 170 | Solvent Black 7 | | — | | Polytetra-hydrofuran | 100/30 | 0.6 | THF | | 17 / 19-14 | 10 | A | A | A | A | A | A(0.3) |
| 171 | Solvent Black 7 | | — | | — | | 0.5 | Methanol | | 16 / 18-13 | " | A | A | A | A | A | A(0.5) |
| 172 | Pigment Red 17 | | — | | Polyphenyl-acetylene | | 0.8 | " | | 10 / 12-7 | " | A | A | A | B | B | C(10) |
| 173 | Direct Blue 86 | | Orthosilicic acid | 100/20 | — | | 0.8 | Water | | 16 / 18-12 | " | A | A | A | A | A | A(0.7) |
| 174 | Basic Orange 2 | | Colloidal silica | 100/100 | — | | 1.0 | Water/n-Butyl alcohol | 90/10 | 11 / 13-7 | " | A | A | A | A | A | A(0.5) |
| 175 | Direct Black 74 | | — | | — | | 0.5 | Water | | 9 / 11-6 | 15 | A | A | A | B | C | D(20) |
| 176 | Solvent Red 121 | | — | | — | | 0.6 | Methanol | | 13 / 15-10 | " | A | A | A | B | C | D(19) |
| 177 | " | | Colloid of lithium silicate | 100/100 | — | | 0.6 | " | | 17 / 20-15 | " | A | A | A | A | A | A(0.9) |
| 178 | Solvent Black 5 | | — | | Shellac resin | 100/50 | 0.8 | " | | 18 / 20-15 | " | A | A | A | A | A | A(0.6) |
| 179 | Vat Black 8 | | — | | — | | 0.6 | Acetone | | 12 / 14-9 | " | A | A | A | B | C | D(17) |
| 180 | Mordant Black 13 | | Metasilicic acid | 100/200 | — | | 0.7 | Water | | 9 / 11-5 | " | A | A | A | A | A | A(0.9) |

TABLE 3-continued

| (1) Exp. No. | Dye or pigment (a) Kind | Mixing ratio | Coating Solution Inorganic compound (b) | (a)/(b) weight ratio | Polymeric compound (c) | (a)/(c) weight ratio | (2) conc. % | Solvent Kind | Mixing ratio | (3) Cl⁻ conc. upper: max.-min. lower: avg. ppm | (4) Time for washing with water after completion min. | Visual evaluation Batch No. 10 | 30 | 50 | 100 | 150 | Scaling (Amount attached g/m²) 200 |
|---|---|---|---|---|---|---|---|---|---|---|---|---|---|---|---|---|---|
| 181 | Solvent Blue 36 | | — | | — | | 0.4 | Methanol | | 6 / 8-3 | " | A | A | A | A | B | C(10) |
| 182 | Acid Red 80/ Basic Orange 2 | 80/20 | — | | — | | 0.8 | Water/ Methanol | 50/50 | 13 / 15-10 | 10 | A | A | A | A | A | B(3) |
| 183 | Solvent Black 5 | | Fe(OH)₃ sol | 100/10 | — | | 1.0 | Water/ Methanol | 40/60 | 11 / 13-6 | " | A | A | A | A | A | A(0.5) |
| 184 | Reduced Vat Blue 1 | | — | | — | | 0.6 | Water | | 18 / 20-15 | " | A | A | A | B | C | D(19) |
| 185 | Vat Violet 2 | | — | | — | | 0.4 | Xylene | | 14 / 19-14 | " | A | A | A | B | C | D(19) |
| 186 | Mordant Green 29 | | — | | — | | 0.3 | Water | | 19 / 21-16 | " | A | A | A | B | C | D(18) |
| 187 | Solvent Blue 2 | | — | | — | | 0.7 | Methanol | | 20 / 22-17 | 15 | A | A | A | B | C | D(17) |
| 188 | " | | CoCl₂ | 100/1 | — | | 0.7 | " | | 20 / 22-18 | 10 | A | A | A | A | A | A(0.5) |
| 189 | Food Red 14 | | — | | — | | 0.8 | Water | | 12 / 14-9 | 15 | A | A | A | B | C | D(16) |
| 190 | " | | AlCl₃ | 100/1 | — | | 0.8 | " | | 12 / 14-9 | 10 | A | A | A | A | A | A(0.5) |
| 191 | Acid Black 2 | | Water glass | 100/100 | — | | 1.5 | Water/ Isobutyl alcohol | | 5 / 7-3 | 15 | A | A | A | A | A | A(0.7) |
| 192 | Solvent Yellow 33 | | — | | — | | 0.8 | Water | | 16 / 18-13 | " | A | A | A | B | C | D(15) |
| 193 | Basic Orange 14 | | Metasilicic acid | 100/500 | — | | 1.5 | Water/ sec-Butyl alcohol | | 11 / 13-8 | 15 | A | A | A | A | A | A(0.9) |
| 194 | Acid Brown 161 | | — | | — | | 0.6 | Water | | 17 / 19-14 | " | A | A | A | B | C | D(20) |
| 195 | Sulfur Blue 9 | | — | | — | | 0.7 | " | | 14 / 16-11 | " | A | A | A | A | B | C(10) |
| 196 | Fluorescent Brightening Agent 14 | | — | | — | | 0.4 | " | | 8 / 10-5 | " | A | A | A | B | C | D(19) |
| 197 | Reactive Green 8 | | — | | — | | 0.5 | " | | 16 / 18-12 | " | A | A | A | B | C | D(15) |
| 198 | Azoic Yellow 2 | | — | | — | | 0.5 | Methanol | | 9 / 11-6 | " | A | A | A | B | C | D(16) |
| 199 | " | | CoCl₂ | 100/3 | — | | 0.5 | " | | 13 / 16-11 | 10 | A | A | A | A | A | A(0.7) |

Notes:
(1) *comparative examples
(2) Dye or pigment concentration in coating solution.
(3) Chloride ion concentration in slurry after completion of polymerization
(4) Flow rate of water 0.1 m³/m²h

EXAMPLE 4

As shown in Table 4, for each experiment, a dye or a pigment was dissolved or dispersed in a solvent, optionally with the addition of an inorganic compound or a polymeric compound as shown in the same Table to prepare a coating solution. The formulation ratio of the inorganic compound or the polymeric compound and the concentration of the dye or pigment in the coating solution are also shown in Table 4. The coating solution was applied on the polished inner wall surface of a stainless steel polymerizer of an inner volume of 1000 liters and the portions which may contact with monomers such as stirrer, dried at 80° C. for 10 minutes and then thoroughly washed with water.

Next, the thus coated polymerizer was charged with 200 Kg of vinyl chloride monomer, 400 Kg of deionized water, 40 g of a partially saponified polyvinyl alcohol, 60 g of hydroxypropylmethyl cellulose and 80 g of di-2-ethylhexylperoxycarbonate, and polymerization was carried out at 57° C. for 7 hours. After completion of polymerization, the polymer was taken out and the polymerizer was washed internally with water at a flow rate of 0.1 m$^3$/m$^2$hr, as shown in Table 4. The above operations from coating and charging to washing with water were conducted for each batch and this was repeated for a maximum of 200 batches.

The chloride ion concentration was controlled and the scaling was evaluated similarly as described in Example 1. Also, the numbers of fish eyes in the products obtained from the polymers produced in the 10th, 30th, 50th, 100th, 150th and 200th batches in each experiment were measured as follows. A mixture of 100 parts by weight of a polymer obtained by dehydrating and drying the slurry after polymerization, 50 parts by weight of DOP, 1 part by weight of dibutyltin laurate, 1 part by weight of cetyl alcohol, 0.25 part by weight of titanium oxide and 0.05 part by weight of carbon black was kneaded between two rolls at 150° C. for 7 minutes and then formed into a sheet with a thickness of 0.2 mm. The number of fish eyes per 100 cm$^2$ contained in the sheet was examined according to the light transmission method. The conditions and the results are shown in Table 4.

In Table 4, the Experiment numbers marked with an asterisk (*) indicate Comparative examples. In particular, Experiment Nos. 185 and 186 are examples in which the inner wall surface of the polymerizer was subjected to no treatment with any compound.

TABLE 4

| (1) Exp. No. | Dye or pigment (a) Kind | Mixing ratio | Inorganic compound (b) | (a)/(b) weight ratio | Polymeric compound (c) | (a)/(c) weight ratio | (2) conc. % | Solvent Kind | Mixing ratio |
|---|---|---|---|---|---|---|---|---|---|
| 200* | — | | — | | — | | | — | |
| 201* | — | | — | | — | | | — | |
| 202* | Solvent Black 7 | | — | | — | | 0.5 | Methanol | |
| 203* | " | | Fe(OH)$_2$ sol | 100/20 | — | | 0.5 | Water/Methanol | 10/90 |
| 204* | Basic Orange 2/Solvent Black 3 | 60/40 | — | | — | | 0.8 | Water/Methanol | 50/50 |
| 205* | Solvent Black 5 | | Colloidal silica | 100/80 | — | | 0.8 | Methanol | |
| 206* | Acid Black 2 | | Metasilicic acid | 100/50 | — | | 0.8 | Water | |
| 207 | Solvent Black 7 | | Fe(O)H$_3$ sol | 100/20 | — | | 0.5 | Water/Methanol | 10/90 |
| 208 | Basic Orange 2/Solvent Black 3 | 60/40 | — | | — | | 0.8 | Water/Methanol | 50/50 |
| 209 | Solubilized Sulfur Brown 1 | | — | | — | | 0.8 | Water | |
| 210 | Solvent Black 5 | | Colloidal silica | 100/80 | — | | 0.8 | Methanol | |
| 211 | Azoic Black 5 | | | | Shellac resin | 100/100 | 1.0 | " | |
| 212 | Pigment Green 38 | | — | | Ethylcellulose | 100/40 | 1.4 | Ethanol | |
| 213 | Solvent Black 5 | | — | | — | | 0.5 | Methanol | |
| 214 | Basic Orange 14 | | — | | — | | 0.9 | Water/Isobutyl alcohol | 90/10 |
| 215 | Solvent Black 23 | | — | | — | | 0.8 | Methanol | |
| 216 | Solvent Blue 73 | | — | | — | | 0.4 | " | |
| 217 | Acid Black 2 | | Metasilicic acid | 100/50 | — | | 0.8 | Water | |

| (1) Exp. No. | (3) Cl$^-$ conc. upper: average lower: max.-min. ppm | (4) Time for washing with water after completion min. | Scaling Visual evaluation (Amount attached g/m$^2$) Batch No. 10 | 30 | 50 | 100 | 150 | 200 | Fish eyes (number) Batch No. 10 | 30 | 50 | 100 | 150 | 200 |
|---|---|---|---|---|---|---|---|---|---|---|---|---|---|---|
| 200* | 300 260-300 | 60 | H(1000) | | | | | | 300 | | | | | |
| 201* | 10 8-12 | " | H(950) | | | | | | 280 | | | | | |
| 202* | 290 250-310 | " | B | F | H(700) | | | | 10 | 180 | 250 | | | |
| 203* | 300 260-330 | " | B | C | F | H(500) | | | 13 | 50 | 60 | 100 | | |
| 204* | 280 240-300 | " | B | F | H(650) | | | | 11 | 120 | 190 | | | |
| 205* | 250 200-270 | " | B | C | F | H(500) | | | 18 | 40 | 80 | 120 | | |
| 206* | 260 210-290 | " | B | C | F | H(560) | | | 15 | 50 | 100 | 150 | | |
| 207 | 14 | 15 | A | A | A | A | A | A(0.5) | 0 | 0 | 0 | 0 | 2 | 10 |

TABLE 4-continued

| | | | | | | | | | | | | | | |
|---|---|---|---|---|---|---|---|---|---|---|---|---|---|---|
| 208 | 10-16 / 10 | " | A | A | A | A | A | A(0.7) | 0 | 0 | 0 | 0 | 3 | 15 |
| 209 | 8-12 / 12 | " | A | A | A | A | B | C(10) | 0 | 0 | 0 | 2 | 7 | 20 |
| 210 | 9-14 / 8 | " | A | A | A | A | A | A(0.2) | 0 | 0 | 0 | 0 | 1 | 5 |
| 211 | 6-10 / 13 | " | A | A | A | A | B | C(9) | 0 | 0 | 0 | 1 | 10 | 25 |
| 212 | 15-10 / 18 | " | A | A | A | A | B | C(12) | 0 | 0 | 0 | 4 | 10 | 19 |
| 213 | 20-15 / 7 | 15 | A | A | A | A | A | A(0.6) | 0 | 0 | 0 | 0 | 5 | 11 |
| 214 | 4-9 / 10 | " | A | A | A | A | B | C(9) | 0 | 0 | 0 | 3 | 11 | 27 |
| 215 | 7-12 / 11 | " | A | A | A | A | A | B(3) | 0 | 0 | 0 | 0 | 5 | 15 |
| 216 | 8-13 / 20 | " | A | A | A | A | B | C(10) | 0 | 0 | 0 | 7 | 15 | 35 |
| 217 | 18-22 / 13 / 10-15 | " | A | A | A | A | A | A(0.3) | 0 | 0 | 0 | 0 | 2 | 10 |

(1) *comparative examples
(2) Dye or pigment concentration in coating solution.
(3) Chloride ion concentration in slurry after completion of polymerization
(4) Flow rate of water 0.1 m³/m²h

EXAMPLE 5

As shown in Table 5, for each experiment, a conjugated π compound was dissolved or dispersed in a solvent, optionally with the addition of an inorganic compound or a polymeric compound as shown in the same Table to prepare a coating solution. The formulation ratio of the inorganic compound or the polymeric compound and the concentration of the conjugated π bond compound in the coating solution are also shown in Table 5. The coating solution was applied on the polished inner wall surface of a stainless steel polymerizer of an inner volume of 1000 liters and the portions which may contact with monomers such as stirrer, dried at 70° C. for 20 minutes and then thoroughly washed with water.

Next, the thus coated polymerizer was charged with 200 Kg of vinyl chloride monomer, 400 Kg of deionized water, 44 g of a partially saponified polyvinyl alcohol, 56 g of hydroxypropylmethyl cellulose and 60 g of t-butylperoxyneodecanate, and polymerization was carried out at 52° C. for 7 hours. After completion of polymerization, the polymer was taken out and the polymerizer was washed internally with water at a flow rate of 0.1 m³/m²hr, as shown in Table 5. The above operations from coating and charging to washing with water were conducted for each batch and this was repeated for a maximum of 200 batches.

The chloride ion concentration was controlled and the scaling was evaluated similarly as described in Example 1. The conditions and the results are shown in Table 5.

In Table 5, the Experiment numbers marked with an asterisk (*) indicate Comparative examples. In particular, Experiment Nos. 301 and 302 are examples in which the inner wall surface of the polymerizer was subjected to no treatment with any compound. Also, the coating solution employed in Experiment Nos. 333 and 334 was prepared by dissolving one part of sodium sulfide in 100 parts of water and adding 0.5 part of a dye to the resultant solution, followed by heating at 80° C. for 30 minutes.

TABLE 5

| (1) Exp. No. | Conjugated π bond compound (a) Kind | Mixing ratio | Inorganic compound (b) | (a)/(b) weight ratio | Polymeric compound (c) | (a)/(c) weight ratio | (2) conc. % | Solvent Kind | Mixing ratio |
|---|---|---|---|---|---|---|---|---|---|
| 301* | — | | — | | — | | | — | |
| 302* | — | | — | | — | | | — | |
| 303* | Rosaniline | | — | | — | | 0.5 | Methanol | |
| 304* | " | | — | | — | | 0.5 | " | |
| 305* | " | | — | | — | | 0.5 | " | |
| 306* | " | | Colloidal silica | 100/100 | — | | 1.0 | " | |
| 307* | " | | " | 100/200 | Shellac resin | 100/20 | 1.5 | " | |
| 308* | — | | " | 0/100 | — | | 1.0 | Water | |
| 309* | Leucoquinizarin/ Solvent Black 7 | 90/10 | Fe(OH)₃ sol | 100/50 | — | | 0.7 | Water/ Methanol | 20/80 |
| 310* | Flavonol | | — | | — | | 0.8 | Methanol | |
| 311* | Indigoazine | | NiCl₂ | 100/5 | — | | 0.4 | " | |
| 312* | Acridone | | — | | — | | 0.5 | " | |
| 313* | 2-Oxythiophanthrene | | — | | — | | 0.3 | " | |
| 314* | Phthalazine/ Acid Blue 59 | 50/50 | — | | — | | 0.5 | " | |
| 315* | — | | — | | Shellac resin | 0/100 | 1.0 | " | |
| 316* | Carocyanine | | — | | — | | 0.7 | " | |
| 317 | 2,2-Diphenylolpropane | | — | | — | | 0.7 | " | |
| 318 | Oxyanthraquinone/ Solvent Black 5 | 50/50 | — | | — | | 0.9 | " | |
| 319 | Rosaniline | | Colloidal silica | 100/100 | — | | 0.6 | Water/ Methanol | 20/80 |

TABLE 5-continued

| | | | | | | | | | |
|---|---|---|---|---|---|---|---|---|---|
| 320 | Rosaniline/Quinoline | — | | Shellac resin | 100/20 | 0.7 | Methanol | | |
| 321 | 4-Aminodiphenylamine | — | | — | | 0.5 | " | | |
| 322 | 2-Aminophenazine | — | | — | | 0.8 | " | | |
| 323 | 2-Aminodiphenylamine | — | | — | | 0.4 | " | | |
| 324 | 7-Amino-4-methylcoumarine | — | | — | | 0.7 | " | | |
| 325 | Phenazineoxide/Acid Black 2 | 40/60 | Colloidal silica | 100/200 | — | | 0.5 | Water/Methanol | 40/60 |
| 326 | Malonic acid bis($\beta$-phenylhydrazine) | — | | — | | 0.9 | Methanol | | |
| 327 | 3,4-Benzoquinoline | — | | — | | 0.7 | " | | |
| 328 | Benzoflavin | — | | — | | 0.3 | " | | |
| 329 | Triphenylisooxazole | — | | — | | 0.9 | " | | |
| 330 | Nitrodiphenylether | — | | — | | 0.4 | " | | |
| 331 | Picene-5,6-quinone | — | | Polypyridylacetylene | 100/100 | 1.0 | " | | |
| 332 | Indoaniline | — | | — | | 0.4 | " | | |
| 333 | Hydron Blue/Basic Black 2 | 80/20 | — | | — | | 0.8 | " | |
| 334 | Benzo[a]benzofuran | — | | — | | 0.5 | " | | |
| 335 | 3,4-Phthaloylfurazane | — | | — | | 0.5 | " | | |
| 336 | 3-Cinnamyl-2-methyl-1,4-naphthoquinone | — | | — | | 0.9 | " | | |
| 337 | Alizarine | — | | — | | 0.4 | " | | |
| 338 | Leucoquinizarin/Solvent Black 7 | 90/10 | Fe(OH)$_3$ sol | 100/50 | — | | 0.7 | Water/Methanol | 20/80 |
| 339 | 2,2'-Dianthraquinolyl | — | | — | | 0.8 | Methanol | | |
| 340 | Anhydronium Base | — | | — | | 0.2 | " | | |
| 341 | Chromonol/Basic Orange 14 | 20/80 | — | | — | | 0.5 | " | |
| 342 | Flavonol | | — | | — | | 0.8 | " | |
| 343 | Dicoumarol | | — | | — | | 1.0 | " | |
| 344 | Isoxanthone | | — | | — | | 1.2 | " | |
| 345 | 1-Phenylpyrrole | | — | | — | | 0.8 | " | |
| 346 | 3-Phenylindole | | — | | Polyvinylisobutyral | 100/20 | 1.0 | Chloroform | |
| 347 | Indigoazine | | NiCl$_2$ | 100/5 | — | | 0.4 | Methanol | |
| 348 | $\beta$-Isoindigo | | — | | — | | 0.6 | " | |
| 349 | 1,1'-Dicarbazole | | — | | — | | 0.5 | " | |
| 350 | Porphyne/Solvent Black 5 | 20/80 | — | | Polysarcosine | 100/50 | 0.8 | " | |
| 351 | 4-Phenylthiazole | | — | | — | | 0.4 | " | |
| 352 | 4-Phenylimidazole | | — | | — | | 0.8 | " | |
| 353 | 5-Phenylpyrazole | | — | | — | | 0.9 | " | |
| 354 | Phenylfuroxane | | — | | — | | 0.5 | " | |
| 355 | 2-Phenyl-1,3,4-thiadiazole | | Metatetrasilicic acid | 100/100 | — | | 0.7 | Water/Methanol | 30/70 |
| 356 | 2-Phenyl-1,2,3-triazole | | — | | — | | 0.4 | Methanol | |
| 357 | 1-Oxy-5-phenyltetrazole | | — | | — | | 0.8 | " | |
| 358 | 4-Pyridyl-m-phenylenediamine | | — | | Hydroxyethylcellulose | 100/100 | 1.0 | Acetone | |
| 359 | Quinophthalone | | — | | — | | 0.3 | Methanol | |
| 360 | 5-Iodoisoquinoline | | — | | — | | 0.6 | " | |
| 361 | 9-Phenoxyacridine | | — | | — | | 0.5 | " | |
| 362 | 3-Oxyphenanthridinone | | — | | — | | 0.4 | " | |
| 363 | 2-Benzoylcoumarone | | — | | — | | 0.8 | " | |
| 364 | Hydrovanilloyl/Solvent Black 5 | 20/80 | Fe(OH)$_3$ sol | 100/5 | — | | 0.5 | " | |
| 365 | 1,3-Dioxyacridine | | — | | — | | 0.7 | " | |
| 366 | o-Oxybenzophenone/Solvent Blue 73 | 70/30 | — | | — | | 0.8 | " | |
| 367 | 2,5-Dioxybenzophenone | | — | | — | | 0.7 | " | |
| 368 | Acridone | | — | | — | | 0.5 | " | |
| 369 | 2-Oxy-3-phenylindazole | | — | | — | | 0.5 | " | |
| 370 | Xanthene | | — | | — | | 0.6 | " | |
| 371 | 2,4-Dinitro-9-phenylacridine | | — | | — | | 0.8 | " | |
| 372 | 4,4'-Dibenzoylidiphenyl | | — | | — | | 0.4 | " | |
| 373 | Diaminobenzophenone | | — | | Butylcellulose | 100/20 | 0.8 | Ethanol | |
| 374 | Tetramethoxyindigo/Phenoazoxide | 60/40 | Colloidal silica | 100/200 | — | | 0.8 | Water/Methanol | 40/60 |
| 375 | Terphenyl/1,4-diphenylnaphthalene | 50/50 | — | | — | | 0.6 | Methanol | |
| 376 | Aminomethylnaphthalene | | — | | — | | 0.8 | " | |
| 377 | 1-Iodonaphthalene | | — | | — | | 0.3 | " | |
| 378 | 3,4-Benzcarbazole | | — | | — | | 0.5 | " | |
| 379 | $\alpha$-Naphthol | | — | | — | | 0.7 | " | |
| 380 | Methylene-di-$\beta$-naphthol | | — | | — | | 0.4 | " | |
| 381 | 2-Methoxynaphthalene | | — | | — | | 0.7 | " | |
| 382 | $\alpha,\beta$-Naphthophenyxazine | | — | | — | | 0.8 | " | |
| 383 | 2,6-Naphthoquinone/Basic Red 2 | 70/30 | — | | — | | 0.5 | " | |
| 384 | 2-Naphthalene-2'- | | Colloidal silica | 100/50 | — | | 1.0 | Water/ | 30/70 |

TABLE 5-continued

| | | | | | | | |
|---|---|---|---|---|---|---|---|
| | indoleindigo | | | | | | Methanol |
| 385 | Naphthoanilide | — | | — | | 0.3 | Methanol |
| 386 | α-Pyridonaphthalone/ Solvent Black 3 | 10/90 | — | | — | 0.5 | " |
| 387 | α-Nitroso-β-naphthol | Colloidal silica | 100/100 | — | | 0.8 | Water/ Methanol | 40/60 |
| 388 | 2-Anilinoanthracene | — | | — | | 1.0 | Methanol |
| 389 | 2-Amino-1-anthranol | — | | — | | 0.9 | " |
| 390 | Anthracene-9-aldehyde | — | | — | | 0.5 | " |
| 391 | 1-Aminophenanthrene | — | | — | | 0.6 | " |
| 392 | Phenanthrene-1,2-quinone | — | | — | | 0.8 | " |
| 393 | 2-Iodophenanthrene | — | | — | | 0.7 | " |
| 394 | 2-Amino-3-oxyphenanthrenequinone | Colloidal silica | 100/500 | — | | 0.8 | Water/ Methanol | 20/80 |
| 395 | 2,7-Diphenyl[2,3-g]-quinoline | — | | — | | 0.6 | Methanol |
| 396 | 1,10-Phenanthroline | Fe(OH)$_3$ sol | 100/20 | — | | 0.8 | Water/ Methanol | 50/50 |
| 397 | 1,9-Pyridoindole | — | | — | | 0.4 | Methanol |
| 398 | 3-Amino-1,5-naphthyridine | — | | Poly(N—vinyl-1,2,4-triazole) | 100/30 | 1.0 | DMF |
| 399 | Carocyanine | — | | — | | 0.7 | Methanol |
| 400 | Phenothiazine | Colloidal silica | 100/40 | — | | 0.9 | Water/ Methanol | 30/70 |
| 401 | Phthalazine/ Acid Blue 59 | 50/50 | — | — | | 0.5 | Methanol |
| 402 | 1-Aminophenazine | — | | — | | 0.4 | " |
| 403 | 2,4,6-Triphenyl-S—triazine | — | | Poly(9-vinylanthracene) | 100/50 | 0.6 | Methylene chloride |
| 404 | 2-Phenylthiophene | — | | — | | 0.9 | Methanol |
| 405 | 3-Oxythiophanthrene | — | | — | | 0.3 | " |
| 406 | Thioflavone | — | | — | | 0.4 | " |
| 407 | 2-Aminophenoxanthine | — | | — | | 0.5 | " |
| 408 | Tetrahydroberberine | — | | — | | 0.8 | " |
| 409 | Nicotylene | — | | — | | 0.5 | " |
| 410 | Azlene | — | | — | | 0.7 | " |
| 411 | Rosarine | — | | — | | 0.5 | " |
| 412 | " | Colloidal silica | 100/200 | Shellac resin | | 1.5 | " |

| (1) Exp. No. | (3) Cl$^-$ conc. upper: average lower: max.−min. ppm | (4) Time for washing with water after completion min. | Scaling Visual evaluation (Amount attached g/m$^2$) Batch No. | | | | | |
|---|---|---|---|---|---|---|---|---|
| | | | 10 | 30 | 50 | 100 | 150 | 200 |
| 301* | 300 280–350 | 60 | H(1000) | | | | | |
| 302* | 15 12–17 | " | H(900) | | | | | |
| 303* | 300 270–350 | " | B | F | H(850) | | | |
| 304* | 210 190–250 | " | B | F | H(600) | | | |
| 305* | 140 120–180 | " | B | F | H(500) | | | |
| 306* | 290 270–310 | " | B | C | F | H(400) | | |
| 307* | 240 220–300 | " | B | C | F | H(350) | | |
| 308* | 11 9–13 | " | H(900) | | | | | |
| 309* | 280 260–330 | " | B | C | F | H(350) | | |
| 310* | 270 250–320 | " | G | H(500) | | | | |
| 311* | 290 270–350 | " | G | H(300) | | | | |
| 312* | 250 230–290 | " | G | H(600) | | | | |
| 313* | 290 270–340 | " | G | H(700) | | | | |
| 314* | 270 250–320 | " | G | H(350) | | | | |
| 315* | 240 220–290 | " | H(950) | | | | | |
| 316* | 220 200–280 | " | G | H(550) | | | | |
| 317 | 13 10–15 | 10 | A | A | A | B | C | D(20) |
| 318 | 15 13–17 | " | A | A | A | A | A | A(0.7) |
| 319 | 7 5–9 | " | A | A | A | A | A | B(1.5) |

TABLE 5-continued

| | | | | | | | | |
|---|---|---|---|---|---|---|---|---|
| 320 | 4<br>3-5 | " | A | A | A | A | A | B(3) |
| 321 | 17<br>14-21 | " | A | A | A | B | C | D(17) |
| 322 | 14<br>10-18 | " | A | A | A | A | B | C(9) |
| 323 | 16<br>12-18 | " | A | A | A | B | C | D(20) |
| 324 | 13<br>10-17 | " | A | A | A | B | C | D(22) |
| 325 | 11<br>8-14 | 15 | A | A | A | A | A | A(0.2) |
| 326 | 9<br>7-12 | " | A | A | A | B | C | D(18) |
| 327 | 12<br>8-15 | " | A | A | A | B | C | D(20) |
| 328 | 10<br>7-13 | " | A | A | A | B | C | D(15) |
| 329 | 15<br>11-17 | " | A | A | A | B | C | D(17) |
| 330 | 20<br>16-22 | " | A | A | A | B | C | D(21) |
| 331 | 14<br>10-16 | " | A | A | A | A | B | C(10) |
| 332 | 7<br>5-9 | " | A | A | A | B | C | D(20) |
| 333 | 10<br>8-12 | 10 | A | A | A | A | A | B(1.3) |
| 334 | 8<br>6-10 | " | A | A | A | B | C | D(18) |
| 335 | 16<br>13-18 | " | A | A | A | B | C | D(20) |
| 336 | 10<br>8-12 | " | A | A | A | B | C | D(24) |
| 337 | 13<br>10-15 | " | A | A | A | B | C | D(21) |
| 338 | 12<br>9-14 | " | A | A | A | A | A | A(0.5) |
| 339 | 9<br>6-11 | 15 | A | A | A | B | C | D(20) |
| 340 | 11<br>8-13 | " | A | A | A | B | C | D(18) |
| 341 | 19<br>15-22 | " | A | A | A | A | A | B(1.4) |
| 342 | 14<br>10-16 | " | A | A | A | B | C | D(18) |
| 343 | 12<br>9-14 | " | A | A | A | B | C | D(19) |
| 344 | 6<br>4-8 | " | A | A | A | B | C | D(20) |
| 345 | 10<br>7-13 | " | A | A | A | B | C | D(16) |
| 346 | 14<br>11-17 | " | A | A | A | A | A | B(3) |
| 347 | 12<br>9-14 | " | A | A | A | A | A | B(1.2) |
| 348 | 19<br>15-23 | " | A | A | A | B | C | D(17) |
| 349 | 7<br>5-10 | " | A | A | A | B | C | D(20) |
| 350 | 8<br>6-11 | " | A | A | A | A | A | A(0.5) |
| 351 | 14<br>10-16 | " | A | A | A | B | C | D(18) |
| 352 | 12<br>9-14 | " | A | A | A | B | C | D(17) |
| 353 | 10<br>7-13 | " | A | A | A | B | C | D(15) |
| 354 | 12<br>9-14 | " | A | A | B | C | D | F(55) |
| 355 | 15<br>12-18 | " | A | A | A | A | A | B(2.1) |
| 356 | 8<br>5-10 | " | A | A | B | C | D | F(53) |
| 357 | 14<br>11-17 | 10 | A | A | B | C | D | F(56) |
| 358 | 7<br>5-9 | " | A | A | A | A | B | C(10) |
| 359 | 10<br>8-12 | " | A | A | A | B | C | D(17) |
| 360 | 12<br>10-14 | " | A | A | B | C | D | F(56) |

TABLE 5-continued

| | | | | | | | | |
|---|---|---|---|---|---|---|---|---|
| 361 | 15 12–18 | " | A | A | A | B | C | D(15) |
| 362 | 20 17–23 | " | A | A | A | B | C | D(17) |
| 363 | 13 10–16 | " | A | A | B | C | D | F(54) |
| 364 | 16 14–19 | " | A | A | A | A | A | A(0.5) |
| 365 | 12 9–15 | " | A | A | A | B | C | D(18) |
| 366 | 9 5–11 | 15 | A | A | A | A | A | B(2.3) |
| 367 | 17 14–20 | " | A | A | A | B | C | D(15) |
| 368 | 11 8–14 | " | A | A | A | B | C | D(13) |
| 369 | 12 9–15 | " | A | A | A | B | C | D(16) |
| 370 | 8 5–10 | " | A | A | A | B | C | D(17) |
| 371 | 5 3–7 | " | A | A | A | B | C | D(20) |
| 372 | 12 9–14 | " | A | A | A | B | C | D(16) |
| 373 | 8 5–10 | " | A | A | A | A | A | B(1.8) |
| 374 | 14 11–17 | " | A | A | A | A | A | A(0.6) |
| 375 | 17 14–20 | 10 | A | A | A | B | C | D(17) |
| 376 | 11 7–15 | " | A | A | B | C | D | F(58) |
| 377 | 16 14–18 | " | A | A | B | C | D | F(57) |
| 378 | 10 7–13 | " | A | A | A | B | C | D(15) |
| 379 | 15 13–17 | " | A | A | B | C | D | F(53) |
| 380 | 8 5–10 | " | A | A | B | C | D | F(52) |
| 381 | 15 11–18 | " | A | A | A | B | C | D(20) |
| 382 | 17 13–20 | " | A | A | A | B | C | D(18) |
| 383 | 11 9–14 | " | A | A | A | A | A | B(1.9) |
| 384 | 12 10–15 | " | A | A | A | A | A | B(2.3) |
| 385 | 10 7–13 | " | A | A | B | C | D | F(53) |
| 386 | 14 11–18 | " | A | A | A | A | A | B(2.5) |
| 387 | 14 11–17 | " | A | A | A | A | A | A(0.4) |
| 388 | 18 15–22 | " | A | A | A | B | C | D(19) |
| 389 | 5 3–7 | " | A | A | A | B | C | D(20) |
| 390 | 11 9–14 | " | A | A | A | B | C | D(22) |
| 391 | 9 6–12 | " | A | A | A | B | C | D(18) |
| 392 | 12 10–15 | 15 | A | A | A | B | C | D(20) |
| 393 | 8 5–11 | " | A | A | A | B | C | D(21) |
| 394 | 11 8–14 | " | A | A | A | A | A | B(2.7) |
| 395 | 15 12–18 | " | A | A | B | C | D | F(52) |
| 396 | 10 7–13 | " | A | A | A | A | A | B(1.5) |
| 397 | 13 10–16 | " | A | A | A | B | C | D(17) |
| 398 | 20 15–25 | " | A | A | A | A | A | B(1.9) |
| 399 | 12 11–13 | " | A | A | B | C | D | F(55) |
| 400 | 10 8–14 | " | A | A | A | A | A | A(0.7) |
| 401 | 7 5–9 | " | A | A | A | A | A | B(1.8) |

TABLE 5-continued

| | | | | | | | | | |
|---|---|---|---|---|---|---|---|---|---|
| | 402 | 19 | 10 | A | A | A | B | C | D(18) |
| | | 14–23 | | | | | | | |
| | 403 | 16 | " | A | A | A | A | A | B(2.3) |
| | | 13–19 | | | | | | | |
| | 404 | 14 | " | A | A | A | B | C | D(20) |
| | | 11–18 | | | | | | | |
| | 405 | 16 | " | A | A | A | B | C | D(17) |
| | | 13–19 | | | | | | | |
| | 406 | 20 | " | A | A | A | B | C | D(16) |
| | | 16–24 | | | | | | | |
| | 407 | 6 | " | A | A | B | C | D | F(53) |
| | | 5–8 | | | | | | | |
| | 408 | 9 | " | A | A | B | C | D | F(55) |
| | | 7–12 | | | | | | | |
| | 409 | 11 | " | A | A | A | B | C | D(18) |
| | | 9–13 | | | | | | | |
| | 410 | 18 | " | A | A | A | B | C | D(18) |
| | | 15–21 | | | | | | | |
| | 411 | | | A | A | A | B | C | D(20) |
| | 412 | | | A | A | A | A | A | A(0.5) |

Notes:
(1) *comparative examples
(2) Conjugated π bond compound concentration in coating solution.
(3) Chloride ion concentration in slurry after completion of polymerization
(4) Flow rate of water 0.1 m³/m²h

EXAMPLE 6

As shown in Table 6, for each experiment, a conjugated π bond compound was dissolved or dispersed in a solvent, optionally with the addition of an inorganic compound or a polymeric compound as shown in the same Table to prepare a coating solution. The formulation ratio of the inorganic compound or the polymeric compound and the concentration of the conjugated π bond compound in the coating solution are also shown in Table 6. The coating solution was applied on the polished inner wall surface of a stainless steel polymerizer of an inner volume of 1000 liters and the portions which may contact with monomers such as stirrer, dried at 70° C. for 20 minutes and then thoroughly washed with water.

Next, the thus coated polymerizer was charged with 200 Kg of vinyl chloride monomer, 400 Kg of deionized water, 0.25 Kg of hydroxypropylmethyl cellulose, 0.25 Kg of sorbitane monolaurate and 50 g of α,α'-azobis-2,4-dimethylvaleonitrile, and polymerization was carried out at 57° C. for 10 hours. After completion of polymerization, the polymer was taken out and the polymerizer was washed internally with water at a flow rate of 0.1 m³/m²hr, as shown in Table 6. The above operations from coating and charging to washing with water were conducted for each batch and this was repeated for a maximum of 200 batches.

The chloride ion concentration was controlled and the scaling was evaluated similarly as described in Example 1. The conditions and the results are shown in Table 6.

In Table 6, the Experiment numbers marked with an asterisk (*) indicate Comparative examples. In particular, Experiment Nos. 413 and 414 are examples in which the inner wall surface of the polymerizer was subjected to no treatment with any compound.

TABLE 6

| (1) Exp. No. | Conjugated π bond compound (a) Kind | Mixing ratio | Inorganic compound (b) | (a)/(b) weight ratio | Polymeric compound (c) | (a)/(c) weight ratio | (2) conc. % | Solvent Kind | Mixing ratio |
|---|---|---|---|---|---|---|---|---|---|
| 413* | — | | — | | — | | | — | |
| 414* | — | | — | | — | | | — | |
| 415* | 1-Bromonaphthalene | | — | | — | | 0.5 | Methanol | |
| 416* | 1-Naphthalene-2'-indoleindigo | | Fe(OH)₃ sol | 100/30 | — | | 0.6 | Water/Methanol | 20/80 |
| 417* | 9,10-Diamino-phenanthrene/Phenothiazine | 50/50 | Colloidal silica | 100/100 | — | | 1.2 | Water/Methanol | 50/50 |
| 418* | Dioxyacridone | | — | | — | | 0.6 | Methanol | |
| 419* | — | | Colloidal silica | 0/100 | — | | 1.0 | Water | |
| 420* | 7-Oxy-3,4-benzocoumarine | | — | | Polytetrahydrofuran | 100/50 | 0.7 | Benzene | |
| 421* | — | | | | " | 0/100 | 0.5 | " | |
| 422* | Indophenine | | — | | — | | 0.6 | Methanol | |
| 423* | Nitrophenothiazine | | — | | — | | 0.4 | " | |
| 424* | Dianthraquinoneimide | | — | | — | | 0.5 | " | |
| 425* | 6-Phenylcoumarine/Solvent Black 5 | 20/80 | Colloidal silica | 100/80 | — | | 0.6 | Water/Methanol | 30/70 |
| 426 | N—Naphthylethylenediamine | | — | | Polycyclopentaneoxide | 100/30 | 0.8 | Benzene | |
| 427 | 1-Bromonaphthalene | | — | | — | | 0.5 | Methanol | |
| 428 | 1,1'-Diamino-2,2'-binaphthyl | | Colloidal silica | 100/50 | — | | 1.0 | Water/Methanol | 30/70 |
| 429 | Benzoindanone | | — | | — | | 0.6 | Methanol | |
| 430 | Oxybenzoacridine | | — | | — | | 0.7 | " | |
| 431 | 1-Naphthalene-2'-indoleindigo | | Fe(OH)₃ sol | 100/30 | — | | 0.6 | Water/Methanol | 20/80 |

TABLE 6-continued

| | | | | | | | | |
|---|---|---|---|---|---|---|---|---|
| 432 | α-Naphthoamidoxime | — | | — | | 0.5 | Methanol | |
| 433 | α-Naphthylglyoxal | — | | — | | 0.5 | " | |
| 434 | 9-Mercaptoanthracene | — | | — | | 0.7 | " | |
| 435 | 9,10-Diamino-phenanthrene/Phenothiazine | 50/50 | Colloidal silica | 100/100 | — | 1.2 | Water/Methanol | 50/50 |
| 436 | 2-Aminophenanthrene-quinone | — | | Polybutadiene | 100/10 | 0.5 | Water/Methanol | 70/30 |
| 437 | Perylene/2,2'-dioxyazobenzene | 90/10 | — | | — | | 0.8 | Methanol | |
| 438 | 1,2-Benzophenazine | — | | — | | 0.4 | " | |
| 439 | 2-Iodo-1,4-naphthoquinone | — | | — | | 0.5 | " | |
| 440 | Dianthraquinoneimide | — | | — | | 0.5 | " | |
| 441 | Quinizarinequinone | | Fe(OH)₃ sol | 100/10 | — | 0.5 | Water/Methanol | 20/80 |
| 442 | Dioxyacridone | — | | — | | 0.6 | Methanol | |
| 443 | 3,6-Diaminoacridene | | colloidal silica | 100/300 | — | 0.8 | Water/Methanol | 40/60 |
| 444 | 4'-Nitroso-2-nitro-diphenylamine | — | | — | | 0.7 | Methanol | |
| 445 | 4,4'-Dinitro-diphenylamine | — | | — | | 0.9 | " | |
| 446 | Dinitrophenylindazole | — | | — | | 0.5 | " | |
| 447 | Aminobenzophenone | | Colloidal silica | 100/100 | — | 1.0 | Water/Methanol | 50/50 |
| 448 | 1,3,8-Trinitro-phenoxazine | — | | — | | 0.5 | Methanol | |
| 449 | 2,2'-Dioxybiphenyl | — | | — | | 0.5 | Methanol | |
| 450 | 6-Phenylcoumarine/Solvent Black 5 | 20/80 | Colloidal silica | 100/80 | — | 0.6 | Water/Methanol | 30/70 |
| 451 | 7-Oxy-3,4-benzocoumarine | — | | Polytetrahydrofuran | 100/50 | 0.7 | Benzene | |
| 452 | 2-Phenyl-3-phenylazoindole | | Colloidal silica | 100/40 | | 0.9 | Water/Methanol | 50/50 |
| 453 | Indophenine | — | | — | | 0.6 | Methanol | |
| 454 | Polyphyrajine | — | | — | | 0.7 | " | |
| 455 | 4-Phenyloxazole | — | | — | | 0.6 | " | |
| 456 | 5-Benzoyl-3,4-diphenylisooxazole | — | | — | | 0.4 | " | |
| 457 | 2-Amino-4-phenylthiazole | | Colloidal silica | 100/150 | — | 0.8 | Water/Methanol | 30/70 |
| 458 | 2-Phenylazoimidazole | — | | — | | 0.5 | Methanol | |
| 459 | 4-Pyridylazoresorcin | | Colloidal silica | 100/200 | — | 0.8 | Water/Methanol | 40/60 |
| 460 | 2,3-Quinolinediol | — | | — | | 0.6 | Methanol | |
| 461 | 1-Aminoisoquinoline | — | | — | | 0.7 | Methanol | |
| 462 | 9-Oxyacridine/Basic Orange 14 | 70/30 | — | | Polyquinoxaline | 100/60 | 1.0 | DMF | |
| 463 | Nitrophenothiazine | — | | — | | 0.4 | Methanol | |
| 464 | 2-Phenadinol | — | | — | | 0.8 | " | |
| 465 | 2,8-Diaminodibenzo-thiophene | — | | — | | 0.6 | " | |
| 466 | Cyclo [3,3,3]azine | | Fe(OH)₃ sol | 100/30 | — | 0.6 | Water/Methanol | 10/90 |

| (1) Exp. No. | (3) Cl⁻ conc. upper: average lower: max.-min. ppm | (4) Time for washing with water after completion min. | Scaling Visual evaluation (Amount attached g/m²) Batch No. | | | | | |
|---|---|---|---|---|---|---|---|---|
| | | | 10 | 30 | 50 | 100 | 150 | 200 |
| 413* | 300 260–300 | 60 | H(1400) | | | | | |
| 414* | 13 8–17 | " | H(1200) | | | | | |
| 415* | 280 260–330 | " | G | H(1000) | | | | |
| 416* | 270 250–320 | " | C | F | H(900) | | | |
| 417* | 240 220–300 | " | C | F | H(850) | | | |
| 418* | 280 260–320 | " | G | H(1000) | | | | |
| 419* | 230 210–290 | " | H(1300) | | | | | |
| 420* | 290 270–350 | " | G | H(900) | | | | |
| 421* | 220 200–280 | " | H(1350) | | | | | |
| 422* | 260 240–310 | " | G | H(800) | | | | |
| 423* | 250 230–280 | " | G | H(800) | | | | |

TABLE 6-continued

| | | | | | | | | |
|---|---|---|---|---|---|---|---|---|
| 424* | 300<br>280–350 | | " | G | H(850) | | | |
| 425* | 290<br>270–340 | 60 | C | F | H(700) | | | |
| 426 | 14<br>11–18 | 15 | A | A | A | A | B | C(10) |
| 427 | 9<br>6–12 | " | A | A | B | C | D | F(60) |
| 428 | 11<br>7–13 | " | A | A | A | A | A | B(1.5) |
| 429 | 8<br>6–9 | " | A | A | B | C | D | F(57) |
| 430 | 5<br>3–7 | " | A | A | A | B | C | D(19) |
| 431 | 19<br>17–21 | " | A | A | A | A | A | B(2.7) |
| 432 | 16<br>14–18 | 10 | A | A | A | B | C | D(18) |
| 433 | 20<br>18–23 | " | A | A | B | C | D | F(59) |
| 434 | 8<br>5–11 | " | A | A | B | C | D | F(62) |
| 435 | 11<br>9–14 | " | A | A | A | A | A | B(1.2) |
| 436 | 14<br>11–17 | " | A | A | A | A | B | C(9) |
| 437 | 17<br>14–19 | 10 | A | A | A | B | C | D(18) |
| 438 | 10<br>8–12 | 10 | A | A | B | C | D | F(57) |
| 439 | 6<br>5–7 | " | A | A | B | C | D | F(61) |
| 440 | 11<br>9–13 | " | A | A | B | C | D | F(60) |
| 441 | 19<br>16–22 | " | A | A | A | A | A | B(1.9) |
| 442 | 8<br>5–11 | " | A | A | B | C | D | F(58) |
| 443 | 17<br>14–20 | " | A | A | A | A | A | B(3) |
| 444 | 9<br>5–13 | " | A | A | A | B | C | D(9) |
| 445 | 15<br>11–18 | " | A | A | B | C | D | F(59) |
| 446 | 17<br>14–20 | " | A | A | B | C | D | F(55) |
| 447 | 11<br>9–13 | " | A | A | A | A | A | B(2.5) |
| 448 | 14<br>11–17 | " | A | A | B | C | D | F(57) |
| 449 | 12<br>9–14 | 15 | A | B | C | D | E | F(59) |
| 450 | 17<br>14–20 | " | A | A | A | A | A | B(1.5) |
| 451 | 18<br>14–21 | " | A | A | A | B | C | D(19) |
| 452 | 12<br>10–14 | " | A | A | A | A | A | B(1.8) |
| 453 | 20<br>18–22 | " | A | A | B | C | D | F(60) |
| 454 | 16<br>13–19 | " | A | B | C | D | E | F(65) |
| 455 | 9<br>6–12 | " | A | A | B | C | D | F(59) |
| 456 | 11<br>8–14 | " | A | A | B | C | D | F(55) |
| 457 | 19<br>17–21 | 10 | A | A | A | A | A | B(1.6) |
| 458 | 8<br>5–10 | " | A | A | B | C | D | F(60) |
| 459 | 6<br>3–7 | " | A | A | A | A | A | B(1.5) |
| 460 | 11<br>9–13 | " | A | B | C | D | E | F(57) |
| 461 | 17<br>14–20 | 10 | A | A | B | C | D | F(56) |
| 462 | 19<br>15–24 | " | A | A | A | A | A | B(2.1) |
| 463 | 10<br>8–13 | " | A | B | C | D | E | F(60) |
| 464 | 7<br>5–9 | " | A | A | B | C | D | F(62) |

TABLE 6-continued

| | | | | | | | | |
|---|---|---|---|---|---|---|---|---|
| 465 | 6 5-7 | " | A | B | C | D | E | F(57) |
| 466 | 11 9-13 | " | A | A | A | A | A | B(1.3) |

Notes:
(1) *comparative examples
(2) Conjugated π bond compound concentration in coating solution.
(3) Chloride ion concentration in slurry after completion of polymerization
(4) Flow rate of water 0.1 m³/m²h

EXAMPLE 7

As shown in Table 7, for each experiment, a conjugated π bond compound was dissolved or dispersed in a solvent, optionally with the addition of an inorganic compound or a polymeric compound as shown in the same Table to prepare a coating solution. The formulation ratio of the inorganic compound or the polymeric compound and the concentration of the conjugated π bond compound in the coating solution are also shown in Table 7. The coating solution was applied on the polished inner wall surface of a stainless steel polymerizer of an inner volume of 1000 liters and the portions which may contact with monomers such as stirrer, dried at 60° C. for 20 minutes and then thoroughly washed with water.

Next, the thus coated polymerizer was charged with 160 Kg of vinyl chloride monomer, 40 Kg of vinyl acetate monomer, 400 Kg of deionized water, 600 g of gelatin, 2 Kg of Triclene and 350 g of lauroyl peroxide, and polymerization was carried out at 70° C. for 6 hours. After completion of polymerization, the polymer was taken out and the polymerizer was washed internally with water at a flow rate of 0.1 m³/m²hr, as shown in Table 7. The above operations from coating and charging to washing with water were conducted for each batch and this was repeated for a maximum of 200 batches.

The chloride ion concentration was controlled and the scaling was evaluated similarly as described in Example 1. The conditions and the results are shown in Table 7.

In Table 7, the Experiment numbers marked with an asterisk (*) indicate Comparative examples. In particular, Experiment Nos. 467 and 468 are examples in which the inner wall surface of the polymerizer was subjected to no treatment with any compound.

TABLE 7

| (1) Exp. No. | Coating Solution Conjugated π bond compound (a) Kind | Mixing ratio | Inorganic compound (b) | (a)/(b) weight ratio | Polymeric compound (c) | (a)/(c) weight ratio | (2) conc. % | Solvent Kind | Mixing ratio | (3) Cl⁻ conc. upper: average lower: max.- min. ppm | (4) Time for washing with water after completion min. | Scaling Visual evaluation (Amount attached g/m²) Batch No. 10 | 30 | 50 | 100 | 150 | 200 |
|---|---|---|---|---|---|---|---|---|---|---|---|---|---|---|---|---|---|
| 467* | — | | — | | — | | | — | | 350 / 320-390 | 60 | H(1100) | | | | | |
| 468* | — | | — | | — | | | — | | 10 / 7-12 | " | H(1000) | | | | | |
| 469* | 2,2′-Diaminodiphenyl | | — | | — | | 0.5 | Methanol | | 290 / 270-350 | " | G | H(700) | | | | |
| 470* | " | | Colloidal silica | 100/100 | — | | 1.0 | " | | 270 / 250-320 | " | C | F | H(600) | | | |
| 471* | — | | Colloidal silica | 0/100 | — | | 1.0 | Water | | 250 / 230-310 | " | H(900) | | | | | |
| 472* | 1-Aminophenanthridine | | — | | Polycyclopentadiene | 50/50 | 1.2 | Benzene | | 280 / 260-330 | " | C | F | H(500) | | | |
| 473* | — | | — | | Polycyclopentadiene | 0/100 | 1.0 | " | | 250 / 230-320 | " | H(1000) | | | | | |
| 474* | 2-Chloroquinizarine | | — | | — | | 0.5 | Methanol | | 240 / 220-300 | " | G | H(950) | | | | |
| 475* | Pyrazoleanthrone | | — | | — | | 0.8 | Ethanol | | 300 / 280-350 | " | G | H(800) | | | | |
| 476* | 4,10-Dioxy-1,7-phenanthroline | | FeCl₂ | 100/2 | — | | 0.5 | Methanol | | 310 / 290-360 | " | C | F | H(700) | | | |
| 477* | 1,2-Dihydronaphthalene | | Fe(OH)₃ sol | 100/10 | — | | 0.5 | " | | 240 / 220-280 | " | C | F | H(650) | | | |
| 478* | 3,3′-Azopyridine | | — | | — | | 0.8 | " | | 260 / 240-310 | " | G | H(850) | | | | |
| 479* | 1-Amino-5-phenyl-tetrazole | | — | | — | | 0.8 | Ethanol | | 280 / 260-330 | " | G | H(800) | | | | |
| 480* | Phenazine/ Solvent Black 3 | 70/30 | — | | — | | | — | | 9 / 6-11 | 10 | B | C | F | H(500) | | |
| 481 | 2,2′-Diaminobiphenyl | | — | | — | | 0.5 | Methanol | | 10 / 8-12 | " | A | A | B | C | D | F(60) |
| 482 | " | | Colloidal silica | 100/100 | — | | 1.0 | " | | 8 / 5-10 | " | A | A | A | A | A | A(0.5) |
| 483 | Roseindole | | Fe(OH)₃ sol | 100/20 | — | | 0.5 | " | | 15 / 12-17 | " | A | A | A | A | A | B(2.5) |
| 484 | Indophenine | | — | | — | | 0.5 | " | | 20 / 16-22 | " | A | A | B | B | D | F(55) |
| 485 | Chlorophyll b | | — | | — | | 0.5 | Ethanol | | 15 / 12-17 | " | A | A | B | C | D | F(28) |
| 486 | Phthalocyanine/2,4-Diaminophenazine | 50/50 | Orthosilicic acid | 100/50 | — | | 0.7 | Methanol | | 13 / 10-15 | " | A | A | A | A | A | A(0.4) |
| 487 | 3,3′-Azopyridine | | — | | — | | 0.8 | " | | 14 / 11-16 | " | A | A | B | C | D | F(56) |
| 488 | 7,8-Dioxyflavone | | — | | — | | 0.5 | Ethanol | | 11 / 8-13 | " | A | A | A | B | C | D(20) |
| 489 | N—Nitroso-α-naphthyl-hydroxylamine | | — | | — | | 0.3 | Methanol | | 10 | " | A | A | A | B | C | D(18) |
| 490 | 2-Chloroquinizarine | | — | | — | | 0.5 | " | | | " | A | A | B | C | D | F(57) |

TABLE 7-continued

| (1) Exp. No. | Conjugated π bond compound (a) Kind | Mixing ratio | Inorganic compound (b) | (a)/(b) weight ratio | Polymeric compound (c) | (a)/(c) weight ratio | (2) conc. % | Solvent Kind | Mixing ratio | (3) Cl⁻ conc. upper: average lower: max.- min. ppm | (4) Time for washing with water after completion min. | Visual evaluation (Amount attached g/m²) Batch No. 10 | 30 | 50 | 100 | 150 | 200 |
|---|---|---|---|---|---|---|---|---|---|---|---|---|---|---|---|---|---|
| 491 | 2-(o-Aminophenyl)oxazole | | Metatetrasilicic acid | 100/200 | — | | 1.5 | Methanol | | 7-12 9 | 15 | A | A | A | A | A | A(0.7) |
| 492 | 2-Phenylazothiazole | | — | | Poly-isobutene | | 1.0 | " | | 6-11 12 | " | A | A | A | A | A | B(2.3) |
| 493 | 1-Amino-5-phenyltetrazole | | — | | — | | 0.8 | Ethanol | | 9-14 14 | " | A | A | B | C | D | F(58) |
| 494 | 3,2'-Diindolyl | | Colloidal silica | 100/20 | — | | 1.0 | Methanol | | 11-16 15 | " | A | A | A | A | A | A(0.6) |
| 495 | 1-Aminophenanthoridine | | — | | Polycyclo-pentadiene | 50/50 | 1.5 | Benzene | | 13-17 14 | " | A | A | A | A | A | B(3) |
| 496 | 4,10-Dioxy-1,7-phenanthroline | | FeCl₂ | 100/2 | — | | 0.5 | Methanol | | 11-16 15 | " | A | A | A | A | A | A(0.4) |
| 497 | Phenazine/Solvent Black 3 | 70/30 | — | | — | | 0.5 | " | | 12-17 17 | " | A | A | A | A | A | A(0.7) |
| 498 | Dibenzosuberol | | — | | — | | 0.3 | " | | 14-19 11 | " | A | A | B | C | D | F(56) |
| 499 | α-Methoxyphenazine | | — | | — | | 0.7 | Ethanol | | 8-13 18 | " | A | A | A | B | C | D(21) |
| 500 | 2-Phenylbenzothiazole | | — | | — | | 0.5 | Methanol | | 16-20 14 | " | A | A | B | C | D | F(55) |
| 501 | 3-Phenylcuomarone | | — | | — | | 0.3 | Toluene | | 11-16 10 | " | A | A | B | C | D | F(54) |
| 502 | 1,2-Dihydronaphthalene | | Fe(OH)₃ sol | 100/10 | — | | 0.5 | Methanol | | 7-12 8 | 10 | A | A | A | A | A | A(0.5) |
| 503 | Perimidine/Phenylrosindorine | 20/80 | — | | — | | 0.4 | THF | | 5-10 12 | " | A | A | A | B | C | D(20) |
| 504 | 10-Benzoazo-9-phenanthrol | | NiCl₂ | 100/5 | — | | 0.5 | Methanol | | 9-14 9 | " | A | A | A | A | A | B(2.1) |
| 505 | 4-Nitroso-1-naphthylamine | | — | | — | | 0.7 | " | | 6-11 10 | " | A | A | A | B | C | D(9) |
| 506 | Pyrazoleanthrone | | — | | — | | 0.8 | Ethanol | | 7-12 15 12-17 | " | A | A | B | C | D | F(60) |

Notes:
(1) *comparative examples
(2) Conjugated π bond compound concentration in coating solution.
(3) Chloride ion concentration in slurry after completion of polymerization
(4) Flow rate of water 0.1 m³/m²h

EXAMPLE 8

As shown in Table 8, for each experiment, a conjugated π bond compound was dissolved or dispersed in a solvent, optionally with the addition of an inorganic compound or a polymeric compound as shown in the same Table to prepare a coating solution. The formulation ratio of the inorganic compound or the polymeric compound and the concentration of the conjugated π bond compound in the coating solution are also shown in Table 8. The coating solution was applied on the polished inner wall surface of a stainless steel polymerizer of an inner volume of 1000 liters and the portions which may contact with monomers such as stirrer, dried at 80° C. for 10 minutes and then thoroughly washed with water.

Next, the thus coated polymerizer was charged with 200 Kg of vinyl chloride monomer, 400 Kg of deionized water, 40 g of a partially saponified polyvinyl alcohol, 60 g of hydroxypropylmethyl cellulose and 80 g of di-2-ethylhexylperoxycarbonate, and polymerization was carried out at 57° C. for 7 hours. After completion of polymerization, the polymer was taken out and the polymerizer was washed internally with water at a flow rate of 0.1 m³/m²hr, as shown in Table 8. The above operations from coating and charging to washing with water were conducted for each batch and this was repeated for a maximum of 200 batches.

The chloride ion concentration was controlled and the scaling was evaluated similarly as described in Example 1. Also, the numbers of fish eyes in the products obtained from the polymers produced in the 10th, 30th, 50th, 100th, 150th and 200th batches in each experiment were measured similarly as in Example 4. The conditions and the results are shown in Table 8.

In Table 8, the Experiment numbers marked with an asterisk (*) indicate Comparative examples. In particular, Experiment Nos. 507 and 508 are examples in which the inner wall surface of the polymerizer was subjected to no treatment with any compound.

TABLE 8

| (1) Exp. No. | Conjugated π bond compound (a) Kind | Mixing ratio | Inorganic compound (b) | (a)/(b) weight ratio | Polymeric compound (c) | (a)/(c) weight ratio | (2) conc. % | Solvent Kind | Mixing ratio |
|---|---|---|---|---|---|---|---|---|---|
| 507* | — | | — | | — | | | — | |
| 508* | — | | — | | — | | | — | |
| 509* | 2-Phenyl-3-phenylazolindole | | — | | — | | 0.5 | — | |
| 510* | 2-Phenyl-3-phenylazolindole | | Orthosilicic acid | 100/300 | — | | 1.0 | — | |
| 511* | — | | Orthosilicic acid | 0/100 | — | | 0.8 | — | |
| 512* | 9-Acridine/Acid Black 2 | 80/20 | Colloidal silica | 100/100 | — | | 1.5 | — | |
| 513* | 2-Phenylthiophene | | — | | — | | 0.5 | — | |
| 514* | Alizarine | | — | | — | | 0.5 | — | |
| 515 | 2-Phenyl-3-phenylazoindole | | — | | — | | 0.5 | Ethanol | |
| 516 | 2-Phenyl-3-phenylazoindole | | Orthosilicic acid | 100/300 | — | | 1.0 | Ethanol | |
| 517 | 2-Aminophenazine | | — | | — | | 0.7 | Methanol | |
| 518 | Alizarine | | — | | — | | 0.5 | Methanol | |
| 519 | 1-Aminophenanthoridine | | Fe(OH)₃ sol | 100/10 | — | | 0.5 | Methanol | |
| 520 | 10-Benzoazo-9-phenanthrol | | — | | — | | 0.6 | Methanol | |
| 521 | 9-Acrydine/Acid Black 2 | 80/20 | Colloidal silica | 100/100 | — | | 0.8 | Methanol | |
| 522 | Dinitrophenylindazole | | — | | — | | 0.5 | Benzene | |
| 523 | 4-Pyridyl-m-phenylenediamine | | — | | — | | 0.7 | Ethanol | |
| 524 | 2-Phenylthiophene | | — | | Polycyclohexaneoxide | | 1.5 | Toluene | |
| 525 | α-Nitroso-β-naphthol | | FeCl₂ | 100/5 | — | | 0.7 | Methanol | |

| (1) Exp. No. | (3) Cl⁻ conc. upper: average lower: max.–min. ppm | (4) Time for washing with water after completion min. | Scaling Visual evaluation (Amount attached g/m²) Batch No. 10 | 30 | 50 | 100 | 150 | 200 | Fish eyes (number) Batch No. 10 | 30 | 50 | 100 | 150 | 200 |
|---|---|---|---|---|---|---|---|---|---|---|---|---|---|---|
| 507* | 290 / 260–300 | 60 | H(1000) | | | | | | 300 | | | | | |
| 508* | 10 / 8–12 | " | H(950) | | | | | | 280 | | | | | |
| 509* | 280 / 240–300 | " | G | H(900) | | | | | 110 | 220 | | | | |
| 510* | 290 / 250–310 | " | B | C | F | H(950) | | | 20 | 40 | 90 | 130 | | |
| 511* | 15 / 13–18 | " | H(1000) | | | | | | 290 | | | | | |
| 512* | 270 / 230–290 | " | B | C | F | H(500) | | | 18 | 35 | 80 | 100 | | |
| 513* | 250 / 230–280 | " | G | H(950) | | | | | 100 | 200 | | | | |
| 514* | 310 / 280–350 | " | G | H(900) | | | | | 90 | 210 | | | | |
| 515 | 13 / 10–15 | 10 | A | A | A | B | C | D(20) | 0 | 0 | 2 | 9 | 23 | 37 |
| 516 | 12 | " | A | A | A | A | A | A(0.3) | 0 | 0 | 0 | 0 | 2 | 6 |

TABLE 8-continued

| | | | | | | | | | | | | | | |
|---|---|---|---|---|---|---|---|---|---|---|---|---|---|---|
| 517 | 9-15 15 | " | A | A | A | B | C | D(18) | 0 | 0 | 6 | 11 | 20 | 35 |
| 518 | 13-18 17 | " | A | A | A | B | C | D(21) | 0 | 0 | 3 | 10 | 30 | 41 |
| 519 | 15-20 11 | " | A | A | A | A | A | A(0.5) | 0 | 0 | 0 | 0 | 3 | 8 |
| 520 | 8-14 9 | " | A | A | A | B | C | D(20) | 0 | 0 | 5 | 9 | 28 | 42 |
| 521 | 7-12 12 | " | A | A | A | A | A | A(0.6) | 0 | 0 | 0 | 0 | 1 | 5 |
| 522 | 10-14 7 | " | A | A | A | B | C | D(20) | 0 | 0 | 2 | 7 | 25 | 40 |
| 523 | 5-10 14 | " | A | A | A | B | C | D(17) | 0 | 0 | 1 | 8 | 20 | 30 |
| 524 | 12-16 16 | " | A | A | A | A | B | C(10) | 0 | 0 | 0 | 2 | 7 | 15 |
| 525 | 14-19 12 10-15 | " | A | A | A | A | A | A(0.8) | 0 | 0 | 0 | 0 | 4 | 9 |

(1) *comparative examples
(2) Conjugated π bond compound concentration in coating solution.
(3) Chloride ion concentration in slurry after completion of polymerization
(4) Flow rate of water 0.1 m³/m²h

What is claimed is:

1. A process for production of a vinyl chloride polymer comprising polymerizing, by suspension polymerization or emulsion polymerization, vinyl chloride monomer or a mixture of vinyl chloride monomer with a vinyl monomer copolymerizable with said vinyl chloride monomer in an aqueous medium in a polymerizer, wherein the inner wall surface of the polymerizer and portions of the auxiliary equipment thereof which come into contact with the monomer during polymerization have been previously coated with a scaling preventive coating comprising at least one component selected from dyes and pigments, and the chloride ion concentration in the reaction mixture is controlled to not higher than 100 ppm during the polymerization.

2. A process according to claim 1, wherein said scaling preventive coating comprises at least one component selected from azo dyes and pigments, anthraquinone dyes and pigments, indigoid dyes and pigments, phthalocyanine dyes and pigments, carbonium dyes and pigments, quinoneimine dyes, methine dyes, quinoline dyes, nitro dyes, benzoquinone and naphthoquinone dyes, naphthalimide dyes and pigments, perinone dyes, sulfide dyes, fluorescent dyes, and azoic dyes.

3. A process according to claim 2, wherein said scaling preventive coating comprises an azine dye.

4. A process according to claim 1, wherein said scaling preventive coating further comprises an inorganic compound.

5. A process according to claim 4, wherein said inorganic compound is selected from silicic acids; silicates; salts of magnesium, calcium, barium, zinc, aluminum, tin, iron, nickel, cobalt, chromium, molybdenum, manganese, copper, silver and platinum; and inorganic colloids.

6. A process according to claim 5, wherein said inorganic compound is a silicate, silicic acid colloid or ferric hydroxide colloid.

7. A process according to claim 4, wherein said scaling preventive coating comprises at least one component selected from azo dyes and pigments, anthraquinone dyes and pigments, indigoid dyes and pigments, phthalocyanine dyes and pigments, carbonium dyes and pigments, quinoneimine dyes, methine dyes, quinoline dyes, nitro dyes, benzoquinone and naphthoquinone dyes, naphthalimide dyes and pigments, perinone dyes, sulfide dyes, fluorescent dyes, and azoic dyes.

8. A process according to claim 7, wherein said scaling preventive coating comprises an azine dye.

9. A process according to claim 1, wherein a fixing agent is used for enchancement of the fixing characteristic of said scaling preventive coating.

10. A process according to claim 9, wherein said fixing agent is at least one selected from olefin polymers, diene polymers, acetylene polymers, aliphatic vinyl or vinylidene polymers, aromatic vinyl polymers, heterocyclic vinyl polymers, acrylic or methacrylic polymers, polyethers, polysulfides, polysulfones, poly(alkylene diisocyanate), poly(5-iminohydantoin), poly(-perfluoroglutaronitrile), poly(1-perfluorobutyrylaziridine), polyesters, polyamides, polyureas, polyurethanes, linear condensed poplymers, heterocyclic condensed polymers, natural polymers, modified natural polymers, polysiloxanes, organic metal polymers and inorganic polymers.

11. A process according to claim 1, wherein portions of a recovery system for unreacted monomers where scales may stick are previously coated with the scaling preventive coating.

12. A process according to claim 1, wherein the inner wall surface of the polymerizer and the portions of the auxiliary equipment contacting the monomer have a surface roughness of 10 μm or less.

* * * * *